(12) United States Patent
Hagenbuch

(10) Patent No.: US 7,735,507 B2
(45) Date of Patent: *Jun. 15, 2010

(54) BAFFLED TANK FOR A VEHICLE

(76) Inventor: LeRoy G. Hagenbuch, 504 W. Northgate Rd., Peoria, IL (US) 61614

( * ) Notice: Subject to any disclaimer, the term of this patent is extended or adjusted under 35 U.S.C. 154(b) by 380 days.

This patent is subject to a terminal disclaimer.

(21) Appl. No.: 10/411,827

(22) Filed: Apr. 11, 2003

(65) Prior Publication Data

US 2003/0230585 A1 Dec. 18, 2003
US 2005/0189358 A2 Sep. 1, 2005

Related U.S. Application Data

(63) Continuation-in-part of application No. 09/873,032, filed on Jun. 1, 2001, now Pat. No. 6,547,091.

(60) Provisional application No. 60/391,556, filed on Jun. 25, 2002, provisional application No. 60/371,778, filed on Apr. 11, 2002.

(51) Int. Cl.
*B65D 25/00* (2006.01)
(52) U.S. Cl. ............... 137/15.08; 137/576; 137/574; 220/4.12; 220/563; 220/564
(58) Field of Classification Search ............... 137/267, 137/574, 576, 15.08; 220/563, 564, 562, 220/4.12; 280/837, 838, 839
See application file for complete search history.

(56) References Cited

U.S. PATENT DOCUMENTS

| | | | |
|---|---|---|---|
| 2,091,731 A | * | 8/1937 | Gredell ................ 220/564 |
| 2,552,119 A | * | 5/1951 | Scharenberg ............... 220/563 |
| 2,646,817 A | | 7/1953 | Cox |
| 2,992,656 A | | 7/1961 | Elliott et al. |
| 3,131,949 A | | 5/1964 | Black |
| 3,166,212 A | | 1/1965 | Resos |
| 3,363,641 A | | 1/1968 | Mylander |
| 3,979,005 A | | 9/1976 | Robinson et al. |
| 4,182,254 A | | 1/1980 | Secord et al. |
| 4,191,208 A | | 3/1980 | Mylander |

(Continued)

OTHER PUBLICATIONS

Payhauler Corp.; 350C Tanker Product Guide. Copyright 1995.

(Continued)

*Primary Examiner*—Kevin L Lee
(74) *Attorney, Agent, or Firm*—Leydig, Voit & Mayer, Ltd.

(57) ABSTRACT

A tank for transporting liquids is provided. The tank includes a tank vessel having an internal baffle system including an X-shaped baffle arrangement that extends through the interior of the tank vessel in the longitudinal direction. A plurality of entry hatches can be provided in the tank vessel for permitting access into the interior of the tank vessel. Each entry hatch has a removable hatch plate and is sized to allow a person to enter the tank therethrough. At least selected ones of the baffles in the tank have access openings therethrough. Each access opening has an associated pivotal baffle door that is movable between open and closed positions. The access openings are provided in the baffles such that a person can traverse through the interior of the tank between two of the entry hatches. The tank also is equipped with a variable volume system.

38 Claims, 50 Drawing Sheets

U.S. PATENT DOCUMENTS

| | | | | |
|---|---|---|---|---|
| 4,251,005 | A | | 2/1981 | Sons et al. |
| 4,313,566 | A | | 2/1982 | Klein |
| 4,611,724 | A | * | 9/1986 | Watkins et al. .............. 220/562 |
| 4,775,070 | A | | 10/1988 | Williams |
| 4,789,170 | A | * | 12/1988 | Reber ......................... 280/838 |
| 5,052,437 | A | | 10/1991 | Danna |
| 5,109,999 | A | * | 5/1992 | Instone et al. ................ 220/1.5 |
| 5,226,371 | A | * | 7/1993 | Dingle ........................ 105/358 |
| 5,651,330 | A | * | 7/1997 | Jewett ........................ 119/408 |
| 5,657,715 | A | * | 8/1997 | Theriault .................... 114/349 |
| 5,779,092 | A | | 7/1998 | Hehn et al. |
| 5,860,250 | A | * | 1/1999 | Hill et al. ...................... 49/397 |
| 6,547,091 | B2 | * | 4/2003 | Hagenbuch ................ 220/563 |
| 6,564,961 | B1 | * | 5/2003 | Klein ......................... 220/563 |

OTHER PUBLICATIONS

Magnum Australia; Magnum Water Tanks and Related Spray Equipment Product Guide from www.magnumaustralia.com Copyright 1998-2000.

Rimpull Corporation; WT-2749 Water Truck Product Guide. Copyright 1999.

Klein Products Inc.; Products Guide. Copyright 1999.

Photographs (twelve) of Water Tank Manufactured by MegaCorp. Taken Oct. 19, 2000.

Photographs (tens) of Tanker Truck manufactured by Klein Products, Inc. Taken on Oct. 19, 2000.

Rosco Manufacturing Company; DS Water Truck Product Guide from www.roscomfg.com. Copyright 2000.

Klein Products Inc.; Liquid Distributing Equipment Product Guide from www.kleinproducts.com. Copyright 2000.

Rimpull Corporation; Product Guide from www.rimpull.com. Copyright 2000.

Klein Products Inc.; Off-Highway Truck Tanks Product Guide. Copyright 2000.

Klein Products Inc.; Porto Tower Model KPT Product Guide. Copyright 2000.

Caterpillar; Custom Products Machine Price List. Bearing an effective date of January 2, 2001.

Hercules Equipment Ltd.; Product Guide from www.hercules-equipment.com. Applicant first became aware of this material on Mar. 26, 2001.

Mega Corporation; Mobile Water Distribution Equipment Product Guide from www.megacorpinc.com. Applicant first became aware of this material on Mar. 26, 2001.

Bethlehem Lukens Plate; Duracorr® brochure, Mar. 2001.

Sun Hydraulics® ; "Soft-Start Pilot Operated Relief Valve," product description, undated. Applicant first became aware of this material around Jun. 2002.

Mega Corporation; "Water Equipment" brochure, undated. Applicant first became aware of this material around Mar. 2002.

Mega Corporation; Magnum™ MTT30/CAT® 789 30,000 Gallon Water Tank; undated.

Mega Corporation; Magnum™ MTT42/CAT® 789 42,000 Gallon Water Tank; undated.

Mega Corporation; Magnum™ MTT52/CAT® 793 B 52,000 Gallon Water Tank; undated.

Westech; Presentation from Rocky Mountain Master Mechanics Association Meeting. Applicant first became aware of this material around Dec. 2002.

Flyer by "Super Products" company entitled Supersucker® High Dump SuperSucker® Brand of Vacuum Loaders & Cleaners, 2 pages (Copyright 2003).

Super Products Brochure entitled "Mud Dog Hydroexcavator", Copyright 2005.

Office action and claims as examined from Parent U.S. Appl. No. 09/873,032 (now U.S. Patent No. 6,547,091).

Official Action and claims as examined for foreign counterpart Australian Application No. 44421/02.

Official Action and and claims as examined for foreign counterpart Australian Application No. 20032036871.

Official Action and claims as examined for foreign counterpart Chilean Application No. 1168-2002.

Official Action and claims as examined for foreign counterpart Chilean Application No. 755-2003.

Hagenbuch, LeRoy G., et al., "Advances in Safe Vehicle Water Tank Design", *SAE, International*, ISSN 0148-7191, (2009-01-2872) 8 pages.

* cited by examiner

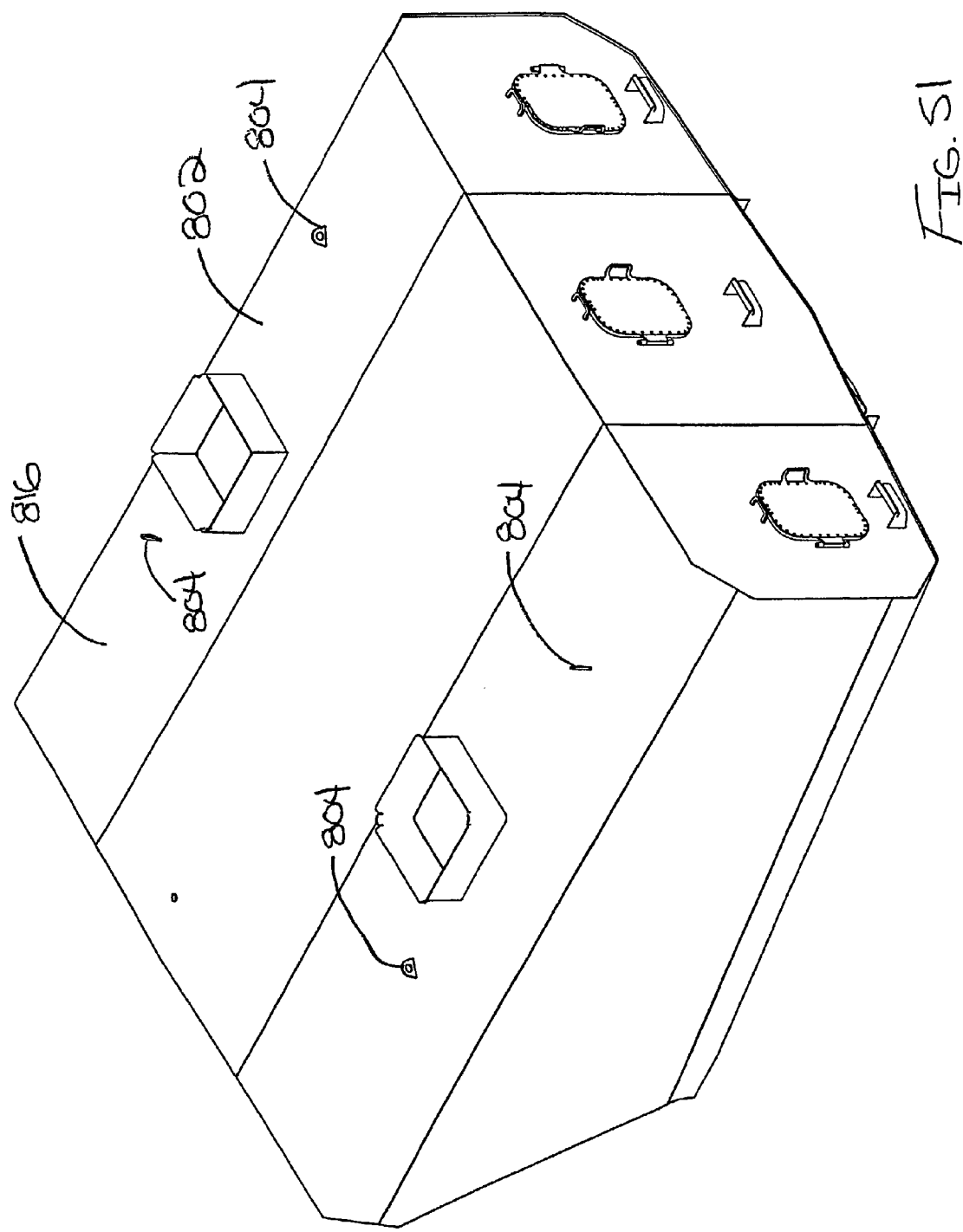

BAFFLED TANK FOR A VEHICLE

CROSS-REFERENCE TO RELATED APPLICATIONS

This patent application is a continuation-in-part of U.S. patent application Ser. No. 09/873,032 filed Jun. 1, 2001, now U.S. Pat. No. 6,547,091. This patent application also claims the benefit of U.S. Provisional Patent Application 60/371,778, filed Apr. 11, 2002 and U.S. Provisional Patent Application 60/391,556 filed Jun. 25, 2002.

FIELD OF THE INVENTION

This invention pertains to tanks for storing and dispensing fluids, and in particular, to such tanks which are mobile and mounted on vehicles.

BACKGROUND OF THE INVENTION

Dust control can be a particular problem on construction sites, building demolition sites, excavation sites and mine sites. For example, in a mining operation, the mine haul roads essentially consist of dirt and gravel. Dust control is necessary on the haul roads so that the operators of mining vehicles can readily see the other mining vehicles using the roads. Thus, dust control on mine haul roads is a safety issue. Moreover, dust clouds caused by vehicles operating on the haul roads can adversely impact air quality potentially creating environmental issues particularly where the dust clouds drift beyond the mine site.

Typically, mines have water tanker trucks, which are used to water down the haul roads in order to control dust. Such water tanker trucks generally have a plurality of spray nozzles positioned on either the forward or rearward sections of the vehicles to dispense a fluid spray or mist onto the ground. The water tanker truck can also have hoses or a water monitor/cannon for washing down other mining equipment and, in some cases, fire control.

Because of the service demands on such water tanker trucks, they are typically capable of carrying very large quantities of water. For example, water tanker trucks used in mining operations can have fluid capacities of over 50,000 gallons. Of course, vehicle stability is a critical issue when transporting large volumes of water that, in the case of a 50,000 gallon tank, can carry a water load of over 200 tons. Specifically, surging and wave motion of the fluid, particularly transverse surging resulting from centrifugal forces experienced during turning of the truck can cause a tanker truck to become unstable or even turn over on its side. To prevent such surging of the fluid, the tank is provided with internal baffles.

To ensure a long-life, the interior of the tanks must undergo periodic maintenance. For example, to protect against corrosion, the interior surfaces of the tank may need to be periodically cleaned and re-coated with a rust protection coating such as an epoxy. This work is complicated by the fact that tanks only have points of entry on the top of the tank and often just a single point of entry, and thus the work is subject to confined space safety regulations. Accordingly, workers performing tasks inside the tank must be provided with secondary air sources from outside the tank. This can greatly complicate the maintenance operations. Moreover, it can be difficult for the workers to maneuver around the internal tank baffles particularly since the interior of the tank is very dark. Accordingly, maintaining the interior of these tanks can be a difficult and time-consuming process.

Another problem with these types of mobile tanks is that at larger sizes they can be difficult to ship to the location at which they are to be used, typically on off-highway trucks. For instance, the largest tanks can be over twenty feet wide. As can be appreciated, transporting a tank of this size can be a difficult and expensive operation.

OBJECTS OF THE INVENTION

Accordingly, in view of the foregoing, a general object of the present invention is to provide an improved baffled tank for a tanker truck such as is used for dust control in mining operations, construction sites and the like.

A more specific object of one embodiment of the present invention is to provide a tank for such a tanker truck which has an improved baffling system. Another object of one embodiment of the present invention is to provide a baffled tank for such a tanker truck which is configured so that work can much more easily be performed inside the tank.

BRIEF DESCRIPTION OF THE DRAWINGS

FIG. 29 is a plan view of three baffles with assembled baffle doors showing the final step in a process for creating the access openings and baffle doors of the embodiment illustrated in FIG. 23.

FIG. 49 is an enlarged view of the end of the air releasing control mechanism of FIG. 48.

FIG. 51 is a perspective view of an exemplary tank equipped with a plurality of unique lifting eyes.

FIG. 52 is a partially cut away, perspective view of one of the lifting eyes of FIG. 51.

DETAILED DESCRIPTION OF THE INVENTION

Figure 1:
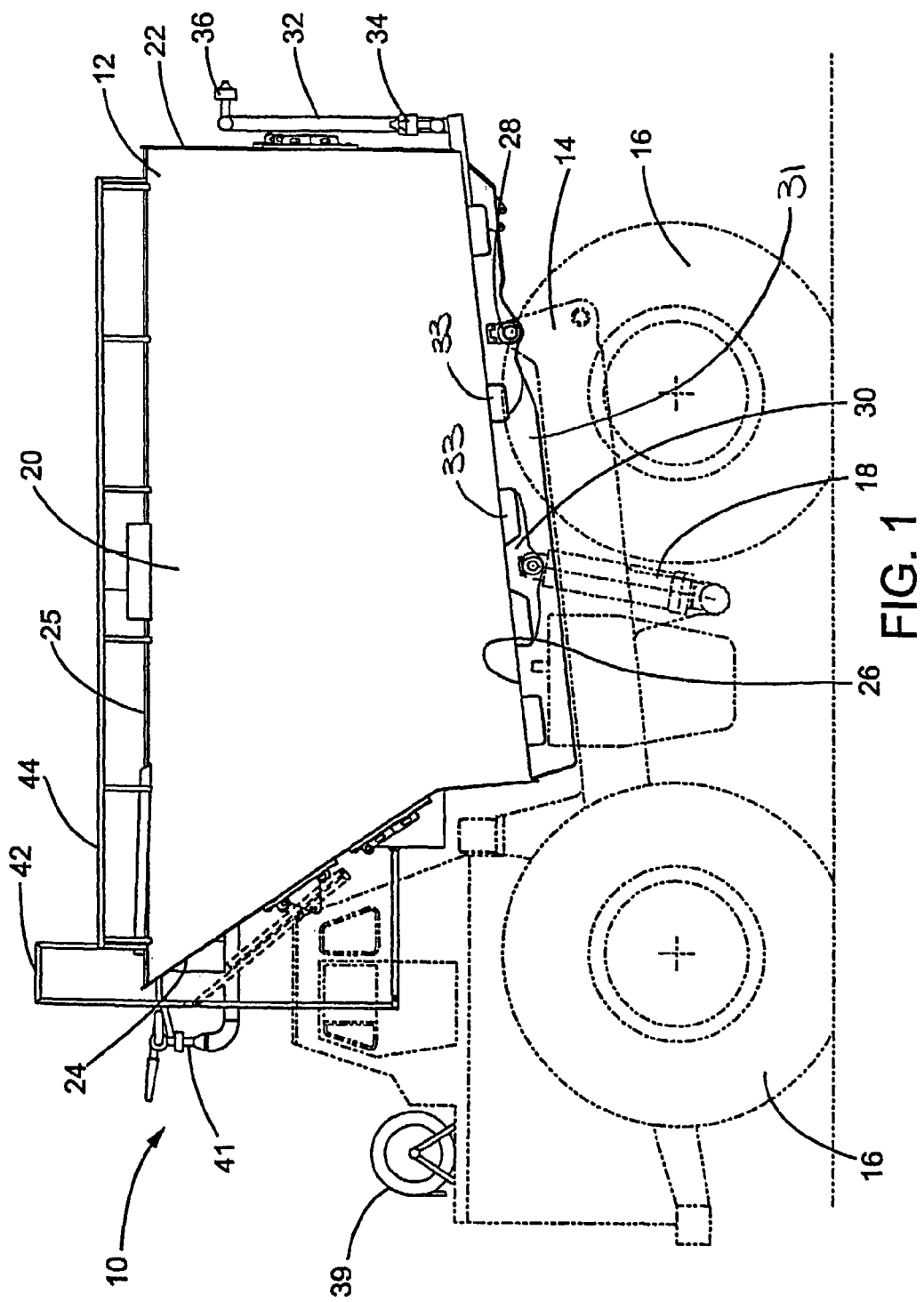
FIG. 1 is a side elevation view of an illustrative tank constructed in accordance with the present invention mounted on the chassis of an off-highway truck.
Figure 2:
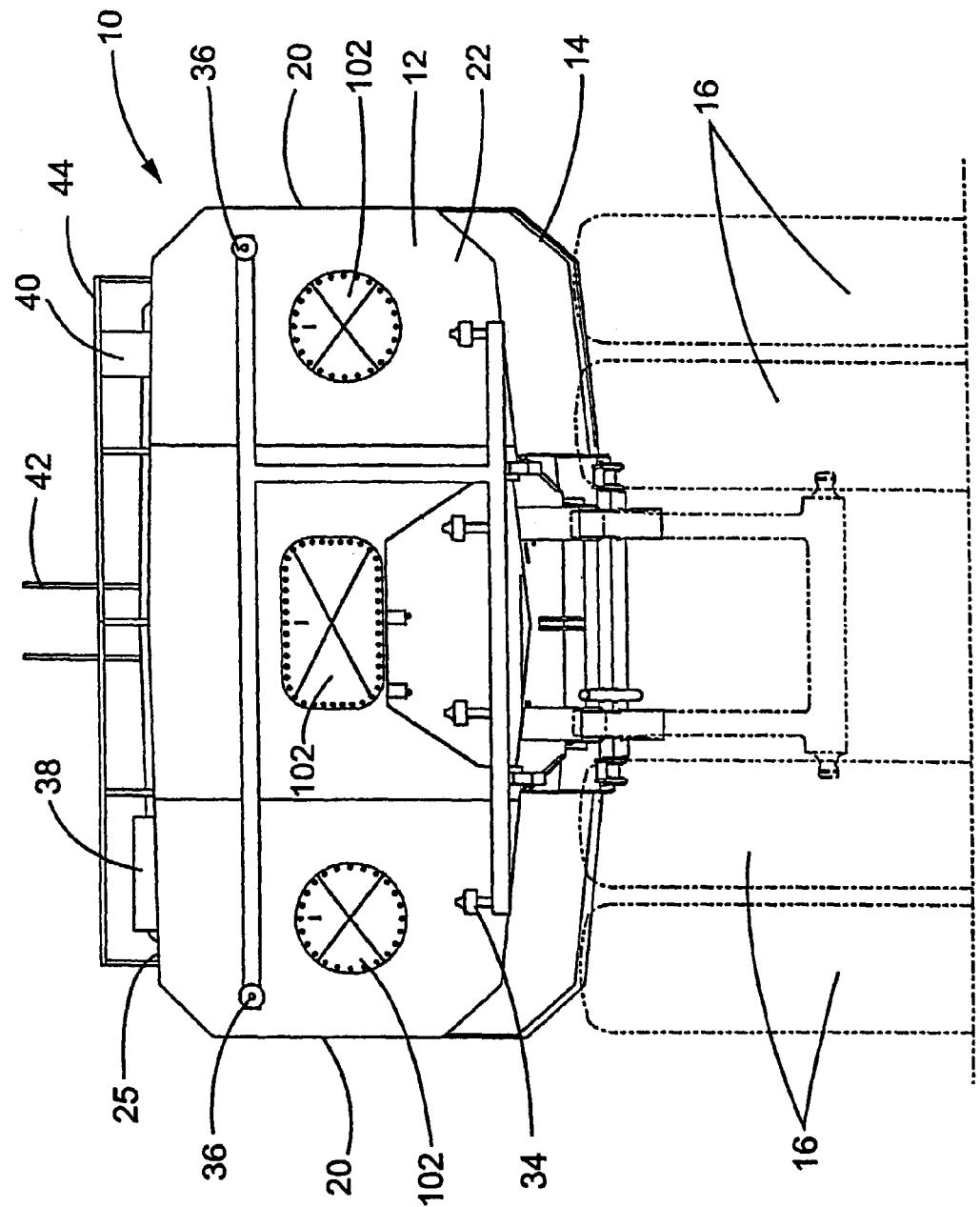
FIG. 2 is an end elevation view of the tank of FIG. 1 mounted on the chassis of an off-highway truck.

Referring now more particularly to FIGS. 1 and 2 of the drawings, there is shown an exemplary tanker truck 10 having a tank 12 constructed in accordance with the present invention. The tanker truck 10 includes a chassis 14 which is supported on a plurality of tires 16 and on which the tank 12 is mounted. While the tank 12 of the present invention is described in the context of an off-highway tanker truck, those skilled in the art will appreciate that the teachings of the present invention are equally applicable to relatively large tanks mounted on other types of vehicles such as, for example, on-highway trucks, trailers, off-highway earth-moving scrapers and airplanes.

Optionally, as in the illustrated embodiment, the tank 12 can be attached to the chassis 14 for pivotal movement into a raised position so as to allow access to components on the tanker truck 10 such as the drive train, transmission, or gear differential. The tank 12 can be moved between the raised and lowered positions by actuation of a hoist cylinder 18 carried on the chassis 14 of the tanker truck 10. As will be appreciated, the tank 12 can also be rigidly mounted on the chassis 14.

The tank 12 consists of a pair of opposing sidewalls 20, a rear wall 22, a front wall 24, a top wall 25 and a floor 26. In this case, the floor 26 includes the components for mounting the tank to the chassis including the tank/chassis pivots 28 and the mounts 30 for the hoist cylinder 18 (see, e.g., FIGS. 1 and 7). The floor support structure includes the longitudinally extending tank frame rails 31 and a plurality of laterally extending cross supports 33. This floor support structure adds to the structural integrity of the tank 12. Moreover, because the floor 26 of the tank 12 follows the top of the truck frame, the tank is mounted lower on the truck chassis improving the stability of the tank and, in turn, the tanker truck. In the illustrated embodiment, as shown in FIG. 1, the floor 26 angles downward as it extends from the rear wall 22 to the front wall 24. Additionally, the front wall 24 includes a portion which is angled away from the rear wall 22 of the tank 12. It will be appreciated that the walls of the tank 12 can have any shape including curved.

For discharging fluid, the tank 12 includes, in this case, a plurality of spray nozzles which are supplied by a spray bar assembly 32 arranged on the exterior of the rear wall 22 of the tank 12 and in communication with a fluid pump mounted on the rear of the tank 12. As shown in FIG. 2, the illustrated embodiment includes four lower spray nozzles 34 spaced across the width of the tank 12 for producing a horizontal flat spray to the rear of the tanker truck 10. The tank 12 also includes two upper spray nozzles 36 which are arranged to provide a vertical spray to the sides of the tanker truck 10. Of course, the spray nozzles can be arranged in various other locations on the tank 12 including on the sides and the front. Additionally, as desired, the tank 12 can be provided with one or more hose reels 39 and manually or remote-controlled monitors or cannons 41 for distributing fluid onto other equipment, material piles and other hard to reach areas as shown in FIG. 1. The hose reels 39 and monitors 41 could also be used for fire fighting. A pump can be provided to disburse the fluid into the spray bar assembly 32 and thereby into the various spray nozzles. It will be appreciated that the tank 12 of the present invention is not limited to any particular method or arrangement for discharging the fluid.

In a conventional manner, the top wall 25 of the tank 12 includes a fill hole 38, as shown FIG. 2, through which the tank can be filled. Additionally, a ventilation tube 40 is provided through the top wall 25 of the tank 12 to facilitate the filling process. The tank 12 can also be provided with a water level gauge such as for example a sight gauge. To permit an operator to have access to what is typically the active work area on the top of the tank 12, for example to assist in the filling operation, the tank 12 can optionally include a ladder 42 and a guard rail 44 which goes around the outer edges of the top wall 25 of the tank 12 such as shown in FIG. 1.

In accordance with an important aspect of one embodiment of the present invention, the tank 12 includes a novel baffle system in which the structural components of the tank also serve as baffles. Moreover, as described in detail below, the baffle system can also be configured to make the interior of the tank 12 much more accessible to workers than baffled tanks that are presently available. The baffle system is best described by separating the tank into a center section 46 best shown in FIGS. 7-10 and left and right side sections 48, 50 best shown in FIGS. 11-14 and 15-18, respectively, that are symmetrical with each other. Though, as can be appreciated, relatively smaller tanks could be produced in a single section. The entire baffle system is shown assembled together in FIGS. 3-6. Left and right are used herein with reference to looking forward from the rear of tanker truck 10 of FIG. 1 towards the front.

Figure 22:
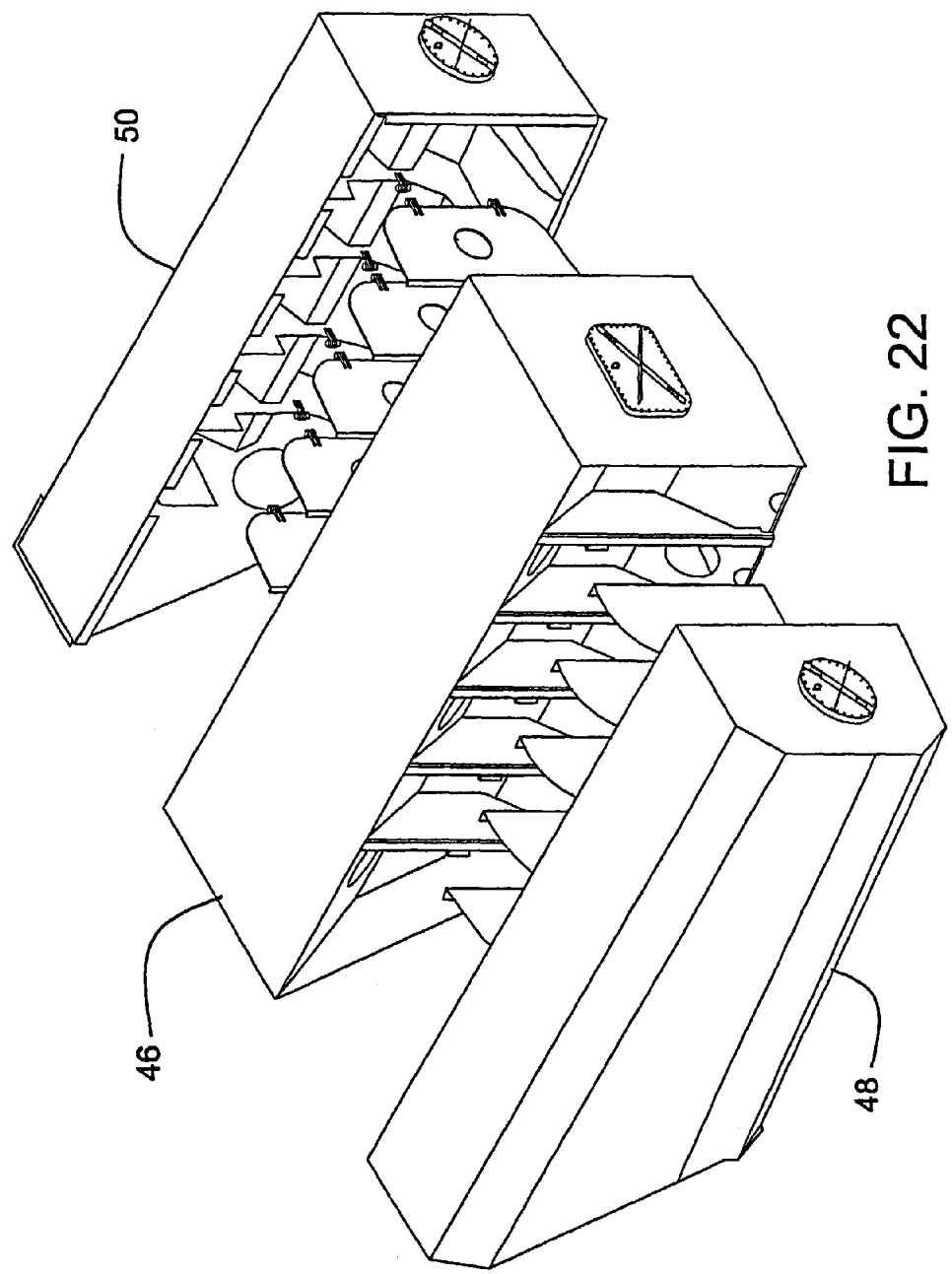
FIG. 22 is an exploded perspective view of the tank of FIG. 1.

In order to allow the tank 12 to be shipped more easily to a location where it is assembled to an off-highway truck, the center, left and right side sections 46, 48, 50 can comprise separate components that are assembled together. In particular, as shown in the exploded view of FIG. 22, the left and right side sections 48, 50 can be connected to their respective side of the center section 46 via welding or any other appropriate method to form the tank 12. The three-piece construction allows the tank 12 to be broken into relatively smaller components for shipment. Of course, other aspects of the present invention, such as the baffle arrangement described below, are not limited to tanks having a three-piece construction, rather they can be incorporated into single-piece tanks or tanks consisting of any number of components.

Figure 3:
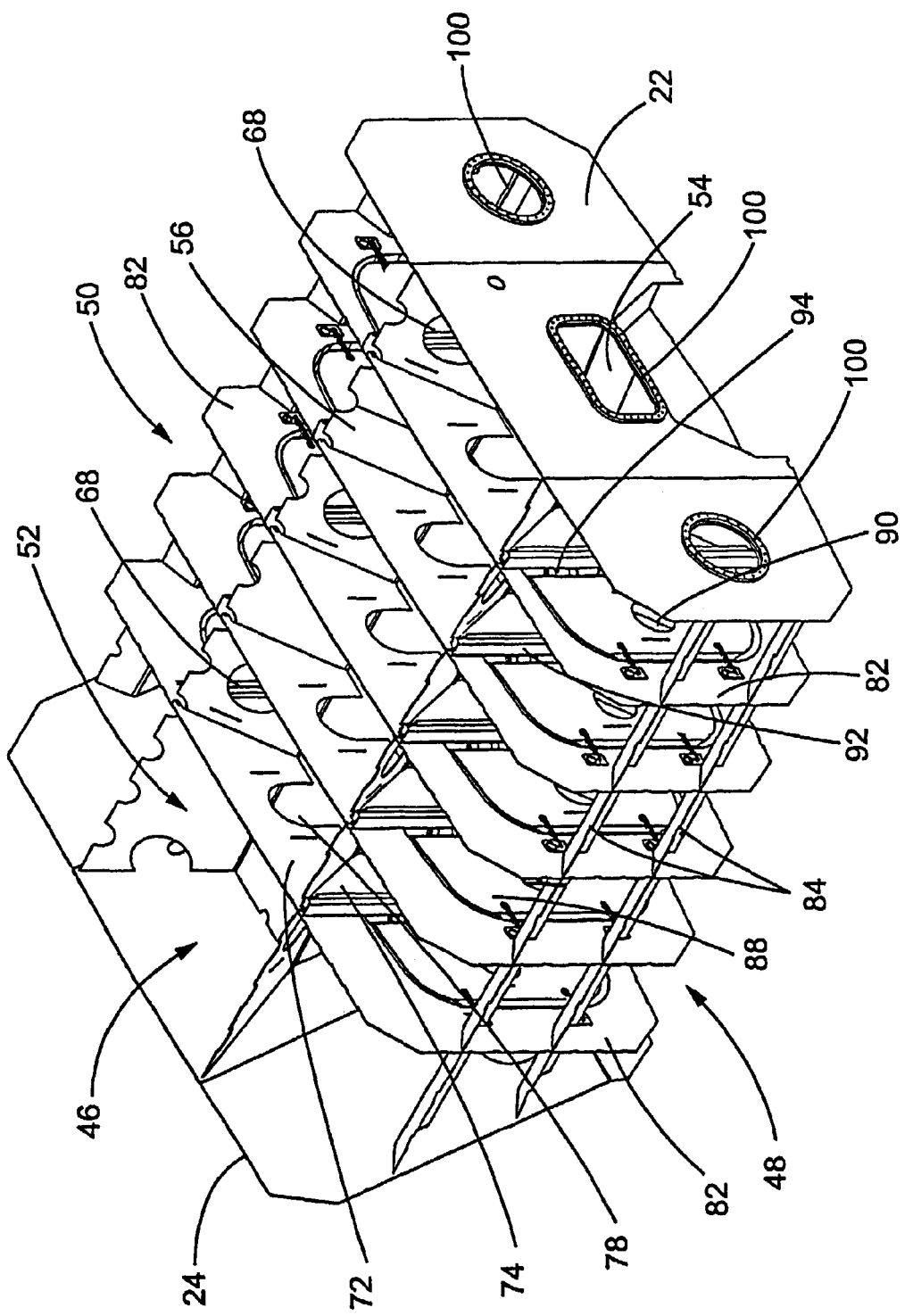
FIG. 3 is a cut away perspective view of the tank of FIG. 1 showing the assembled internal baffle system.
Figure 4:
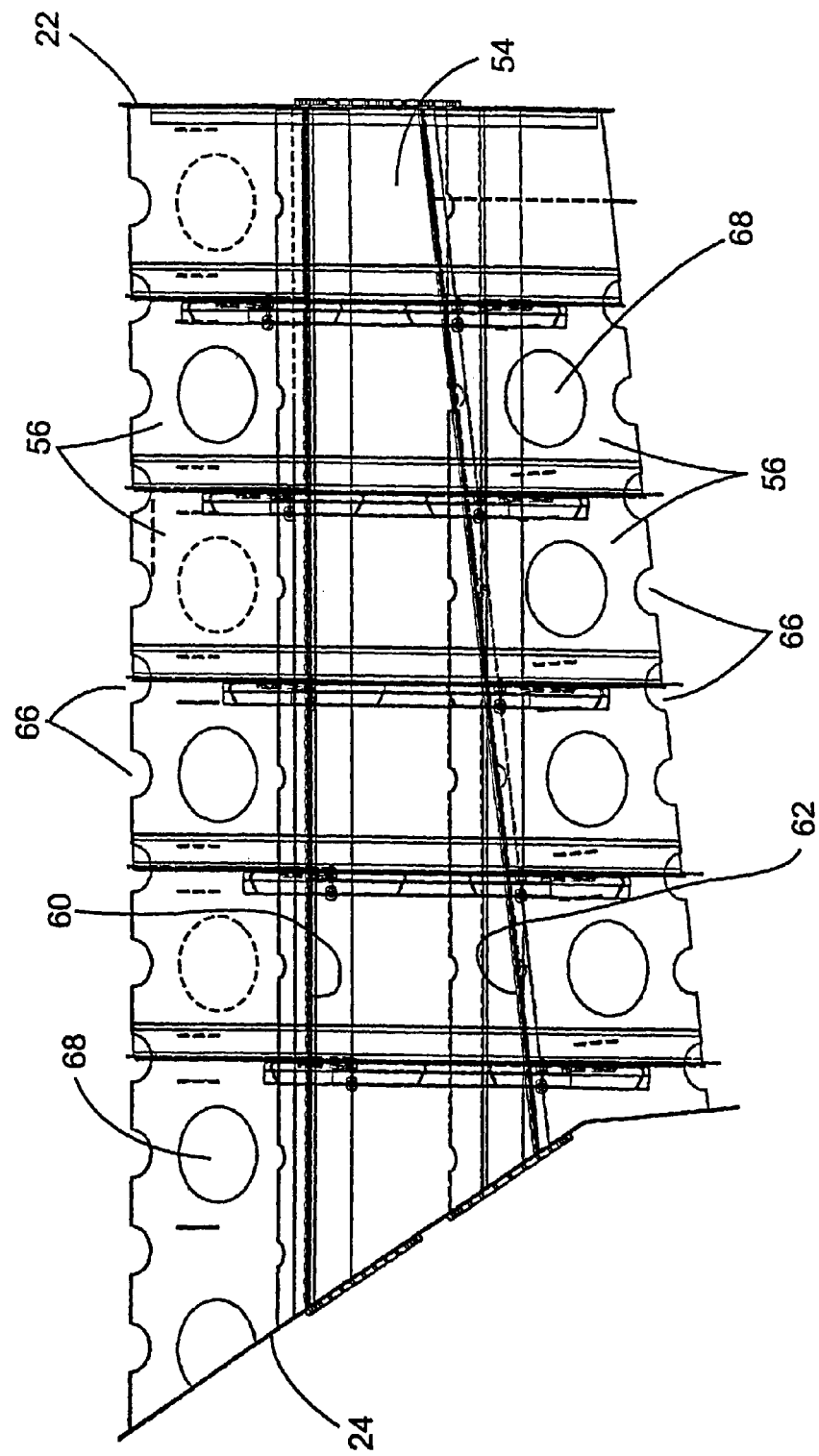
FIG. 4 is a cut away side elevation view of the tank of FIG. 1 showing the assembled internal baffle system.
Figure 6:
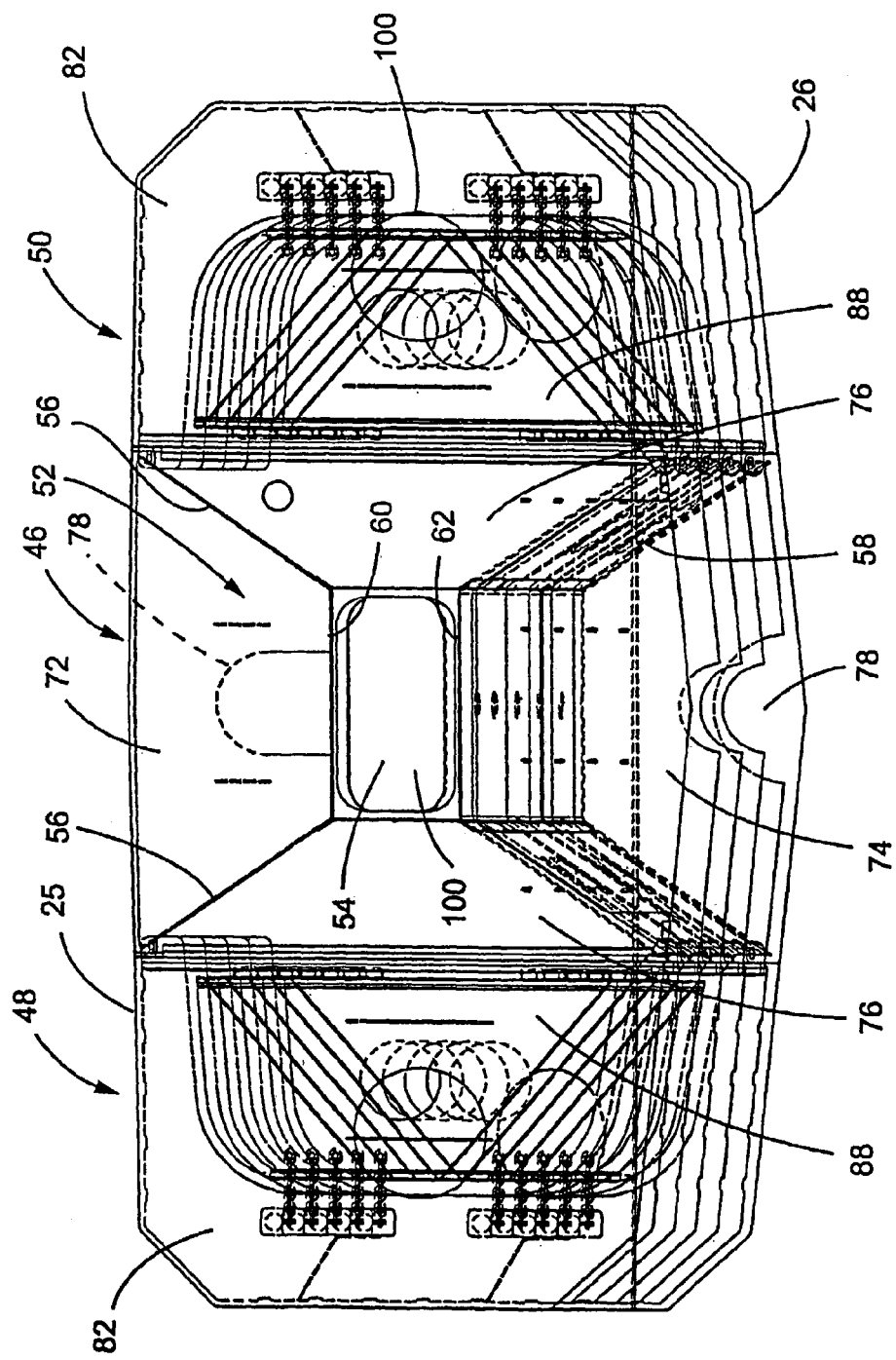
FIG. 6 is a cut away rear elevation view of the assembled internal baffle system of the tank of FIG. 1.
Figure 7:
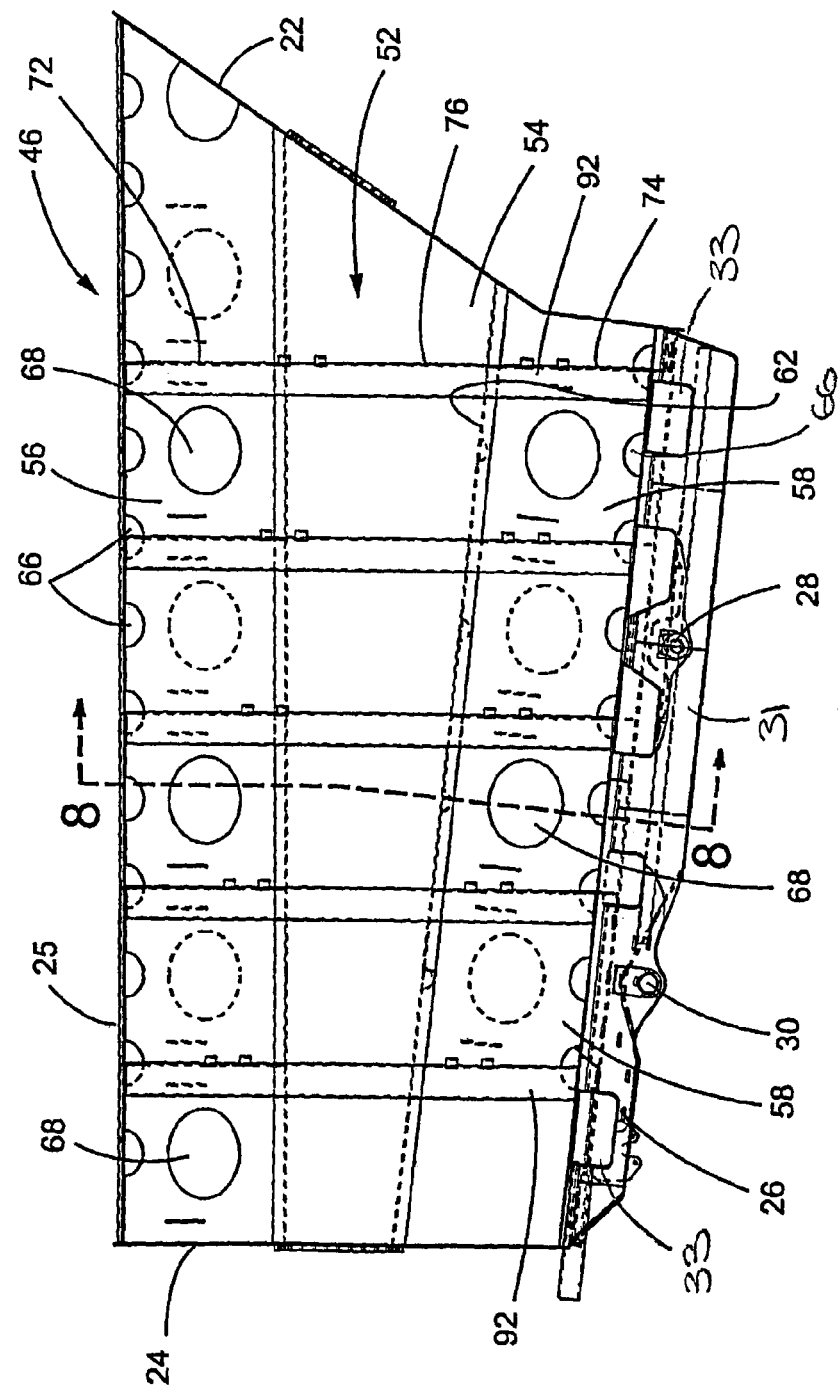
FIG. 7 is a side elevation view of the center section of the tank of FIG. 1.
Figure 8:
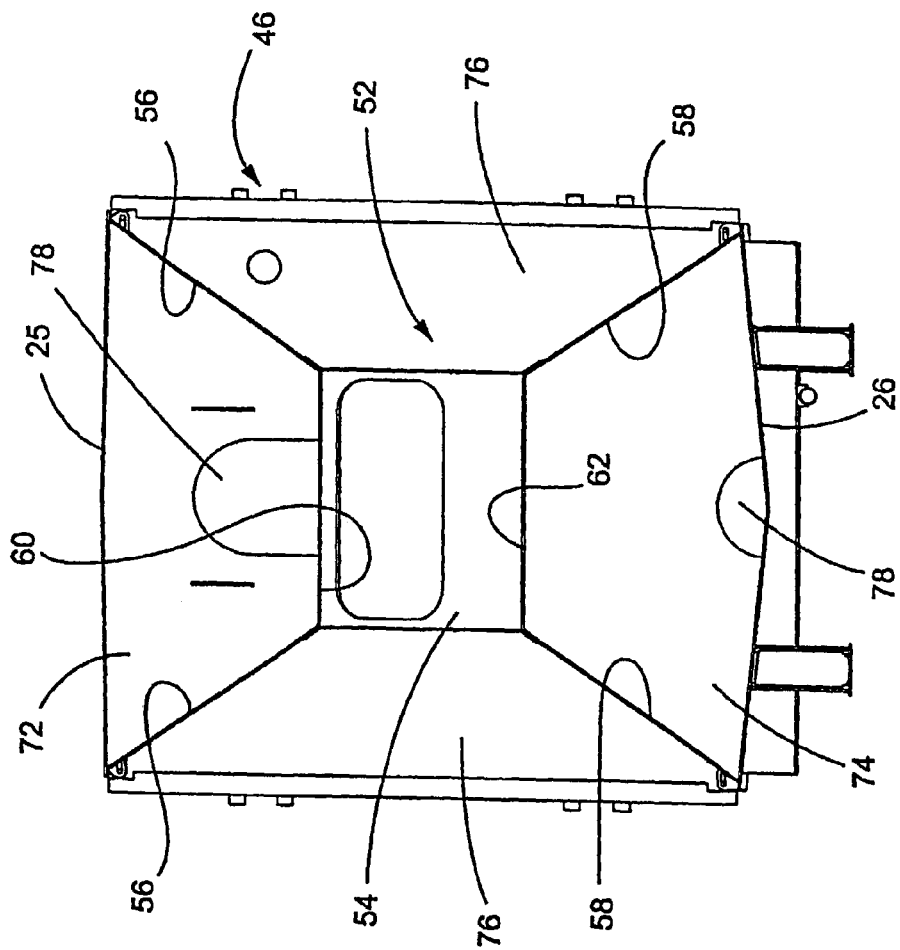
FIG. 8 is a sectional view of the center section of the tank of FIG. 1 taken in the plane of line 8-8 in FIG. 7.
Figure 9:
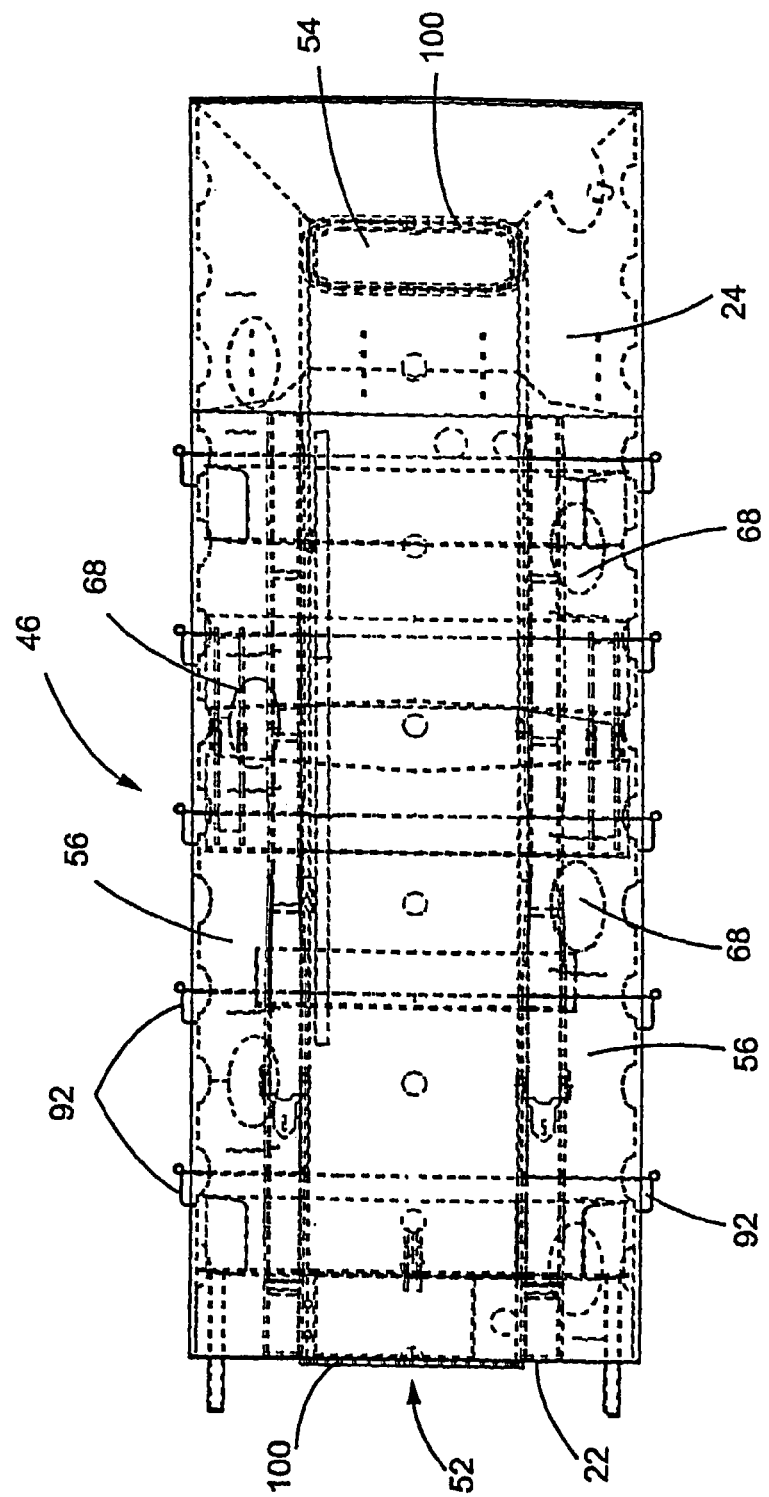
FIG. 9 is a top plan view of the center section of the tank of FIG. 1.
Figure 10:
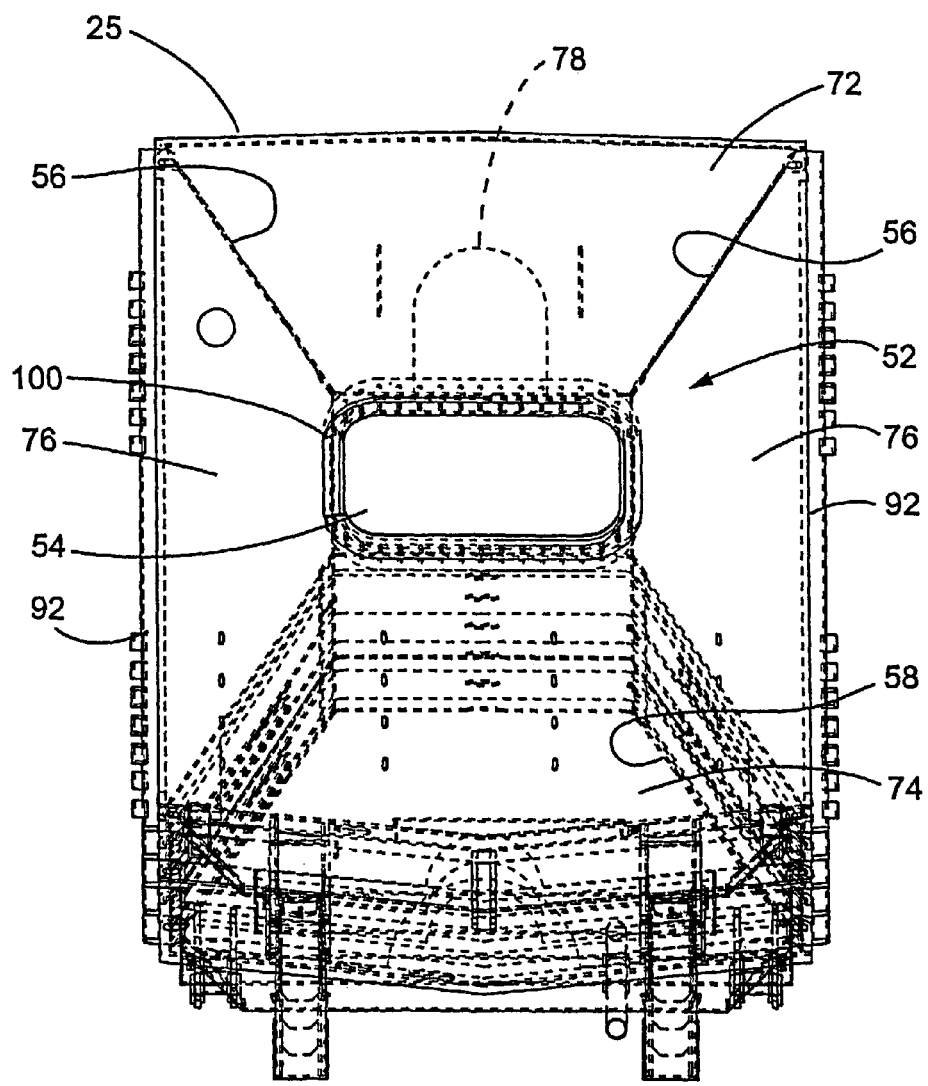
FIG. 10 is a front elevation view of the center section of the tank of FIG. 1.

To suppress wave motion and surging of the fluid in the lateral or side-to-side direction, the center section 46 has longitudinal baffles that generally form an X-shaped baffle arrangement 52 (see FIGS. 3, 6, 8 and 10). Advantageously, this X-shaped baffle arrangement 52 also provides the structural supports for the top wall 25 and floor 26 of the tank. As shown in FIGS. 3, 6, and 10, the X-shaped baffle arrangement 52 extends vertically between the top wall 25 and floor 26 of the tank 12 and has a rectangular shaped chamber 54 arranged in its center. In particular, as best shown in FIG. 8, upper legs 56 of the X-shaped baffle arrangement 52 extend between an upper surface 60 of the chamber 54 and the top wall 25 of the tank 12 and lower legs 58 of the X-shaped baffle arrangement 52 extend between a lower surface 62 of the chamber 54 and the floor 26 of the tank. The rectangular chamber 54 and the upper and lower legs 56, 58 of the X-shaped baffle arrangement 52 extend longitudinally through the center section 46 between the front 24 and rear 22 walls of the tank 12 as shown in FIGS. 7 and 9. The rectangular chamber 54, in this case, gets gradually larger as it extends from the rear end of the center section 46 towards the front end because the lower surface 62 of the chamber 54 angles downward parallel in relation to the chassis 14 and the tank floor 26 as shown in FIG. 7.

A plurality of holes 64 are provided in the upper and lower surfaces 60, 62 (best shown in FIGS. 4, 6 and 8) of the rectangular chamber 54 to allow fluid to work its way downward in the tank 12 during filling or emptying of the tank. Similarly, holes 66 are provided along the upper edges of the upper legs 56 and the lower edges of the lower legs 58, as shown in FIG. 7, to assist fluid in migrating through the entire tank 12.

To assist fluid migration and also provide access for workers performing maintenance operations, openings 68 are provided, in this instance, in the middle of upper and lower legs 56, 58 of the longitudinal X-shaped baffle arrangement 52 as shown in FIGS. 3-5 and 7. During normal operations of the tank 12, some or all of these openings 68 can be closed with loose fitting hatch plates to prevent the lateral surging of the fluid in the tank. In this case, the hatch plates are received in slots which are arranged on either side of the openings 68 as shown, for example, in FIGS. 5 and 7. When work is being performed on the interior of the tank 12, the loose hatch plates can be removed to provide access to the interior of the upper and lower portions of the longitudinal X-shaped baffle arrangement 52.

For limiting longitudinal wave action and surging of fluid such as during braking or acceleration of the tanker truck 10, vertically extending baffles are arranged between the legs of the X-shaped baffle arrangement 52. As shown in FIGS. 6-8 and 10, an upper lateral baffle 72 is provided between the upper legs 56 and a lower lateral baffle 74 between the lower legs 58 at spaced intervals along the length of the X-shaped baffle arrangement 52. Additionally, side lateral baffles 76 are provided to either side of the X-shaped baffle arrangement 52 at spaced intervals along the length thereof. Again, because, in this case, the tank 12 gets deeper as it extends from its rear wall 22 to its front wall 24, these side lateral baffles 76 to the sides of the X-shaped baffle arrangement 52 get larger towards the front of the tank 12. This can be seen via broken lines in the rear end views of FIGS. 6 and 10. Access openings 78 are provided in each of the upper and lower lateral baffles 72, 74 to provide access into the compartments formed in the upper and lower portions of the X-shaped baffle arrangement 52 by the lateral baffles 72, 74. Similar to the access openings 68 in the legs 56, 58 of the X-shaped baffle arrangement 52, the access openings 78 in the upper and lower lateral baffles 72, 74 can be closed by loose fitting hatch plates that are received in slots to either side of each opening 78 (see, e.g., FIG. 8 in which exemplary slots are shown for the upper access opening 78). Moreover, at least one of the access openings 68 in the legs 56, 58 of the X-shaped baffle arrangement 52 is arranged between each pair of upper and lower lateral baffles 72, 74 and side lateral baffles 76 to allow access into each compartment created by the upper and lower lateral baffles and side lateral baffles 76.

Figure 14:
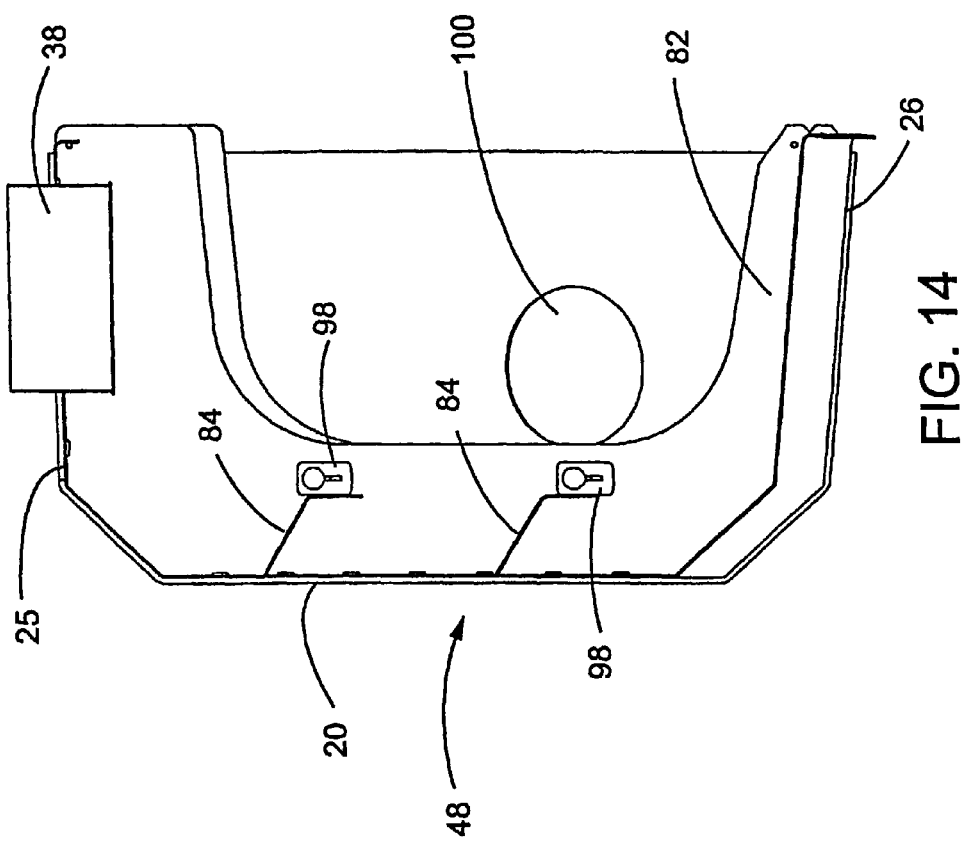
FIG. 14 is a sectional view taken in the plane of line 14-14 in FIG. 13 of the left side section of the tank of FIG. 1.
Figure 18:
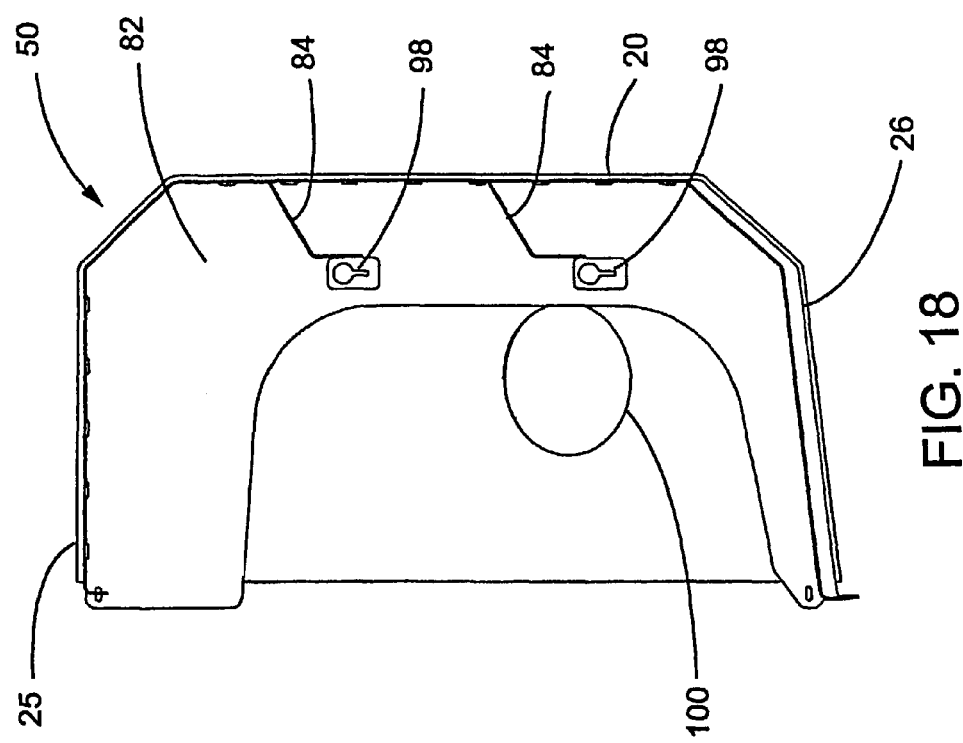
FIG. 18 is a sectional view taken in the plane of line 18-18 in FIG. 17 of the right side section of the tank of FIG. 1.

Additional lateral baffling can also be provided to either side of the center section 46 in the left and right side sections 48, 50. As shown in FIGS. 11-14 (left section 48) and FIGS. 15-18 (right section 50), with the exception of certain accessory type components such as the fill hole 38 and the ventilation tube 40, the left and right sections 48, 50 are mirror images of each other. Each side section 48, 50 includes a plurality of longitudinally spaced C-shaped ribs 82 as best shown in FIGS. 11, 13, 15 and 17. These C-shaped ribs 82 extend around the interior surface of each side section 48, 50 (see, e.g., FIGS. 14 and 18) to support the sidewalls 20 of the tank 12 as well as the portions of the floor 26 and top wall 25 of the tank defined by the side sections. Additional support for the sidewalls 20 of the tank 12 is provided, in this case, by reinforcing plates 84 which extend longitudinally between the C-shaped ribs 82 on the side of each side section 48, 50. In the illustrated embodiment, each side section 48, 50 includes parallel upper and lower sets of reinforcing plates 84 as shown in FIGS. 11, 13, 15 and 17. These reinforcing plates 84 disrupt side-to-side liquid surging, particularly up the sidewalls 20 of the tank 12 thereby also acting as sidewall baffles or surge suppressor plates 84. As shown in FIGS. 14 and 18, each of the sidewall baffles or surge suppressor plates 84 include, in this case, a first leg that extends inward at a downward angle from the sidewall of the tank 12 and a second leg extending downward from the end of the first leg. Side-to-side liquid surging is further disrupted by the generally squared-off, sharp transitional bends between the floor 26 and sidewalls 20 of the tank 12.

Figure 5:
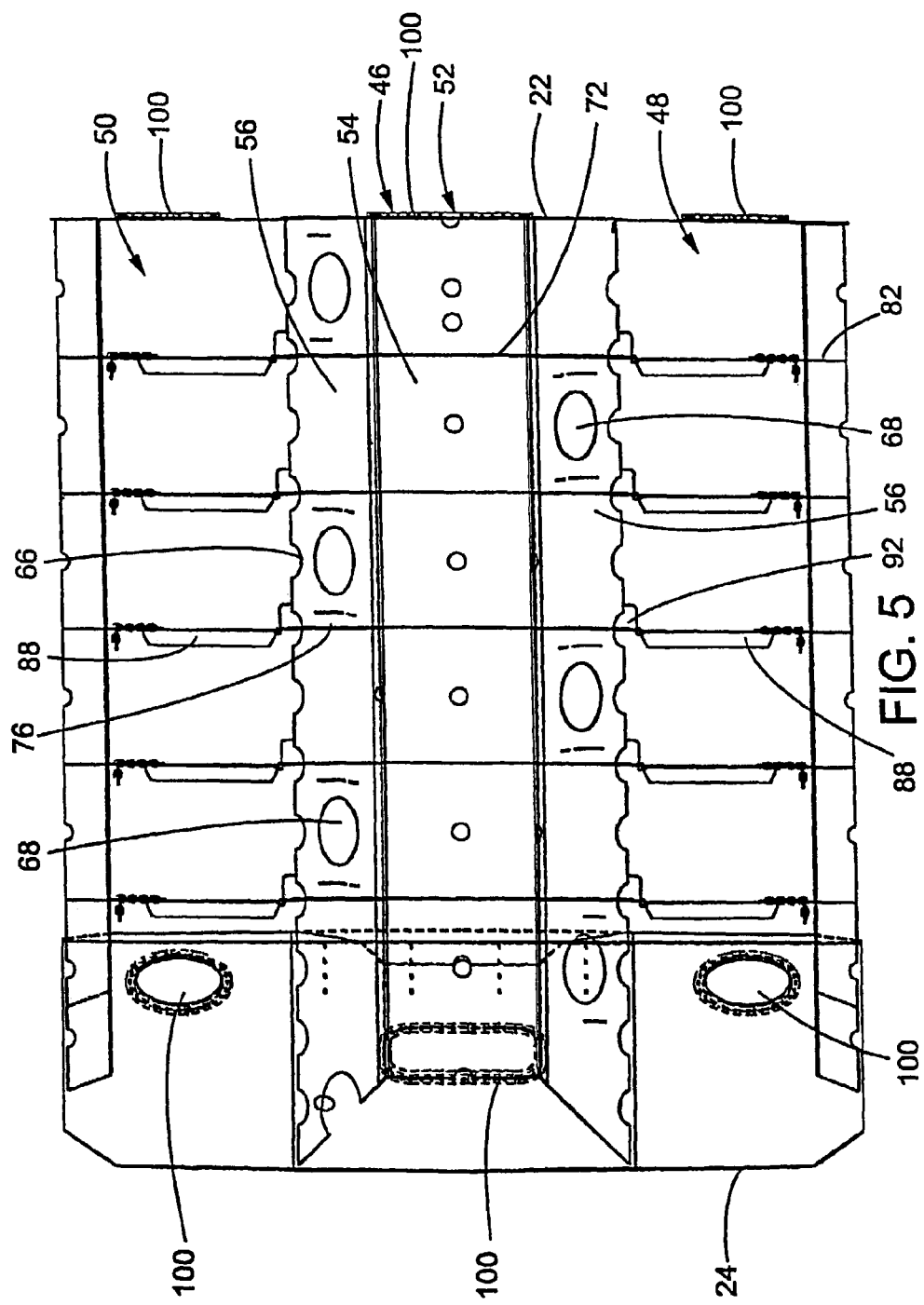
FIG. 5 is a cut away top plan view of the assembled internal baffle system of the tank of FIG. 1.
Figure 21:
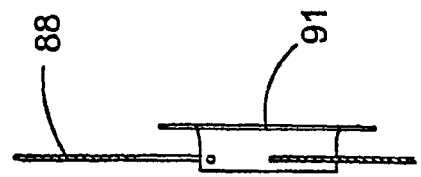
FIG. 21 is a sectional view taken in the plane of line 21-21 in FIG. 19 showing an exemplary cover plate installed over the access opening in the hinged baffle door.
Figure 19:
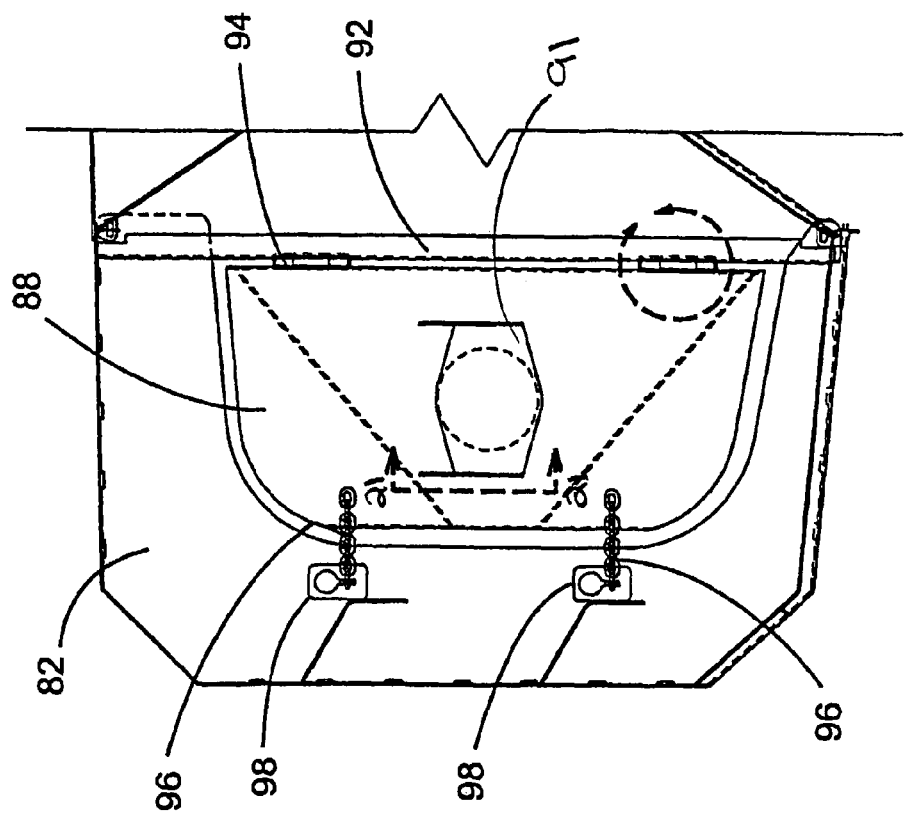
FIG. 19 is a rear elevation view of one of the hinged baffles of the tank of FIG. 1.

Lateral baffle doors 88 are provided in each side section 48, 50 that extend between the C-shaped ribs 82 and the center X-shaped baffle arrangement 52 as shown, for example, in FIGS. 3 and 5. In order to provide workers with substantially unobstructed access to the interior of the side sections 48, 50 of the tank 12, these lateral baffle doors 88 are pivotally supported or hinged such that they can swing into an open position in which they extend longitudinally with respect to the tank 12. When the pivotal or hinged baffle doors 88 are in this open position, the side sections 48, 50 are substantially open from end-to-end. Again, in the illustrated embodiment, an access opening 90 is provided in each of the hinged baffle doors 88 which can be closed by a loose fitting hatch plate 91 (see, e.g., FIGS. 19 and 21). As will be appreciated, a hatch plate such as shown in FIGS. 19 and 21 could also be used to close any of the other access openings provided in the other baffles.

Figure 20:
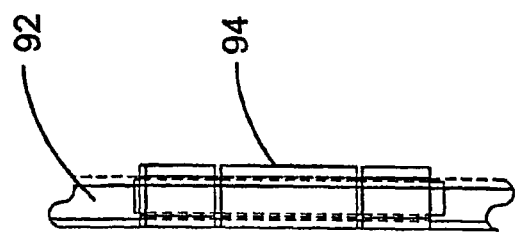
FIG. 20 is an enlarged rear elevation view of one of the hinges of the hinged baffle of FIG. 19.

For supporting the hinged baffle doors 88, a plurality of longitudinally spaced upright support members 92 that extend between the floor 26 and top wall 25 of the tank 12 are provided on either side of the center section 46 as shown in FIGS. 5 and 7. Hinges 94 are provided on each the upright support members 92 (see FIGS. 19 and 20) for pivotally supporting one edge of a respective hinged baffle door 88. In the illustrated embodiment, the other end of each hinged baffle door 88 can be secured in a closed, deployed position by a pair of chains 96 that are captured in corresponding keyways 98 in the C-shaped ribs 82 as shown in FIG. 19. In the closed, deployed position, the hinged baffle doors 88 are substantially aligned with the lateral baffles 72, 74, 76 that extend between the legs 56, 58 of the center X-shaped baffle arrangement 52 as shown in FIGS. 3, 5 and 6.

The hinged baffle doors 88 allow the side sections 48, 50 to be constructed in a manner similar to the hull of a ship with the C-shaped ribs 82 supporting the walls of the tank 12. However, the C-shaped ribs 82 also form part of the lateral baffling in the tank 12 when the hinged baffle doors 88 are closed. Thus, the illustrated baffling configuration also allows the structural components of the side sections of the tank 12 to also serve as baffles. Alternatively, the C-shaped ribs 82 could be arranged on the exterior surface of the tank 12 with the hinged baffle doors 88 being latched directly to the inside surface of the sidewalls 20. Attaching the hinged baffle doors 88 to the center section 46 can also permit the left and right side sections 48, 50 to be interlocked for shipment on a single truck. The center section 46 then can be shipped separately with the hinged baffle doors 88 swung into the longitudinally extending open position against the outside of the X-shaped baffle arrangement 52.

Figure 11:
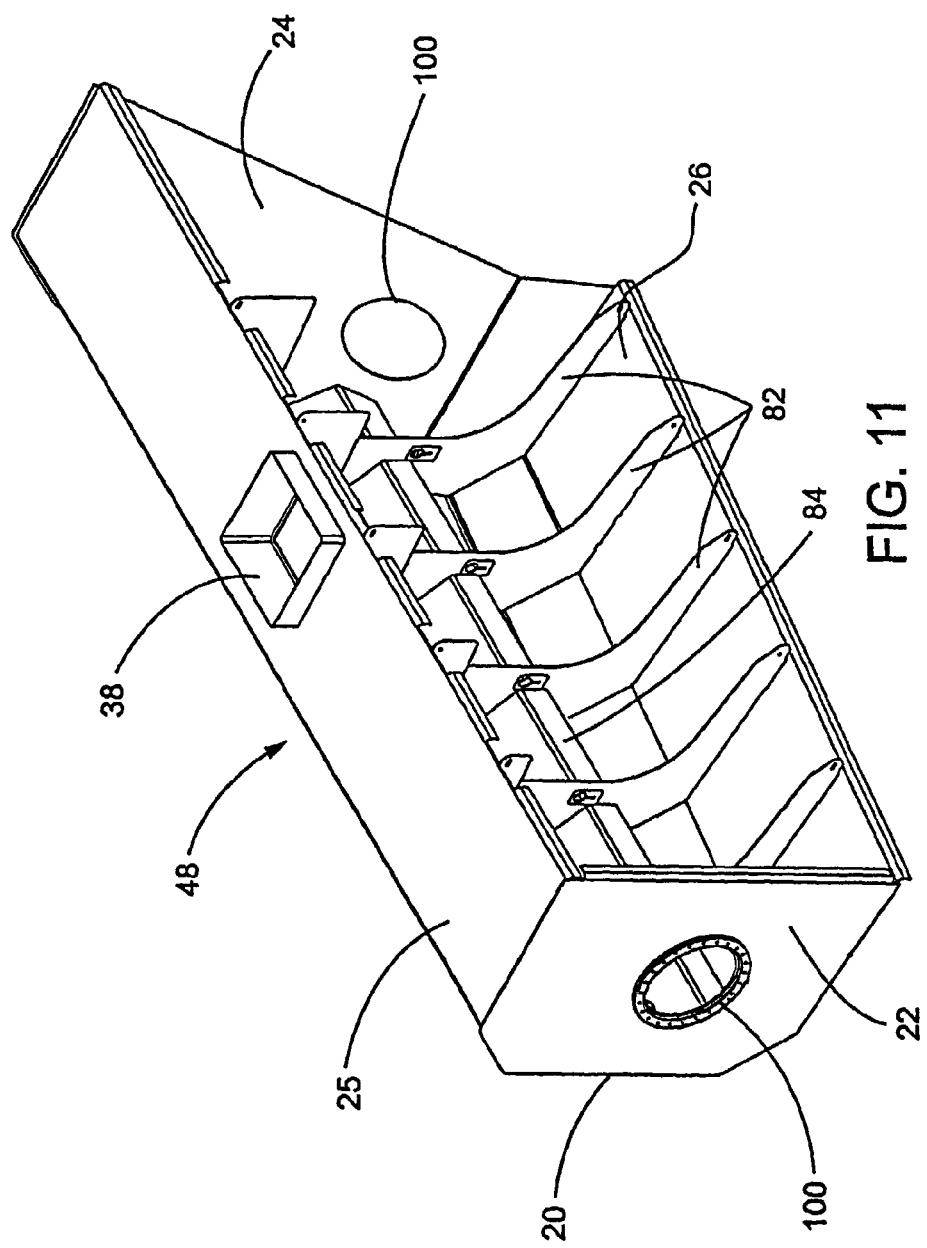
FIG. 11 is a perspective view of the inside of the left side section of the tank of FIG. 1.
Figure 12:
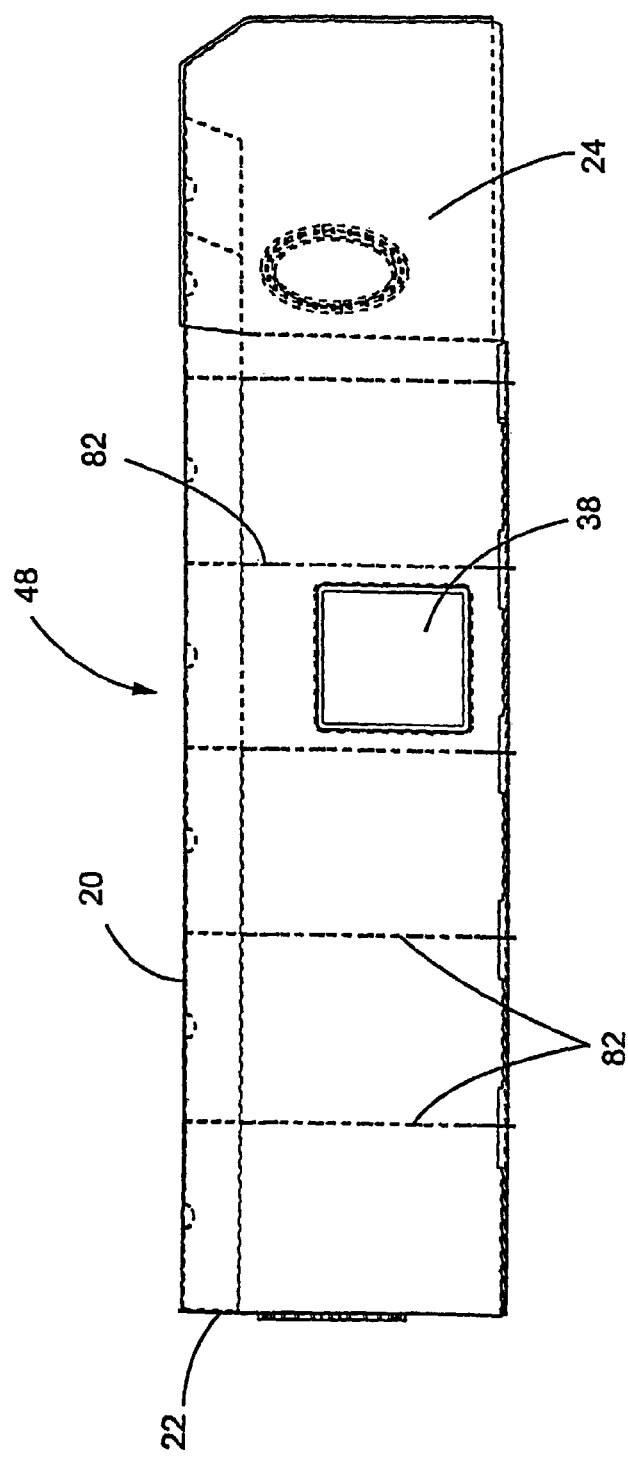
FIG. 12 is a top plan view of the left side section of the tank of FIG. 1.
Figure 13:
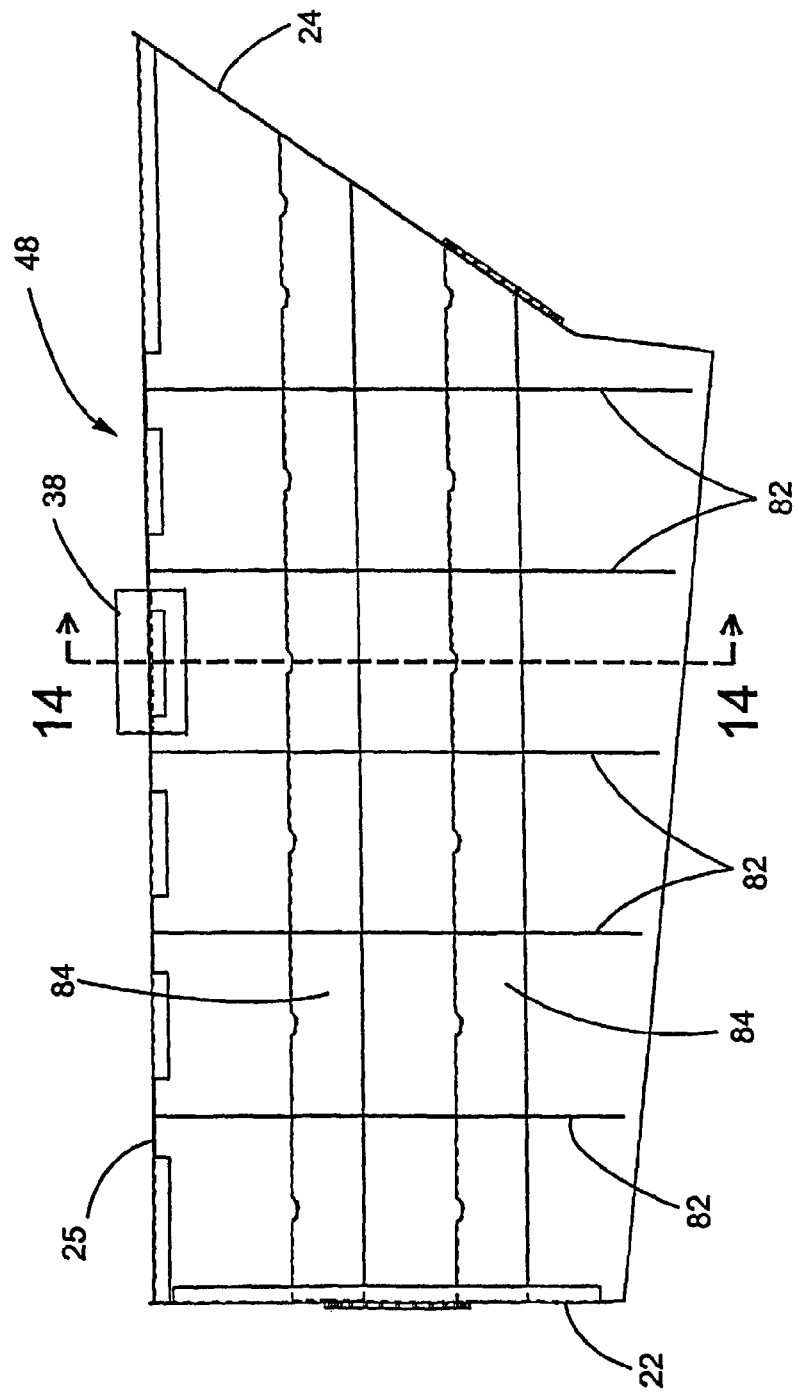
FIG. 13 is a side elevation view of the left side section of the tank of FIG. 1 looking from the inside of the center section of the tank.
Figure 15:
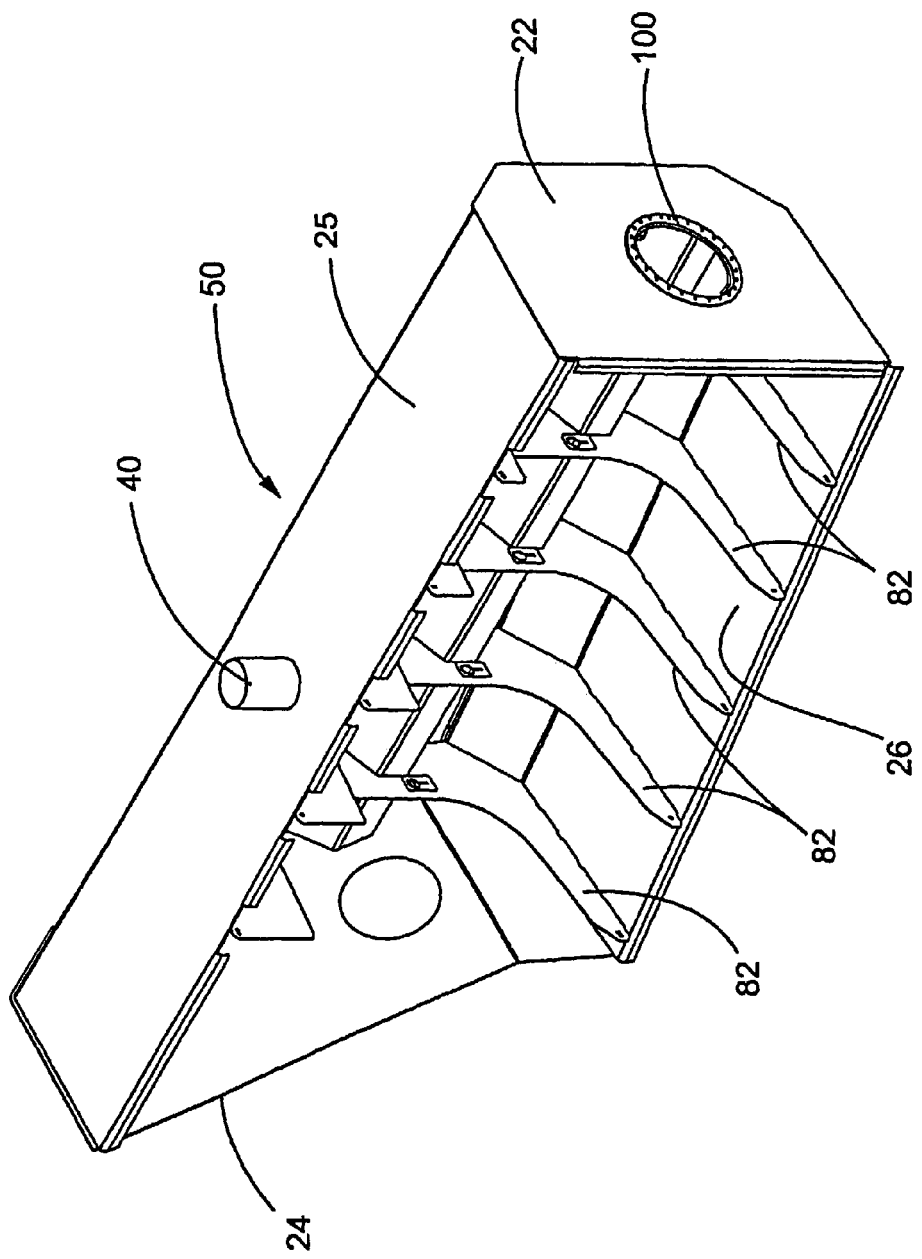
FIG. 15 is a perspective view of the right side section of the tank of FIG. 1.
Figure 16:
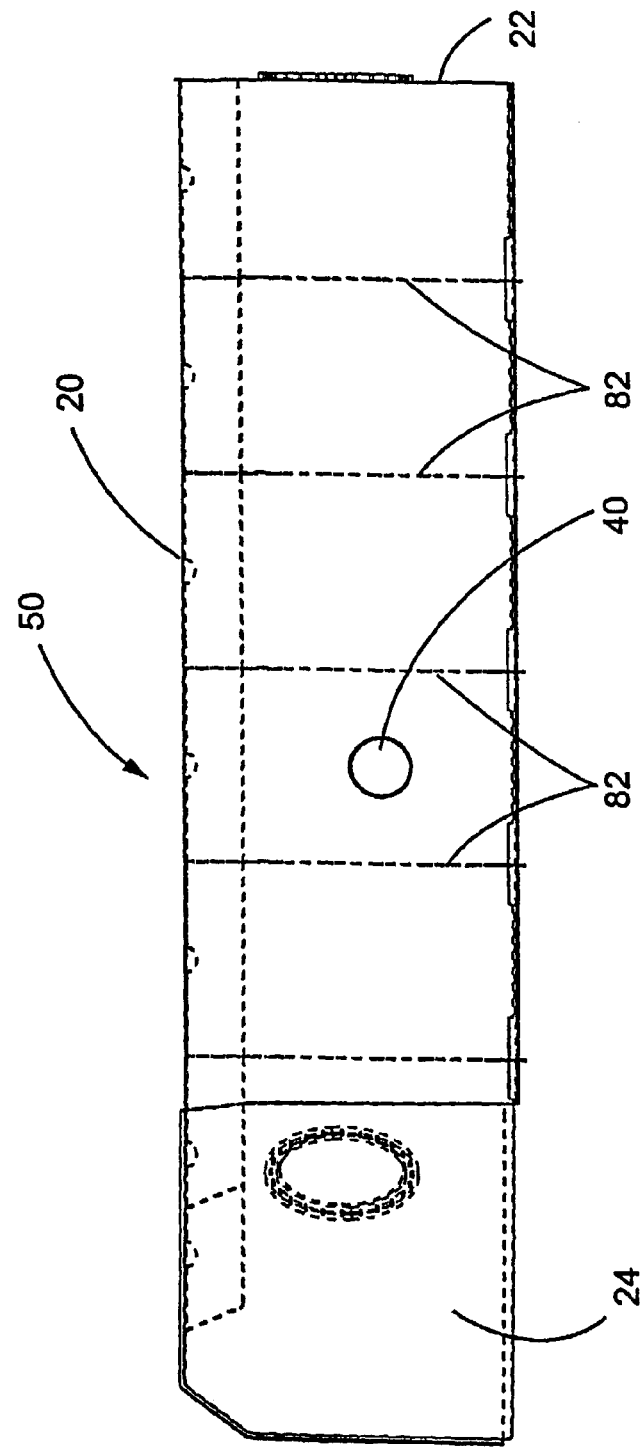
FIG. 16 is a top plan view of the right side section of the tank of FIG. 1.
Figure 17:
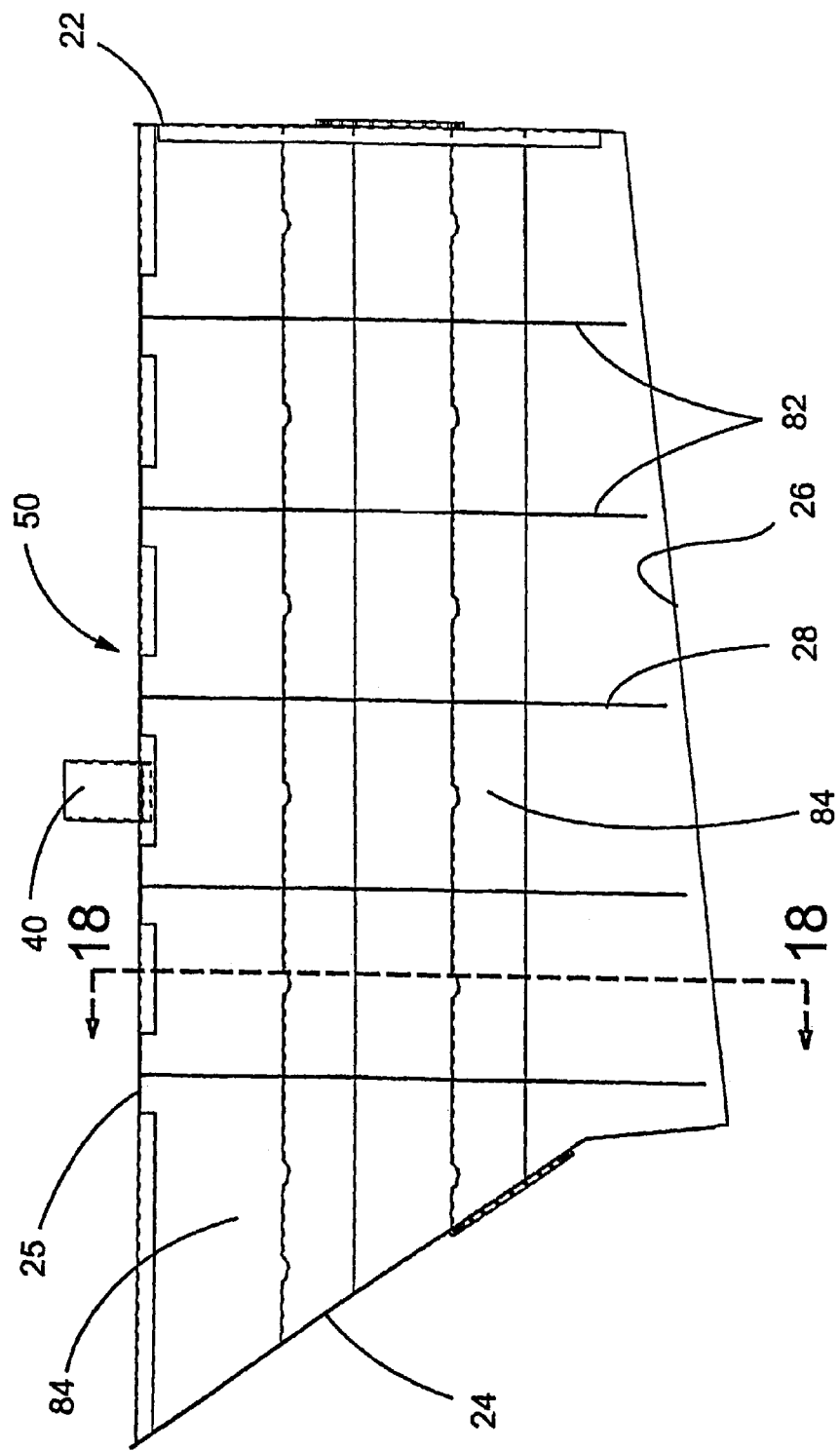
FIG. 17 is a side elevation view of the right side section of the tank of FIG. 1 looking from the inside of the center section of the tank.

According to a further aspect of the present invention, to relieve concerns regarding working in a confined space and thereby eliminate the necessity for an external secondary air supply, the tank 12 can include entry hatches 100 in the sides and/or ends of the tank. In this instance, an entry hatch 100 is provided in both the front wall 24 and rear wall 22 of the tank 12 for each of the tank sections 46, 48, 50. In particular, as best shown in FIGS. 9 and 10, an entry hatch 100 is provided at either end of the center section 46. Similarly, as shown in FIGS. 11 and 15, entry hatches 100 are provided in either end of both side sections 48, 50. These entry hatches 100 can be closed by corresponding hatch plates 102 such as shown in FIG. 2.

When work must be performed inside the tank, the hatches 100 can be opened to provide light and air into the interior of the tank. By swinging the hinged baffle doors 88 into their open positions and removing the loose fitting hatch plates 91 on the access openings in the various baffles, all of the compartments inside the tank 12 can be easily accessed thereby minimizing confined space concerns. Moreover, with the hinged baffle doors 88 in the open position, workers can see and walk from one end of the tank 12 to the other substantially unobstructed. If sized appropriately, the entry hatches 100 can also allow the hinged baffle doors 88 or other internal baffling structures to be inserted into or removed from the interior of the tank 12 after the components are assembled together.

To facilitate installation and removal of the tank from a tanker truck chassis, a plurality of uniquely configured lifting eyes 804 can be disposed on the upper surface of the tank. Such lifting eyes 804 are shown with respect to an exemplary tank 802 in FIG. 51. As shown in FIG. 52, each lifting eye 804 includes a body 806 and a reinforcing plate 808. The body 806 includes a keyed lower portion 810 and an upper portion 812 having the eye formed therein. The reinforcing plate 808 includes an opening through which the upper portion 812 of the body 806 can extend. The opening in the reinforcing plate 808 is configured such that when the body 806 is inserted through the opening, the keyed lower portion 810 of the body 806, which is larger than the opening in the reinforcing plate 808, abuts against the lower surface 814 of the reinforcing plate 808. The reinforcing plate 808, in turn, extends generally transverse to the upper portion 812 of the body 806 that contains the eye. When the body 806 and reinforcing plate 808 are installed in the top wall 815 of the tank 802, the upper portion 812 of the body 806 extends through an opening in the top wall 815 of the tank 802 such that the eye is positioned above the upper surface 816 of the tank top wall 815. The reinforcing plate 808, in turn, extends parallel to the top wall 815 of the tank 802. The reinforcing plate 808 is larger than the opening in the tank top wall 815 through which the upper portion 812 of the body 806 extends so that the upper surface 818 of the reinforcing plate 808 abuts against the lower surface 820 of the tank top wall 815. Thus, the reinforcing plate 808 helps to distribute the load applied to the top wall 815 of the tank when the tank 802 is lifted using the lifting eyes.

Figure 23:
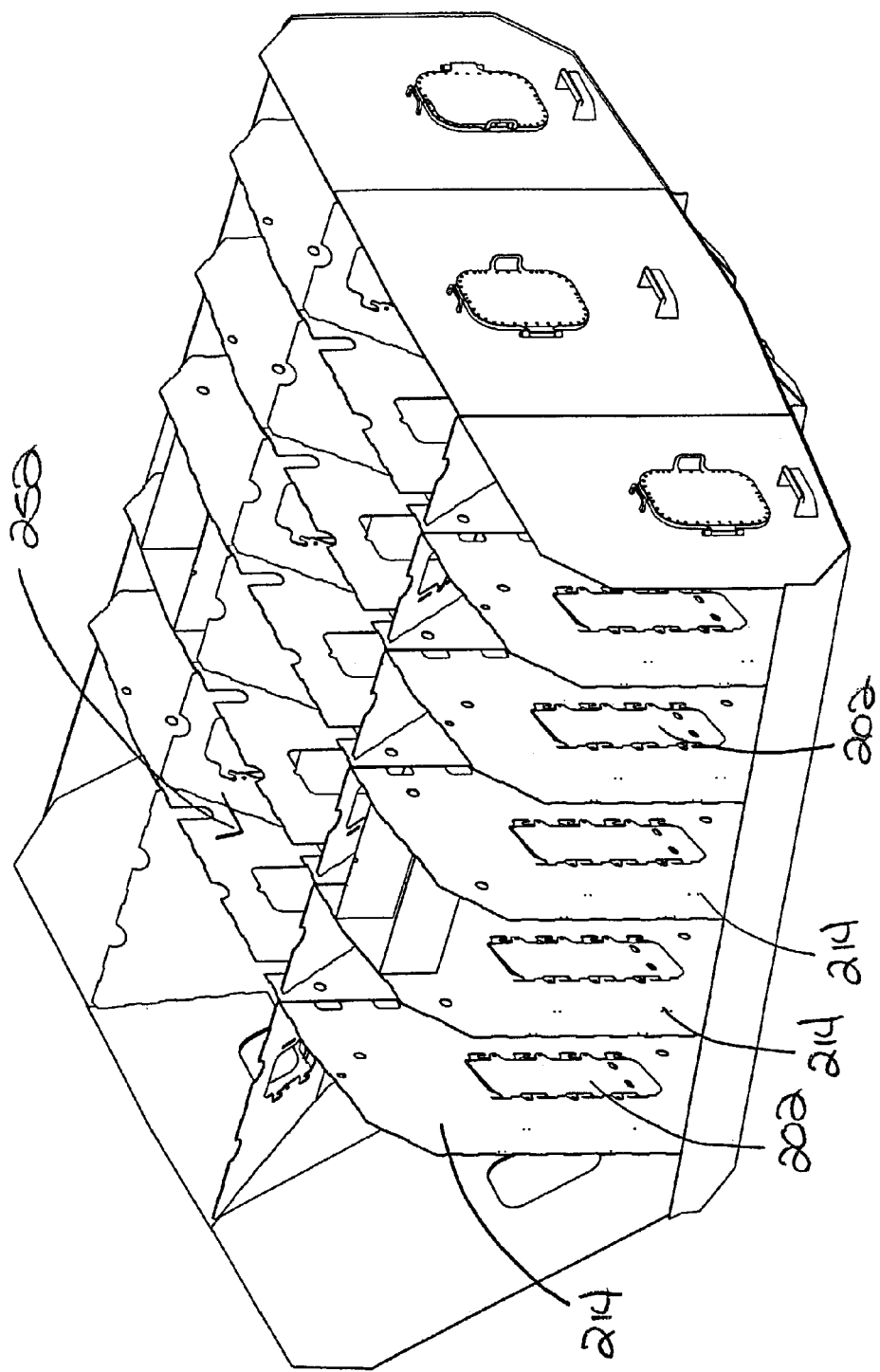
FIG. 23 is a perspective view of the baffle system of the tank of FIG. 1 showing an alternative pivotal baffle door configuration with the pivotal baffle doors in the closed position.
Figure 24:
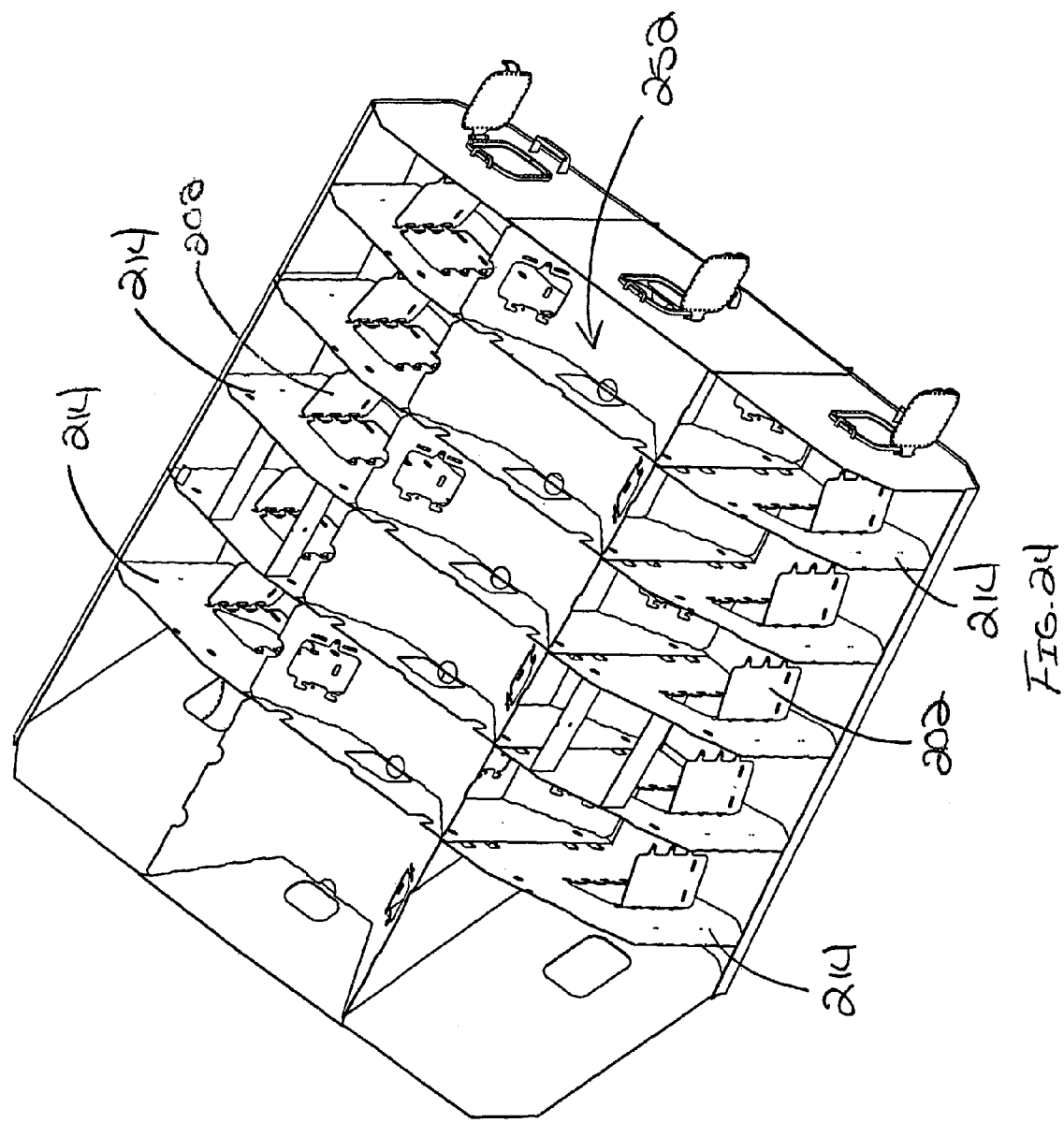
FIG. 24 is a perspective view of the tank baffle system and alternative pivotal baffle door configuration of FIG. 23 with the pivotal baffle doors in the open position.
Figure 25:
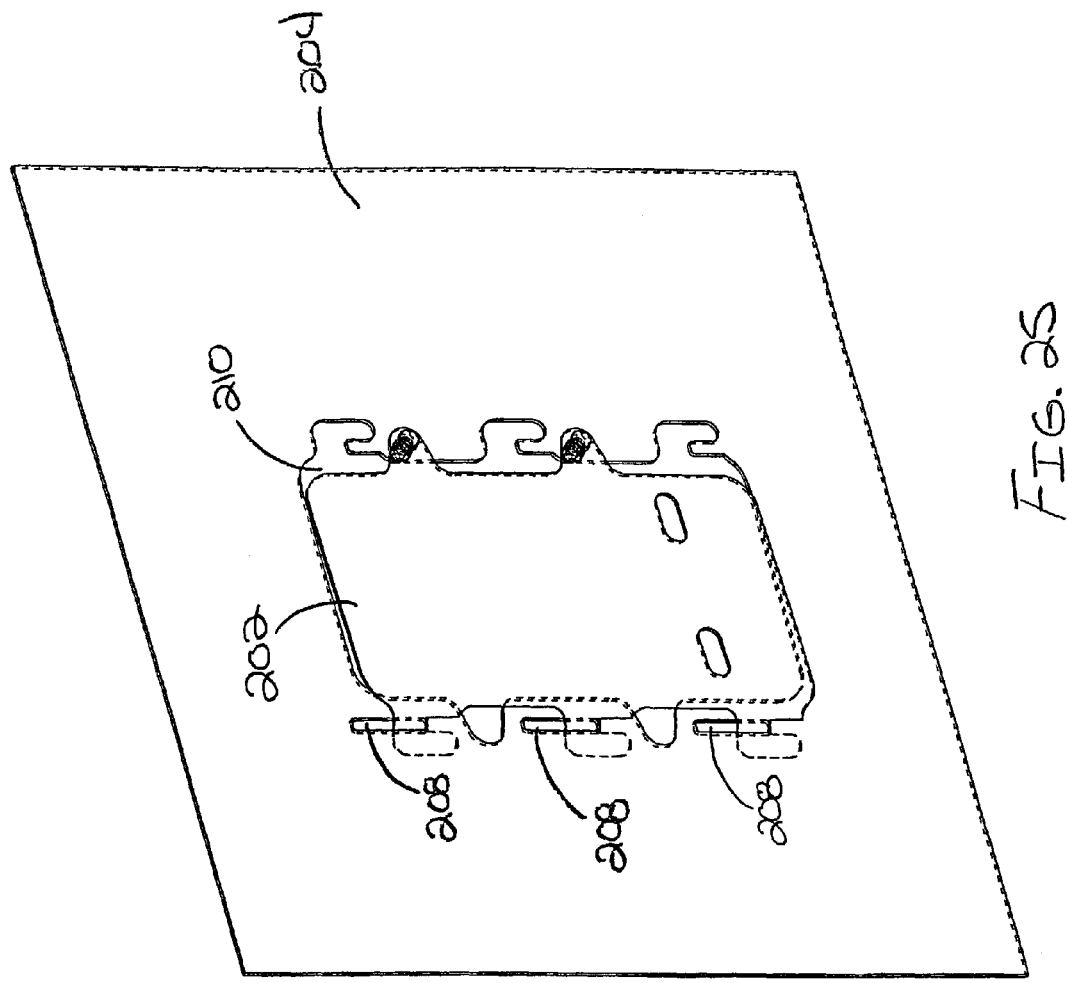
FIG. 25 is a perspective view of one of the pivotal baffle doors of FIG. 23 installed in a baffle.
Figure 26:
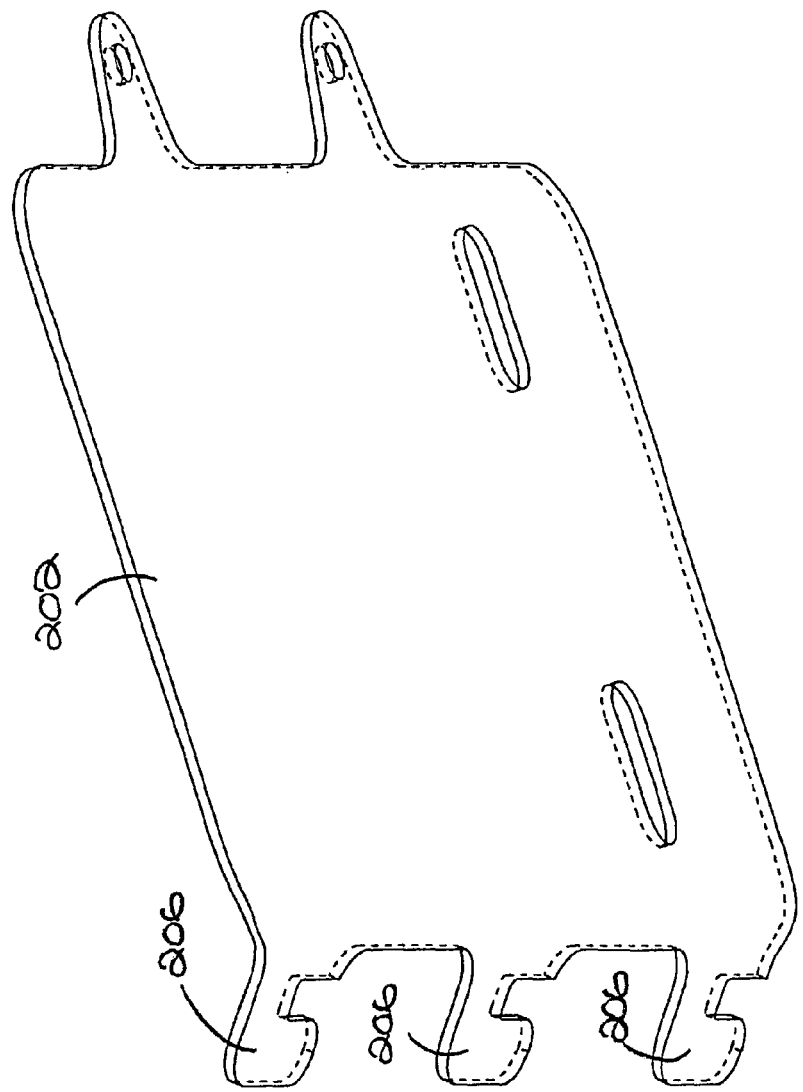
FIG. 26 is a perspective view of one of the pivotal baffle doors of FIG. 23.
Figure 27:
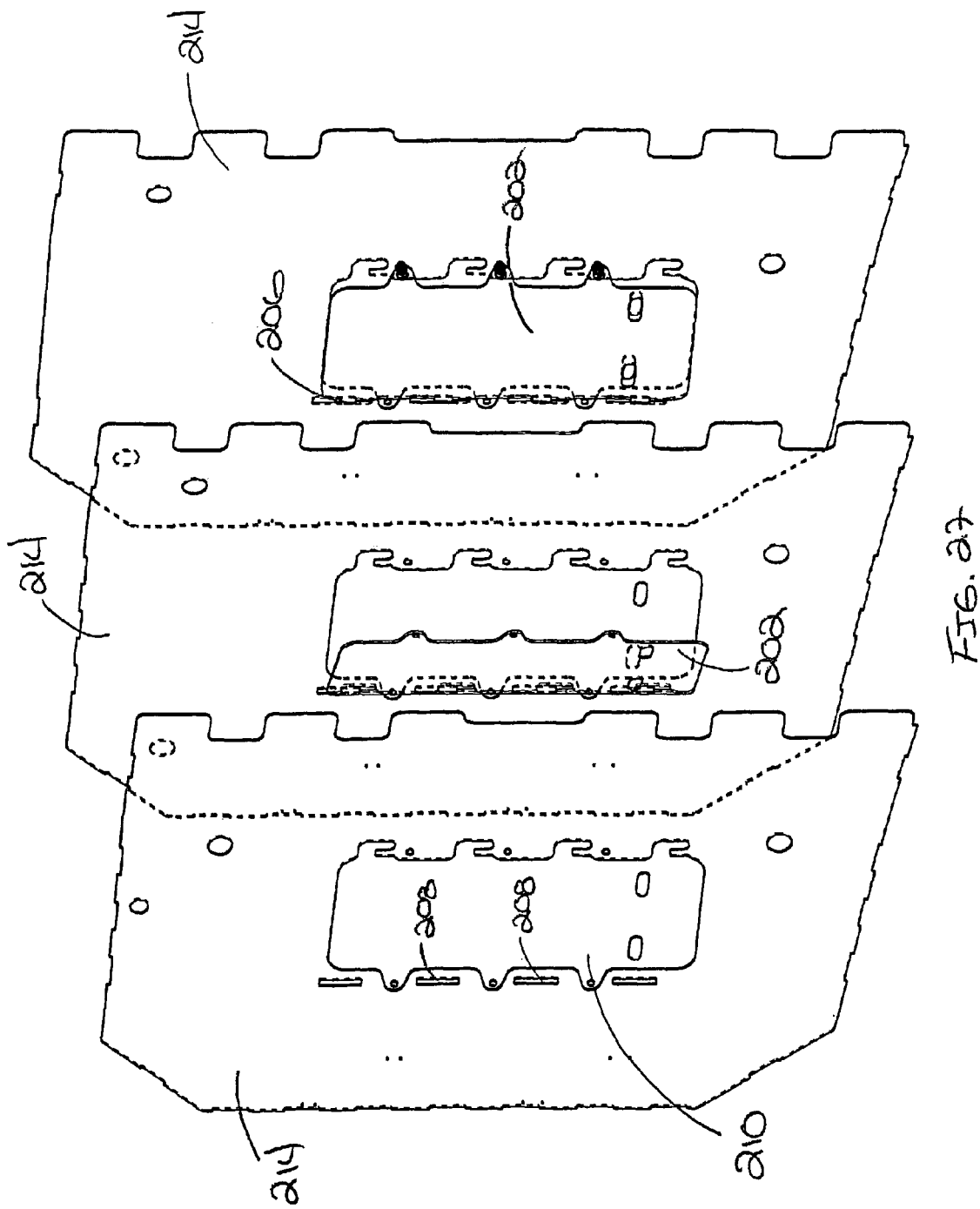
FIG. 27 is a schematic drawing showing three baffles. The first baffle has an access opening therein, but does not have a baffle door. The second baffle has an alternative baffle door in the open position. The third baffle has the alternative baffle door in the closed position.

In an alternative embodiment illustrated in FIGS. 23 and 24, each of the hatch plates associated with the access openings in the baffles is in the form of a pivotal baffle door 202 that is movable between open and closed positions. In the illustrated embodiment, each pivotal baffle door 202 is supported for pivotal movement on the corresponding baffle (a generic baffle section 204 is shown in FIG. 25) by hinges. As shown, the hinges can comprise tabs/hooks 206 that extend at an angle from an edge of the pivotal baffle door 202 (see FIG. 26) and are received in corresponding slots 208 provided in the baffle 204 adjacent the access opening 210 (see FIG. 25). In contrast to conventional hinges, the tabs/hooks 206 will not fail as a result of rust despite being submerged in water thereby helping to ensure reliable operation of the pivotal baffle doors 202. The pivotal baffle doors 202 can be secured in the closed position by any suitable means such as bolts or chains. To provide added strength, the pivotal baffle doors 202 can be bent as shown in FIG. 27. As will be appreciated by those skilled in the art, the pivotal baffle doors 202 or hatch plates 91 used to provide access through the various baffles can have any suitable configuration that allows the door or plate to be moved between open and closed positions.

Figure 28:
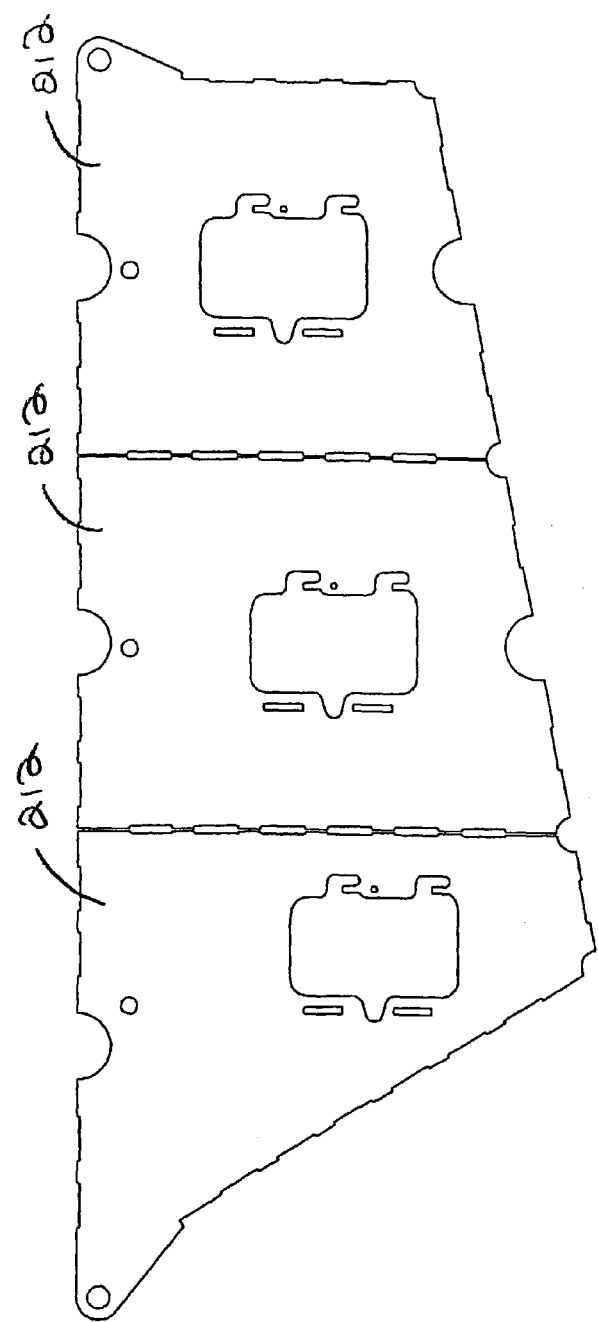
FIG. 28 is a plan view of three baffles showing the first step in a process for creating the access openings and baffle doors of the embodiment illustrated in FIG. 23.
Figure 29:
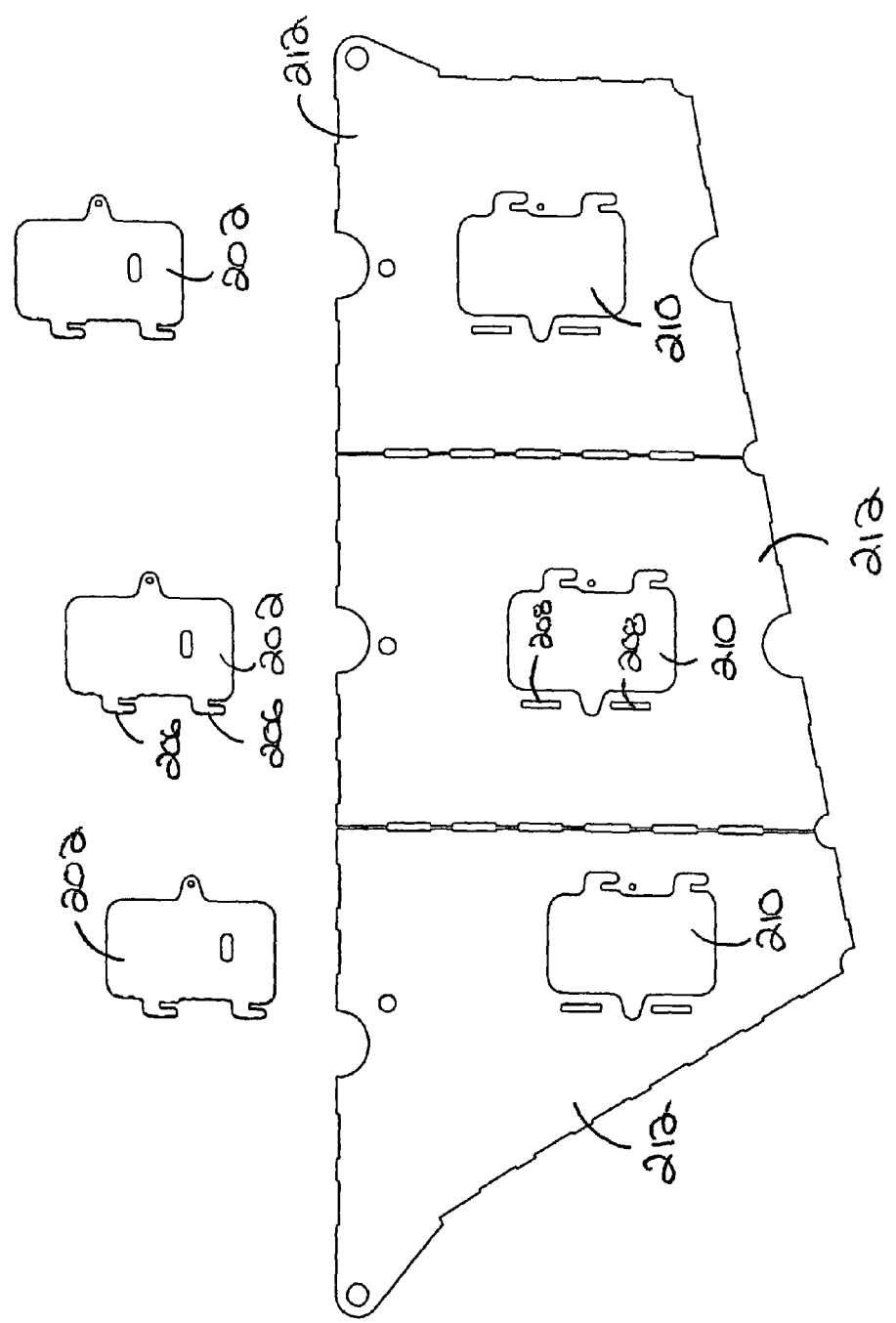
FIG. 29 is a plan view of three baffles and three baffle doors showing the second step in a process for creating the access openings and baffle doors of the embodiment illustrated in FIG. 23.
Figure 30:
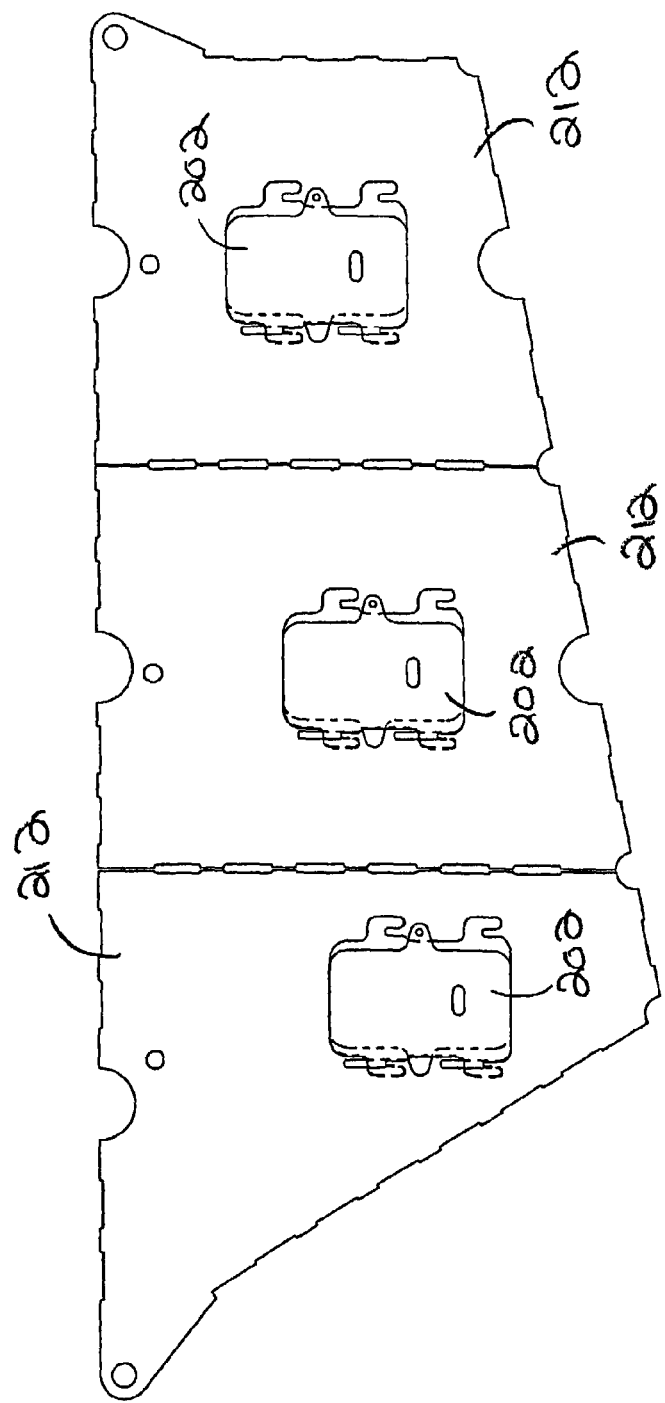

Advantageously, with the illustrated embodiment, the pivotal baffle doors 202 also can be formed from the pieces that are cut out of the baffles 204 to create the access openings 210. Specifically, for a particular pivotal baffle door 202, the door skeleton is first cut out of (FIG. 28) and separated from (FIG. 29) one of the baffle pieces 212. As shown in FIG. 29, the door skeleton includes the main body of the pivotal baffle door 202 as well as the tabs/hooks 206. In addition, the slots 208 for the tabs/hooks 206 are also cut out of the baffle piece 212. The tabs/hooks 206 are then bent and the pivotal baffle door 202 is flipped over and the pivotal baffle door 202 hung by inserting the tabs/hooks 206 into the slots 208 as shown in FIG. 30.

In the embodiment illustrated in FIGS. 23-24, side baffles 214 (shown individually in FIG. 27) having central pivotal baffle doors 202 are provided to either side of the center X-shaped baffle arrangement 252. In particular, the side baffles 214 extend from the center X-shaped baffle arrangement 252 to the inside surface of the sidewall of the tank. Like the lateral baffle doors 88 of the embodiment illustrated in FIGS. 1-22, the pivotal baffle doors 202 in the side baffles 214 pivot between a closed position wherein the pivotal baffle door 202 extends laterally (FIG. 23) and an open position wherein the pivotal baffle door 202 extends more longitudinally (FIG. 24). However, the pivotal baffle doors 202 are relatively smaller than the lateral baffle doors 88 used in the embodiment illustrated in FIGS. 1-22 and, thus, are easier to move between the open and closed positions.

Figure 31:
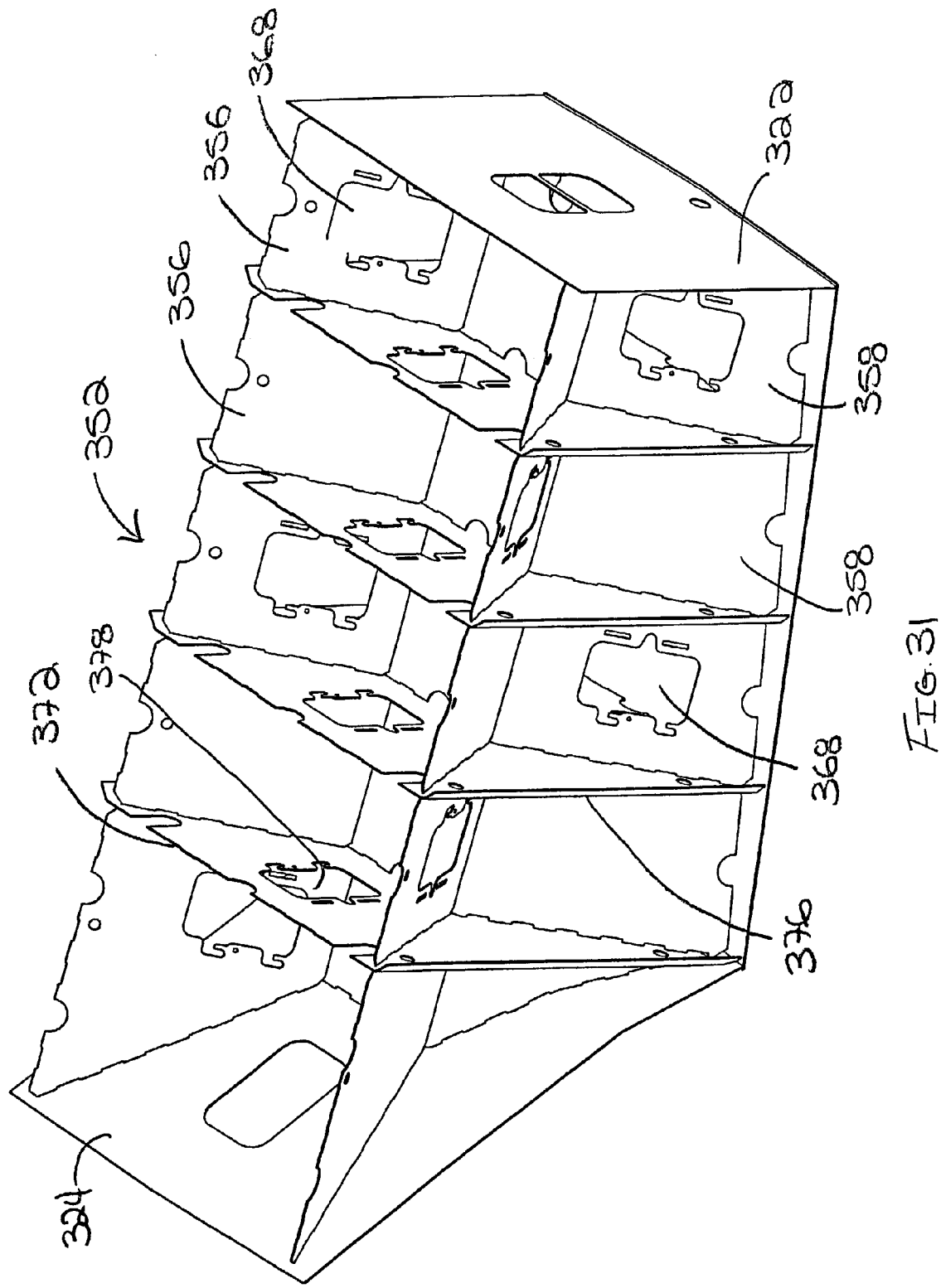
FIG. 31 is a perspective view of the center section of an alternative internal baffle system for a tank according to the present invention.
Figure 32:
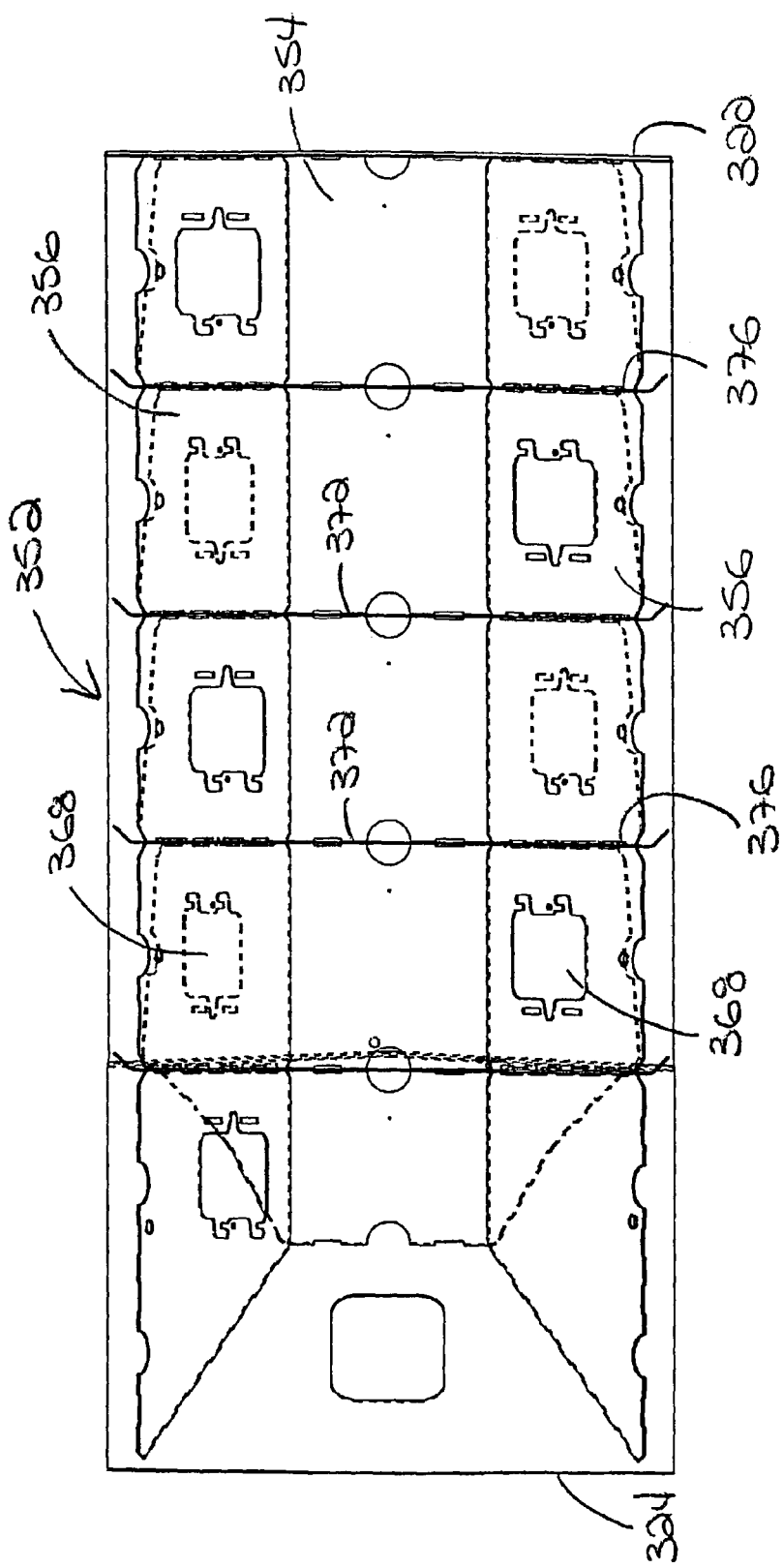
FIG. 32 is a top plan view of the alternative internal baffle system of FIG. 31.
Figure 33:
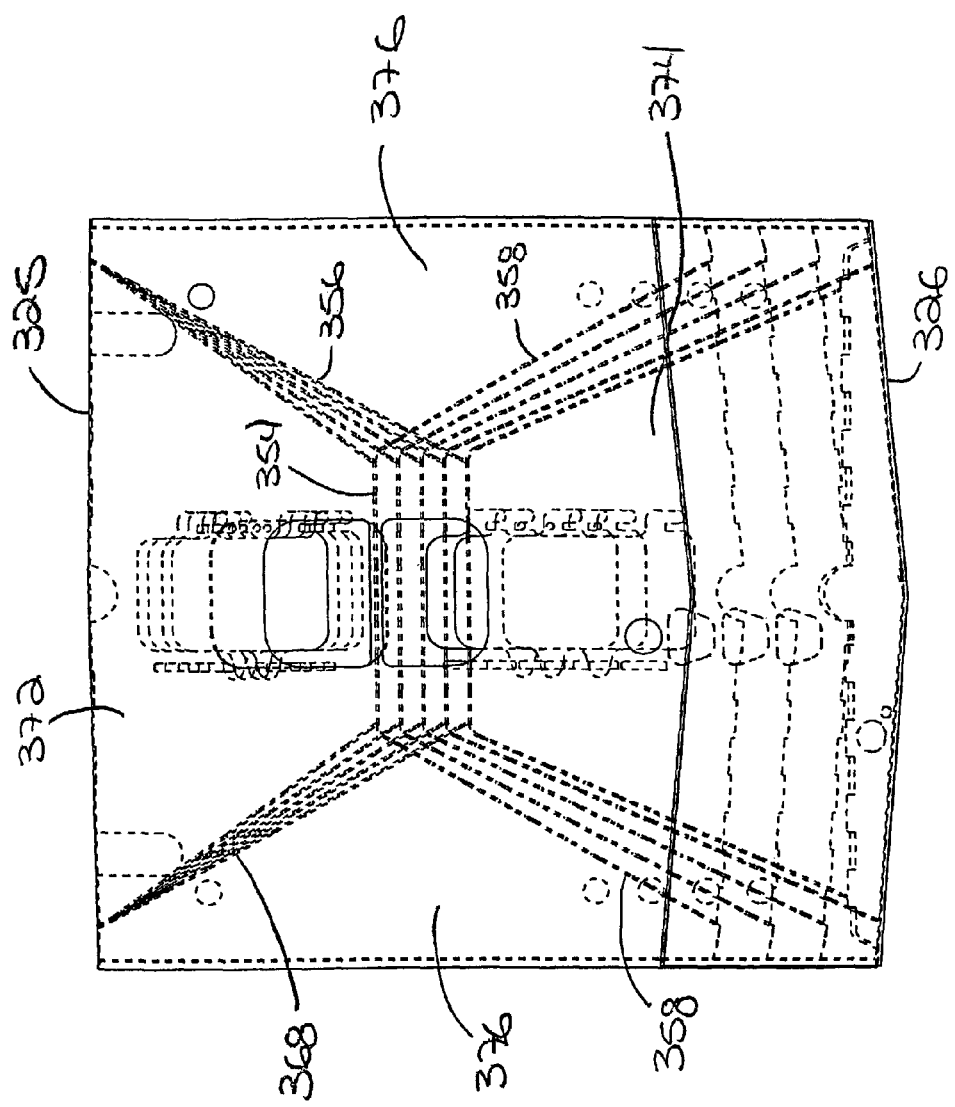
FIG. 33 is an end view of the alternative internal baffle system of FIG. 31.
Figure 34:
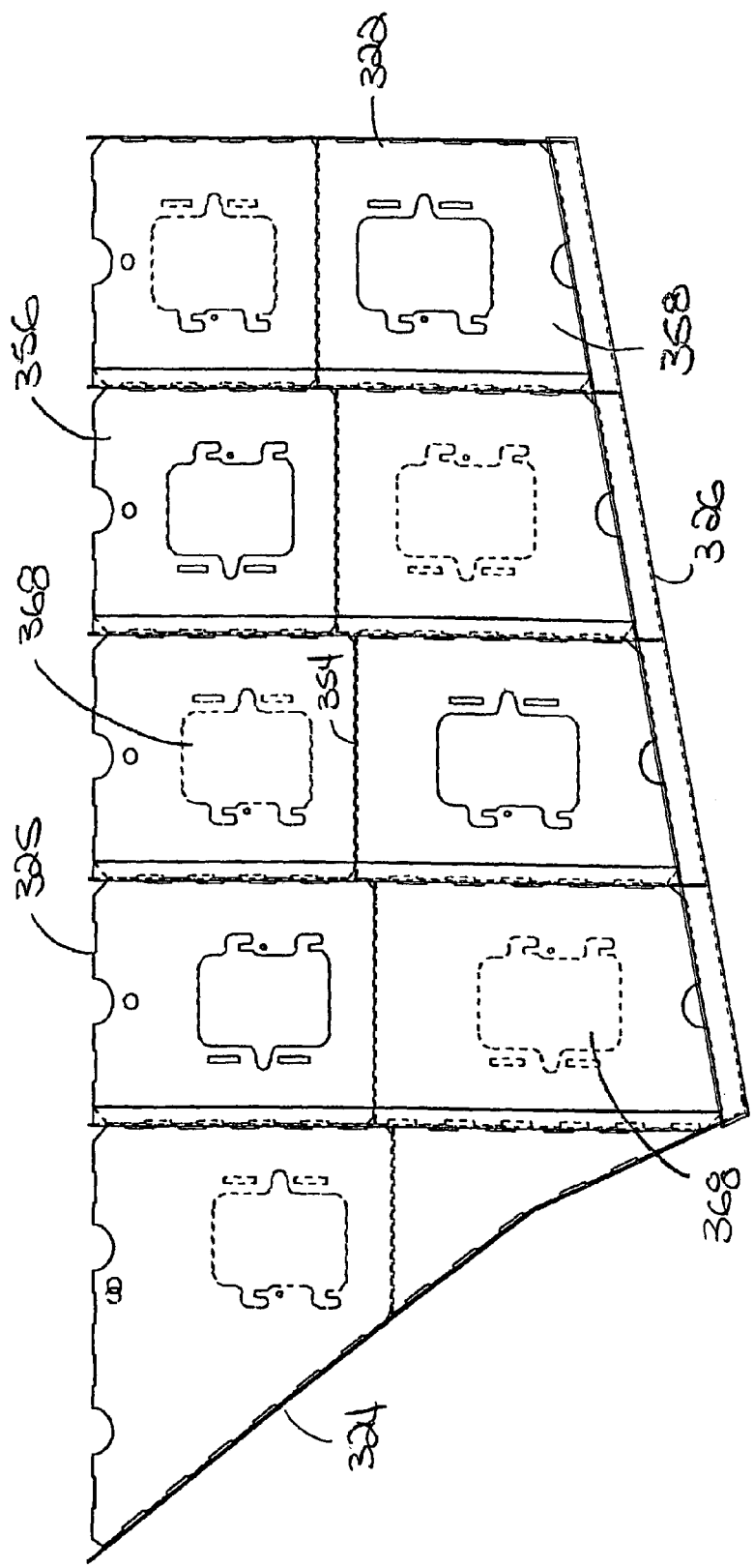
FIG. 34 is a side elevation view of the alternative internal baffle system of FIG. 31.

An alternative baffle system incorporating an X-shaped longitudinal baffle arrangement 352 that is particularly suited for relatively smaller tanks is shown in FIGS. 31-34. The X-shaped longitudinal baffle arrangement 352 illustrated in FIGS. 31-34 is generally similar to the X-shaped baffle arrangement 52 of the embodiment illustrated in FIG. 3 except that it does not include a longitudinally extending center chamber. Specifically, the X-shaped longitudinal baffle arrangement 352 includes a horizontal center baffle 354, upper baffle legs 356 and lower baffle legs 358. As best shown in FIG. 33, the upper baffle legs 356 extend between the horizontal center baffle 354 and the top wall 325 of the tank and the lower baffle legs 358 extend between the horizontal center baffle 354 and the floor 326 of the tank. The horizontal center baffle 354 and upper and lower baffle legs 356, 358 extend longitudinally through the tank between the front and rear walls of the tank as shown in FIGS. 31, 33 and 34. To provide access through the upper 356 and lower baffle legs 358, access openings 368 are provided therein at spaced intervals along the length thereof.

To limit longitudinal wave action and surging of fluid, vertically extending lateral baffles 372, 374 and 376 are arranged between the upper 356 and lower baffle legs 358 of the X-shaped longitudinal baffle arrangement 352. Specifically, an upper lateral baffle 372 is provided between the upper baffle legs 356 and a lower lateral baffle 374 is provided between the lower baffle legs 358 at spaced intervals along the length of the X-shaped longitudinal baffle arrangement 352. Moreover, side lateral baffles 376 are provided to either side of the X-shaped longitudinal baffle arrangement 352 at spaced intervals along the length thereof. To provide access into the compartments formed in the upper and lower portions of the X-shaped longitudinal baffle arrangement by the lateral baffles 372, 374 and 376, access openings 378 are provided in each of the upper 372 and lower lateral baffles 374. At least one of the access openings 368 in the upper 356 and lower baffle legs 358 is also arranged between each pair of upper 372 and lower lateral baffles 374 and side lateral baffles 376 to ensure that there is adequate access into each of the compartments defined by the baffles. Each of these access openings 368, 378 is configured to receive an associated pivotal baffle door like the baffle doors 202 illustrated in FIGS. 25-30. As with the embodiment illustrated in FIGS. 1-22, when selected ones of the baffle doors associated with the access openings in the various baffles are open, it is possible for workers to traverse from the entry hatch in the rear wall of the tank to the entry hatch in the front wall of the tank.

Figure 35:
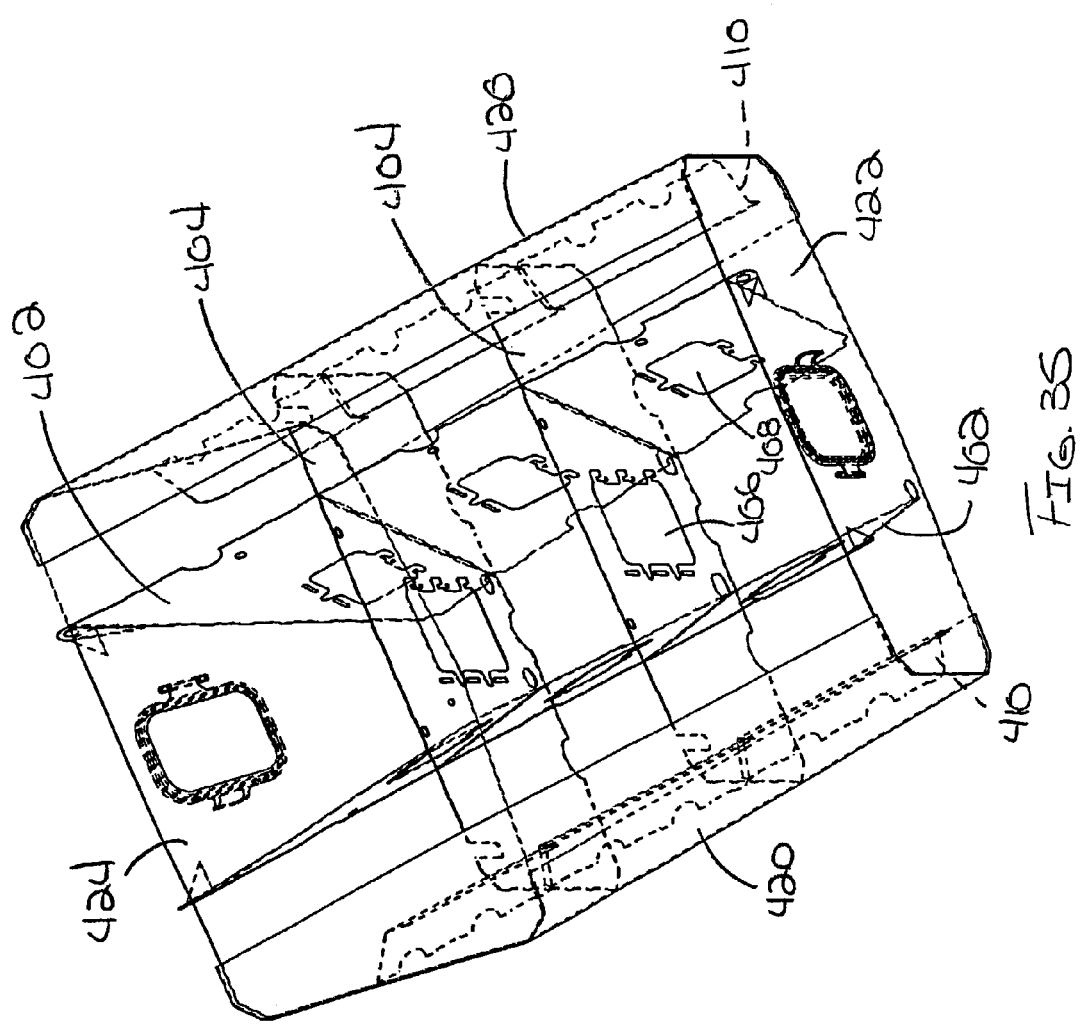
FIG. 35 is a perspective view of another alternative internal baffle system for a tank according to the present invention.
Figure 36:
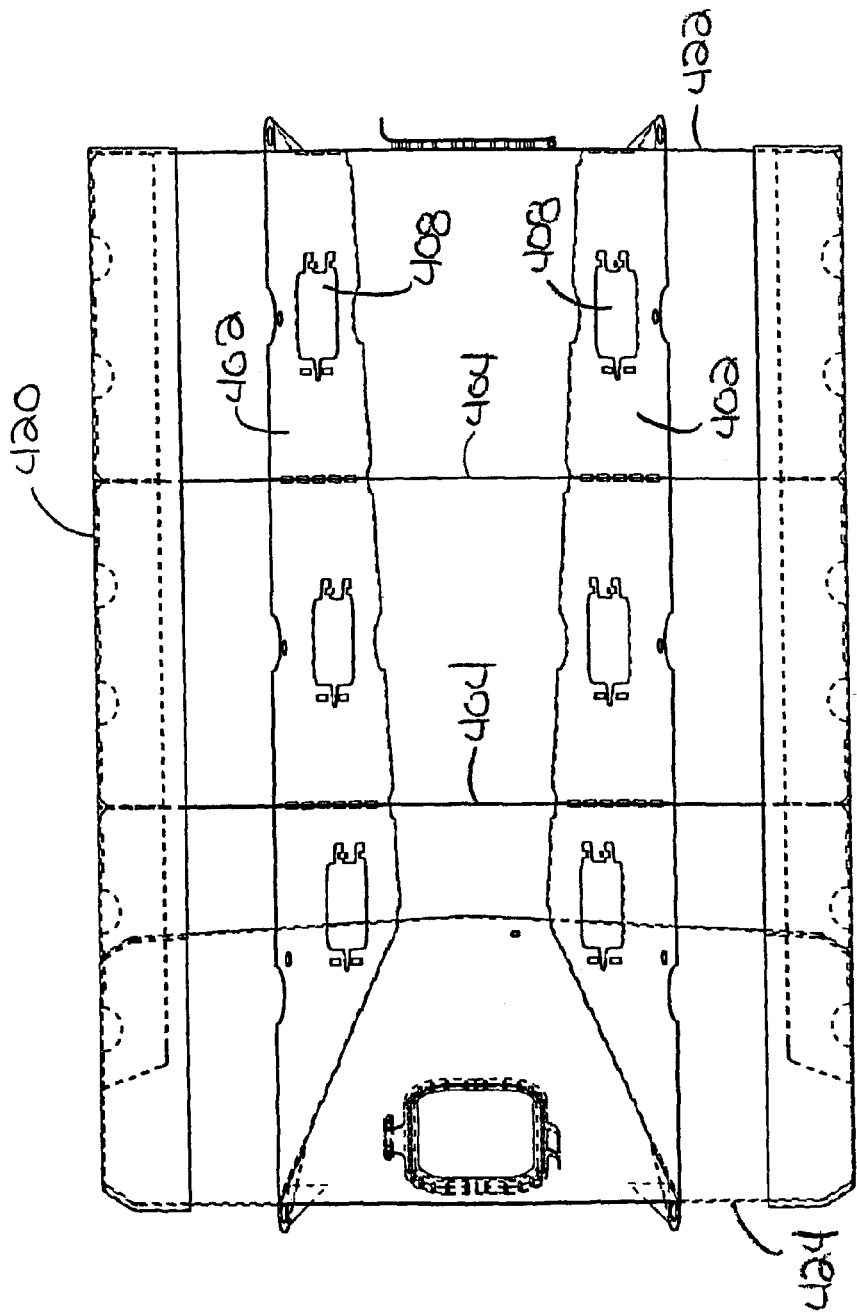
FIG. 36 is a top plan view of the alternative tank internal baffle system of FIG. 35.
Figure 37:
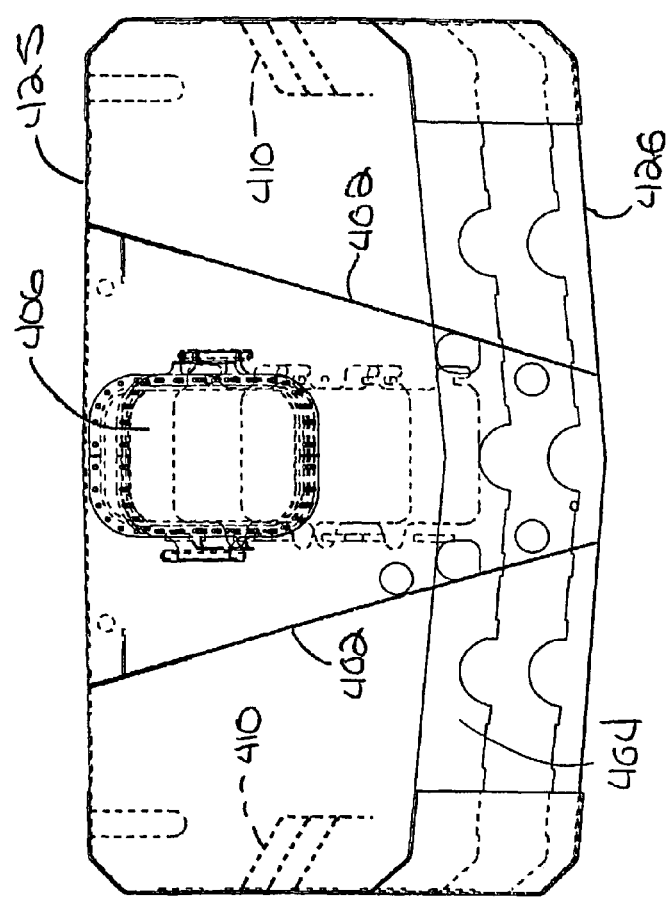
FIG. 37 is an end view of the alternative tank internal baffle system of FIG. 35.

Another baffle system particularly suited for relatively small tanks is shown in FIGS. 35-37. Unlike the embodiments illustrated in FIGS. 1-22 and FIGS. 31-34, the baffle system illustrated in FIGS. 35-37 does not include an X-shaped center baffle arrangement. Instead, as best shown in FIGS. 35 and 36, the baffle system includes a plurality of longitudinally extending baffles 402 which extend between the front and rear walls 424, 422 of the tank and a plurality of lateral baffles 404 that extend between the sidewalls 420 of the tank. The tank further includes sidewall baffles/surge suppressors 410 on the sidewalls 420 of the tank as shown in FIG. 37. Each of the lateral baffles 404 is provided with a central access opening 406 and each longitudinal extending baffle 402 includes a plurality of longitudinally spaced access openings 408 so as to provide a means for accessing each of the compartments in the tank defined by the baffles. Again, each of these access openings 406, 408 is configured to receive a pivotal baffle door like that illustrated in FIGS. 25-30 and when selected ones of the doors are open it is possible for a person to traverse between the entry hatch in the front wall 424 of the tank and the entry hatch in the rear wall 422 of the tank.

To drive the fluid pump associated with the tank, a hydraulic motor can be provided which is, in turn, powered by the hydraulic system of the tanker truck. Specifically, tanks that are to be used in off-highway applications are often mounted to off-highway dump or scraper trucks that have been converted by removal of the dump body or scraper bowl. Such trucks typically are equipped with a hydraulic fluid system that can be used to drive a hydraulic motor and fluid pump associated with the tank. Because the hydraulic systems on these trucks are typically used for dumping loads, they can produce relatively high flow rates and pressures. For example, depending on the vehicle size, the hydraulic systems on these trucks may produce a flow rate of 100-200 gallons per minute at a pressure of up to 2500-3000 psi at normal truck engine operating speeds. Such flow rates and pressures do not pose problems for the hydraulic cylinders that are typically used to dump loads. However, these flow rates and pressures can cause problems when the truck hydraulic system is tied into a hydraulic motor such as is used to power the fluid pump for a tank.

In particular, starting the hydraulic motor at the full fluid flow and pressure that the truck's hydraulic system produces at normal engine operating speeds can subject the hydraulic motor and the fluid pump associated with the tank to a significant shock load. For example, the hydraulic motor associated with a tank may be designed to turn at approximately 2000 RPM at full hydraulic flow. Thus, in such a case, at start-up, the hydraulic motor essentially would have to accelerate instantaneously to 2000 RPM in order to alleviate the shock of the hydraulic fluid supplied by the truck hydraulic system. Obviously, the hydraulic motor is not capable of such rapid acceleration. Moreover, since the hydraulic motor is connected through a coupling to the fluid pump, the inertia caused by the fluid pump impeller and any fluid in the pump also has to be overcome at start-up. Thus, unless the hydraulic motor is engaged at a fairly low hydraulic flow, i.e. idle RPM of the transport vehicle, the hydraulic motor and the fluid pump will be subjected to substantial shock loads at start-up. These shock loads could over time result in damage to the coupling between the hydraulic motor and the fluid pump as well as damage to the hydraulic motor itself.

Figure 39:
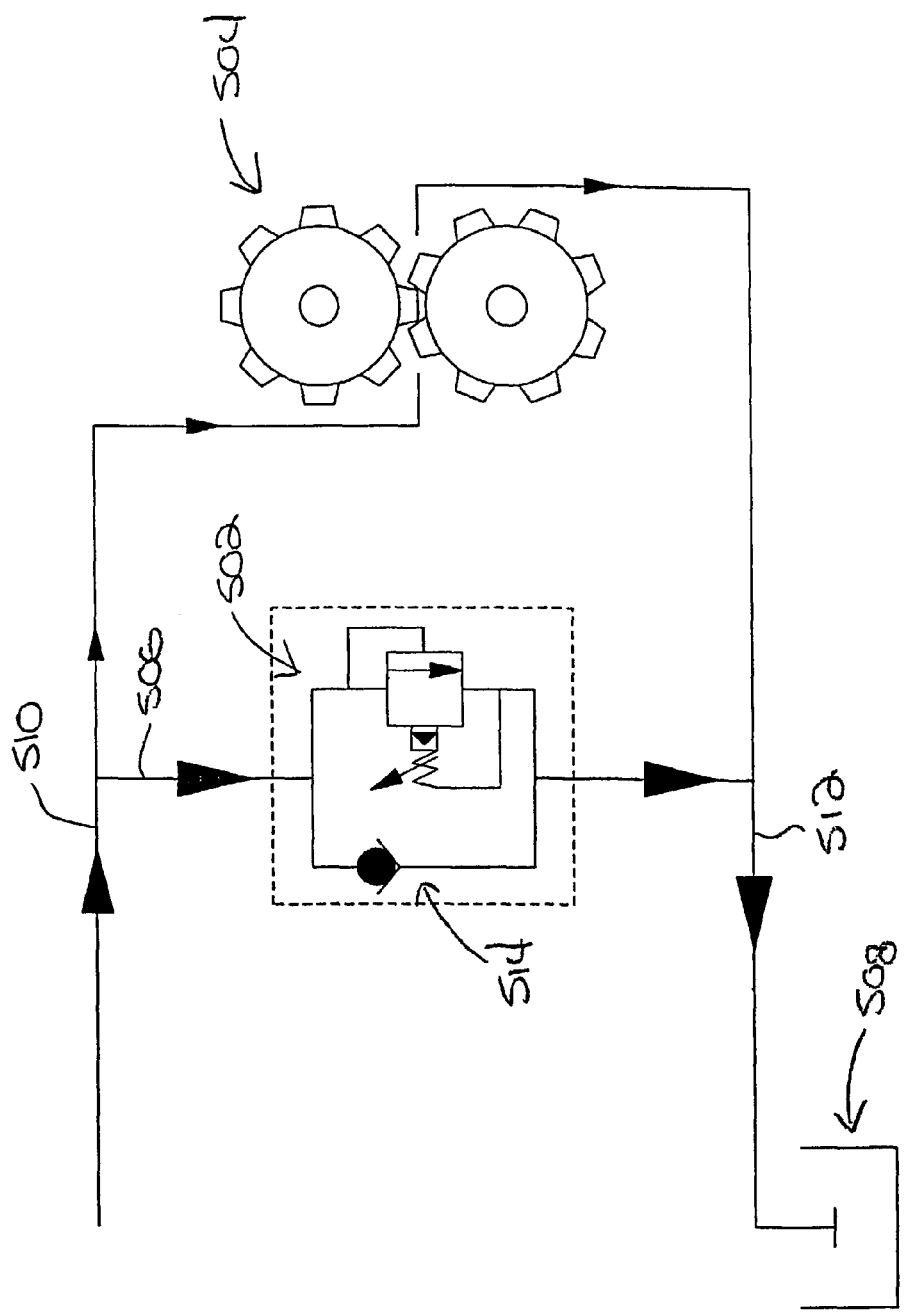
FIG. 39 is a schematic drawing of the hydraulic circuit of FIG. 38 operating when the hydraulic drive motor for the fluid pump is first started.

To help protect the hydraulic motor and fluid pump during start-up, a soft start/stop system can be provided. With reference to FIGS. 38-41, to provide such a soft-start/stop system, a hydraulic valve 502 is provided in a bypass line 506 that extends parallel to the hydraulic motor 504 supply line that powers the tank fluid pump (not shown in FIGS. 38-41). This hydraulic valve 502 permits hydraulic fluid supplied through a supply line 510 from the truck hydraulic system, particularly at high truck engine RPMs, to bypass the hydraulic motor 504 through the parallel bypass line 506 and return to the truck hydraulic fluid tank 508 (via tank line 512) until the hydraulic motor 504, coupling and fluid pump come up to normal operating RPM. FIG. 39 is a schematic diagram of the soft start/stop system operating in the fluid pump start-up mode with the hydraulic valve 502 open so as to allow the flow of hydraulic fluid through the parallel bypass line 506 (arrows show the flow of hydraulic fluid through the system). According to one embodiment of the present invention, the hydraulic valve 502 comprises a standard pressure relief valve that preferably opens relatively quickly (e.g., 10-50 milliseconds) after pressure is sensed at both the inlet port of the hydraulic motor 504 and the hydraulic valve 502. The pressure relief valve can be either direct or pilot-operated.

Figure 40:
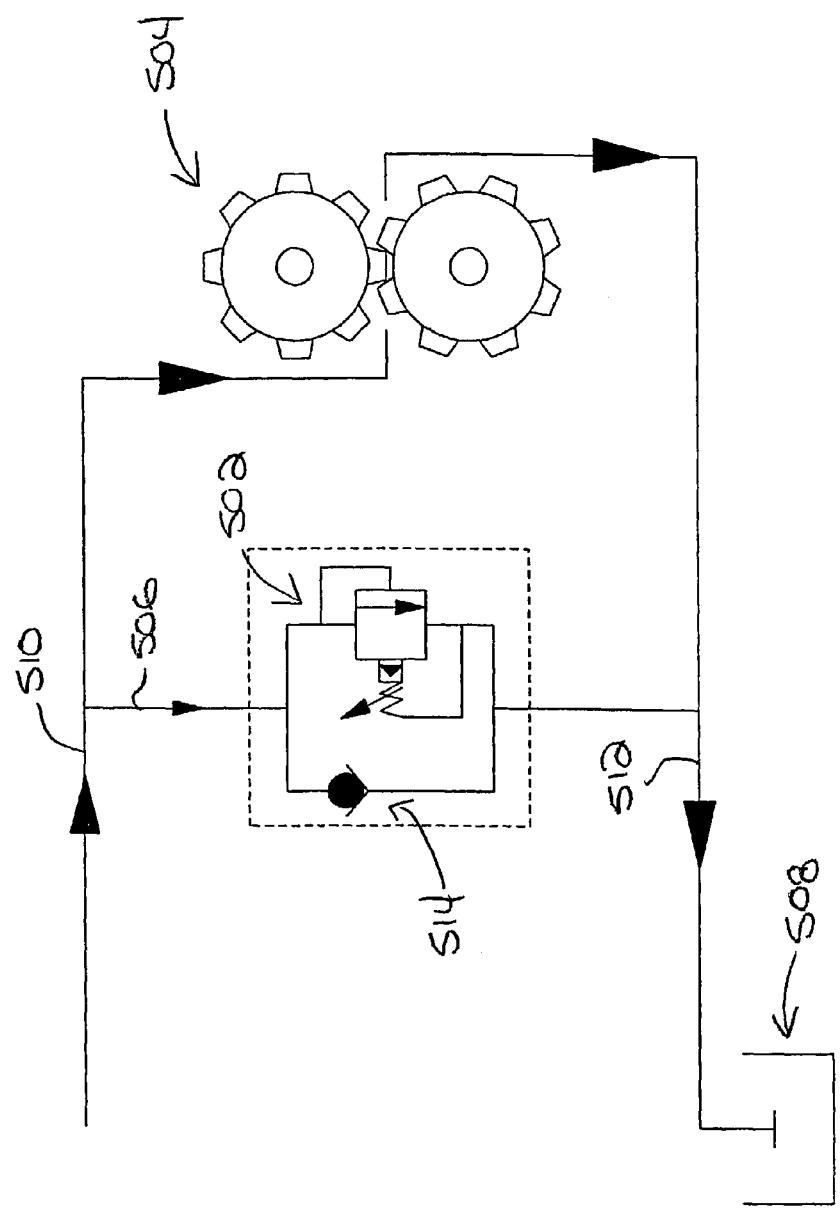
FIG. 40 is a schematic drawing of the hydraulic circuit of FIG. 38 operating when the hydraulic drive motor and fluid pump have reached their normal operating revolutions per minute (RPM).

Once the hydraulic pressure relief valve 502 opens, the hydraulic fluid flow that the hydraulic motor 504 is unable to accept as it accelerates to full operating speed is allowed to bypass the hydraulic motor 504 through the parallel bypass line 506 and return to the truck hydraulic fluid tank 508. As the hydraulic motor 504 begins to come up to normal operating RPM, it is able to accept more of the hydraulic fluid thereby reducing the pressure at the inlet to the hydraulic pressure relief valve 502. As a result, the hydraulic pressure relief valve 502 gradually closes so that more of the hydraulic fluid flow from supply line 510 goes through the hydraulic motor 504. Once the hydraulic motor 504 nears or reaches its normal operating RPM, the hydraulic pressure relief valve 502 closes completely and all the hydraulic fluid from the truck hydraulic supply line 510 flows through the hydraulic motor 504 allowing the fluid pump to operate at full capacity. FIG. 40 is a schematic diagram of the soft start/stop system operating in a fluid pump running mode with the hydraulic pressure relief valve 502 closed (arrows show the flow of hydraulic fluid through the system).

Figure 38:
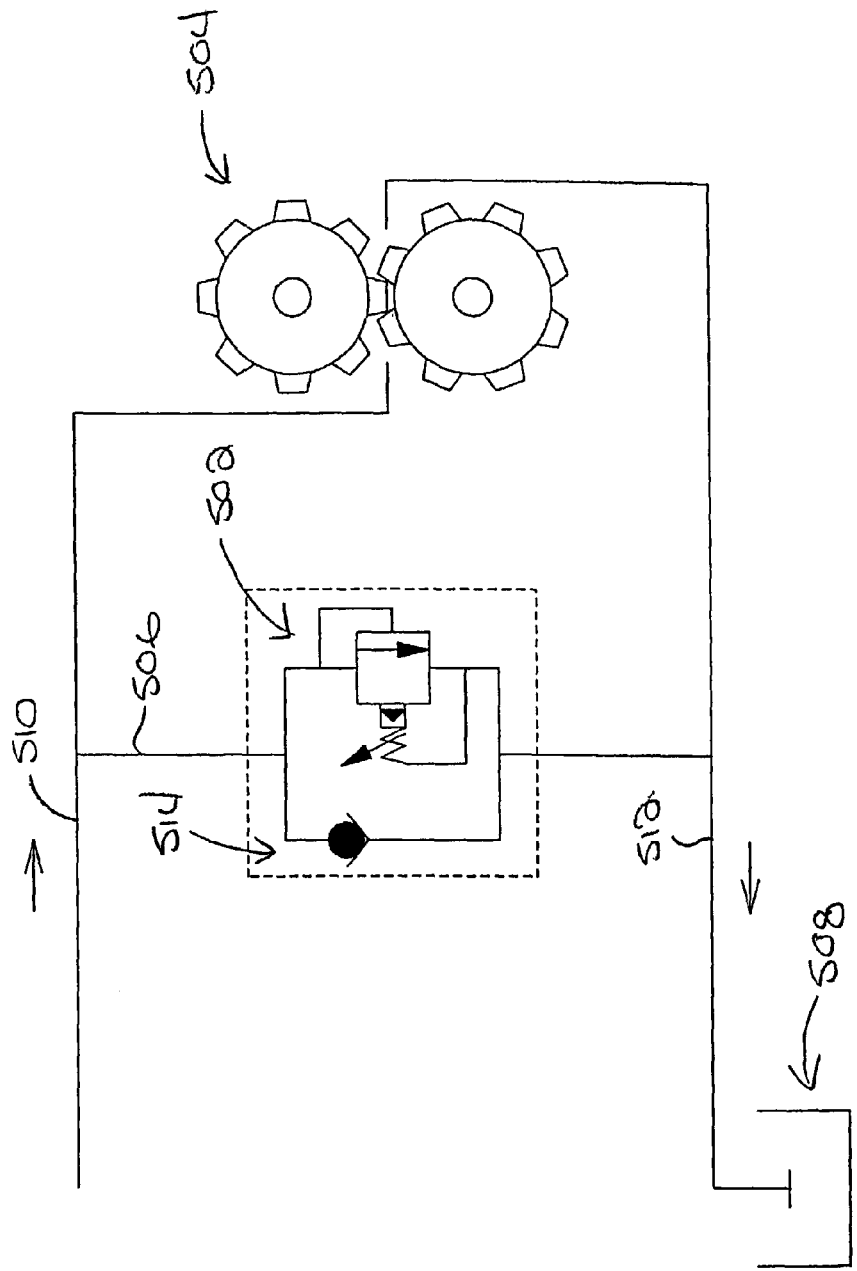
FIG. 38 is a schematic drawing of a hydraulic circuit associated with the hydraulic drive motor for the fluid pump of the tank according to one embodiment of the present invention.
Figure 38A:
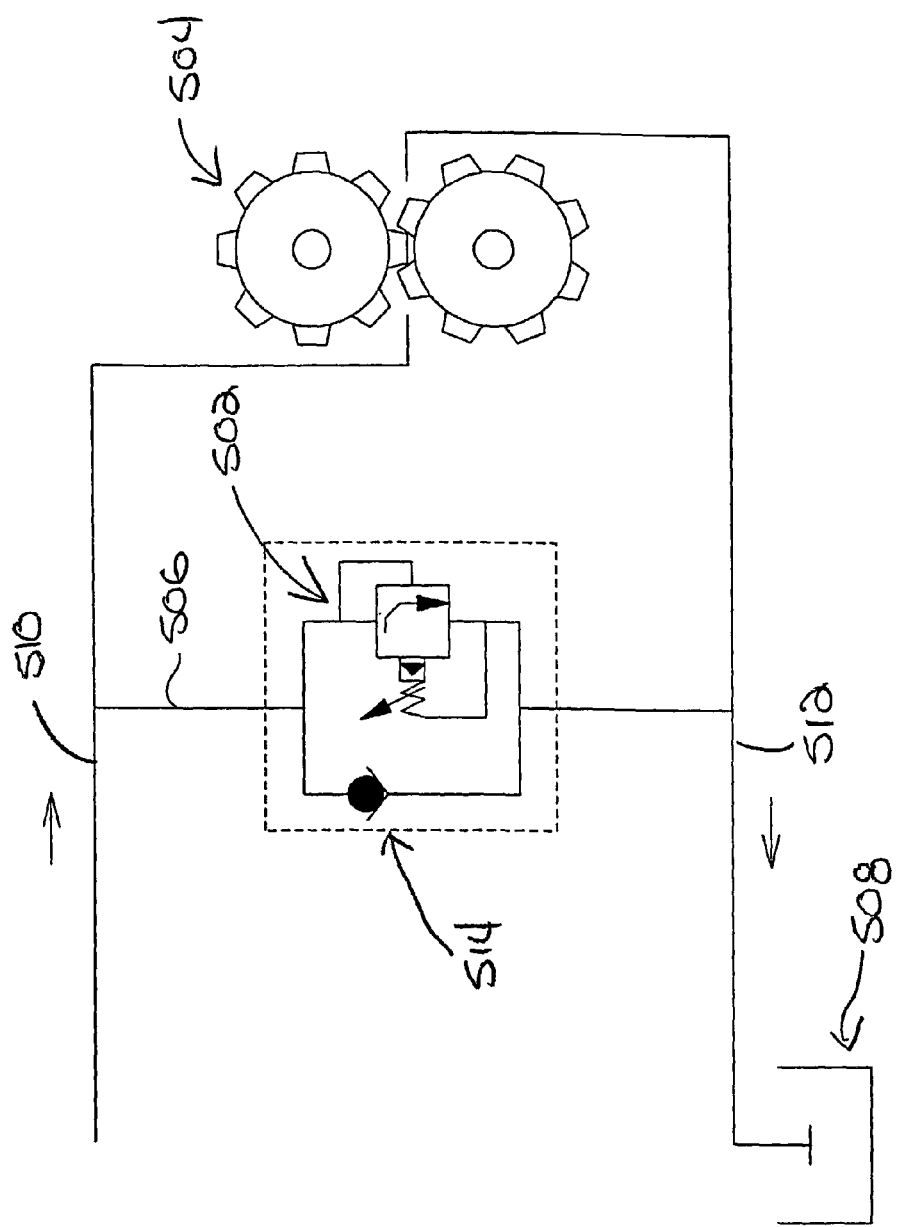
FIG. 38A is a schematic drawing of an alternative hydraulic circuit associated with the hydraulic drive motor for the fluid pump of the tank.

Alternatively, instead of a standard pressure relief valve, a so-called "soft start pressure relief valve" could be used (see FIG. 38A). A soft start pressure relief valve differs (from a standard pressure relief valve in that in its normal non-operative state, the soft-start valve is open. Thus, instead of allowing hydraulic fluid to bypass around the hydraulic motor 504 only after the pressure has built to a certain value, during start-up of the hydraulic motor, the soft-start valve initially permits all of the hydraulic fluid to bypass the hydraulic motor 504 and return to the truck hydraulic fluid tank 508. Then, over a prescribed time interval (e.g., 250 milliseconds), the soft-start valve gradually closes thereby allowing the pressure at the hydraulic motor 504 to gradually build. Thus, the soft-start pressure relief valve limits the rate at which the pressure at the hydraulic motor 504 rises. Once closed, the soft-start valve functions as a normal pressure relief valve limiting the maximum system pressure. An example of a soft-start pilot operated relief valve that could be used in the soft start/stop system of the present invention is the RPGT valve available from Sun Hydraulics. Of course, it will be appreciated that other soft-start valves could also be used.

Figure 41:
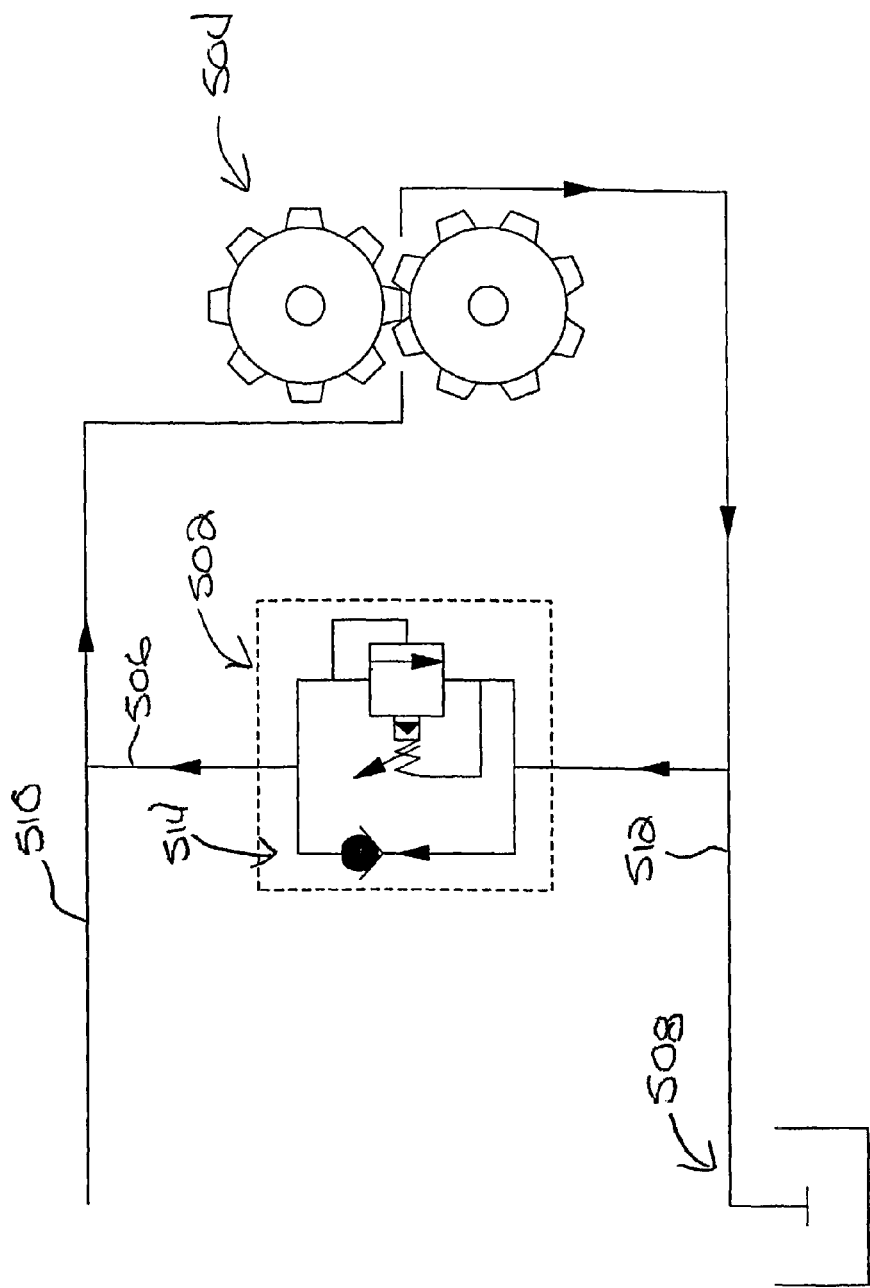
FIG. 41 is a schematic drawing of the hydraulic circuit of FIG. 38 indicating that hydraulic flow to the hydraulic drive motor has stopped and the hydraulic drive motor and fluid pump are coasting to a stop.

To permit the hydraulic motor 504 to softly coast to a stop, a one-way check valve 514 can be installed in the bypass line 506 parallel to the hydraulic pressure relief valve 502 that would allow hydraulic fluid to circulate from the outlet port of the hydraulic motor 504 through the bypass line 506 and back to the fluid supply line 510 and the inlet port of the hydraulic motor 504. The check valve 514 is configured to block flow in the direction from supply line 510 ensuring that the hydraulic pressure relief valve 502 controls the flow of hydraulic fluid from supply line 510 through the bypass line 506 towards the truck hydraulic fluid tank 508. This arrangement creates a closed loop that allows the momentum of the turning hydraulic motor and pump to gradually dissipate when the supply of hydraulic fluid from the truck hydraulic system is shut-off. FIG. 41 is a schematic diagram of the soft start/stop system operating in the pump shut down mode with hydraulic fluid flowing through the one-way check valve 514 (arrows show the flow of hydraulic fluid through the system).

Tanker trucks used in environments like construction sites, building demolition sites, excavation sites and mine sites are often filled with polluted water. In particular, these sites may have run-off collection ponds from which polluted non-potable water is pumped for use in tanker trucks. This polluted water may have a high degree of suspended solids. Since this water is used for various non-drinking purposes, these pollutants/suspended solids in no way inhibit the operation or effectiveness of these tanks. However, these suspended solids may settle to the tank floor or onto other internal tank surfaces (e.g., baffles) as sediment if a tanker truck is allowed to sit for any period of time. This sediment, depending on its chemical makeup, may cause accelerated corroding of the floor, baffles or other surfaces in the tank even if stainless steel is used.

To help keep such sediment from settling on the tank floor, the tank of the present invention can include a tank agitation system. In particular, the tank can include a closed loop fluid circuit which draws fluid from the tank through the tank fluid pump and pumps it back into the tank at a high flow rate and pressure in order to agitate the contents of the tank. This agitation system could be operated, either automatically or manually, when fluid is not being dispersed from the tank such that the tank fluid pump runs semi-continuously.

Figure 42:
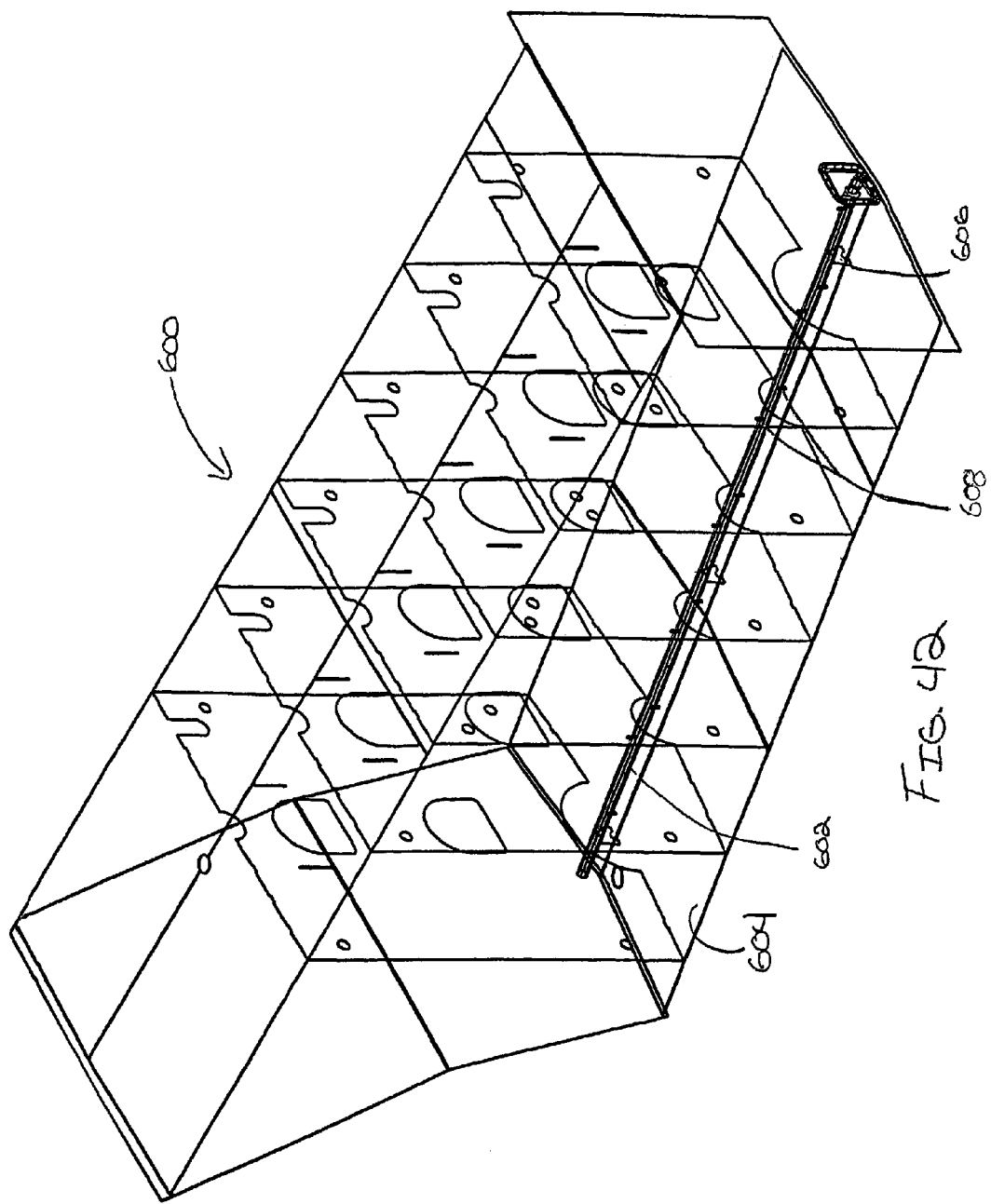
FIG. 42 is a partial perspective view of a baffled tank equipped with a fluid agitation system.
Figure 43:
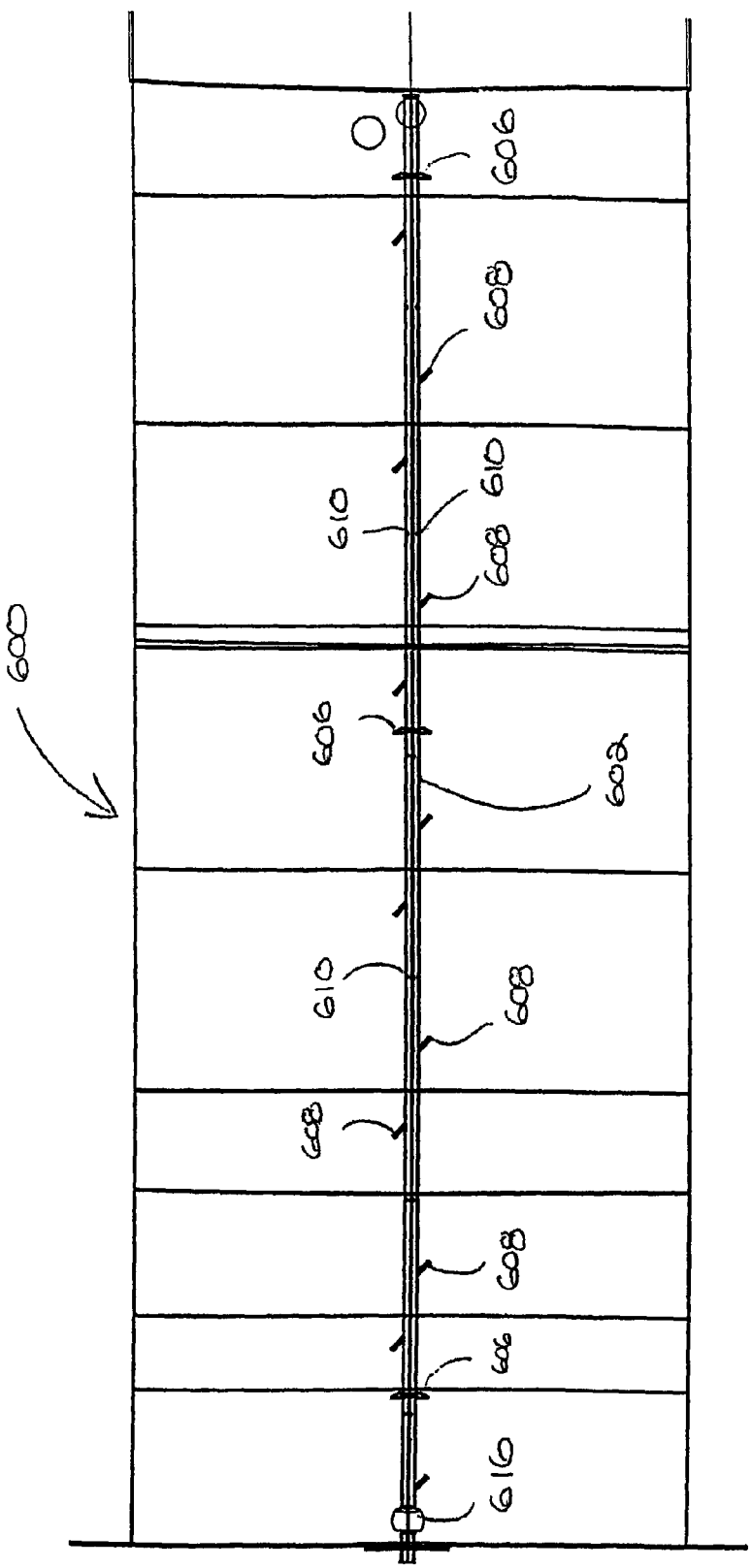
FIG. 43 is a top plan view of the fluid agitation system of FIG. 42.
Figure 44:
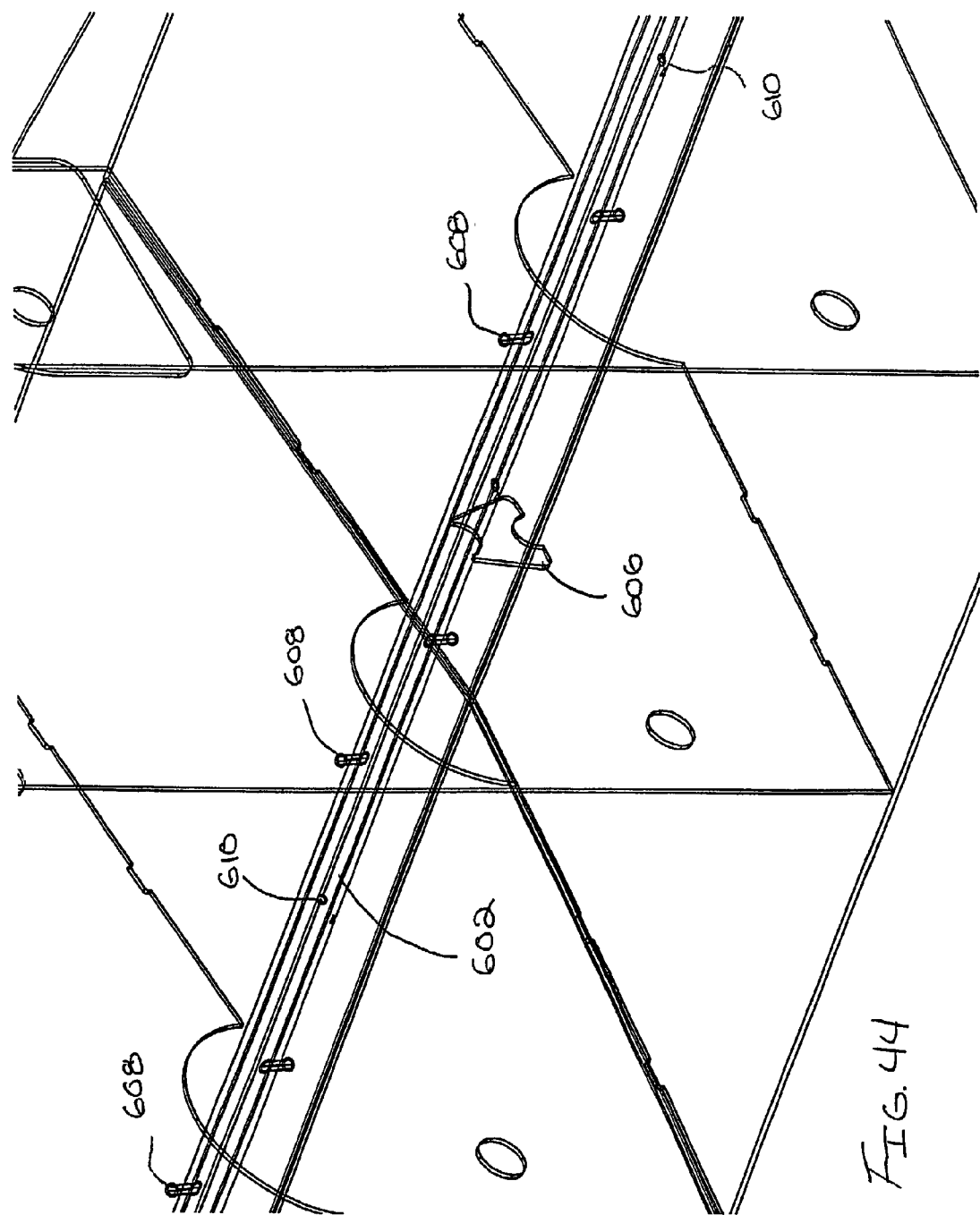
FIG. 44 is an enlarged perspective view of the fluid agitation system of FIG. 42.

An illustrative embodiment of a fluid agitation system constructed in accordance with the present invention is shown in FIGS. 42-45 in an exemplary baffled tank 600. As shown in FIG. 42, the agitation system includes an agitation tube 602 that extends in the lengthwise direction of the baffled tank 600 near the tank floor 604. The agitation tube 602 is supported on the tank floor 604 by a plurality of tube supports 606 that are longitudinally spaced from one another along the length of the agitation tube 602.

To provide agitation of the fluid in the baffled tank 600, a plurality of short cross tubes 608 as well as a plurality of apertures 610 are provided in the surface of the agitation tube 602. Each of the short cross tubes 608 consists of a tube which branches off from the agitation tube 602 at an angle from perpendicular. As can be seen from the top view of FIG. 43, the short cross tubes 608 are spaced along the length of the agitation tube 602 such that at least one short cross tube 608 is provided in each compartment of the baffled tank 600 defined by the internal baffle structures. Each of the apertures 610 consists of a simple hole in the outer wall of the agitation tube 602 (see, e.g., FIGS. 43 and 44). Like the shorter cross tubes 608, the apertures 610 are spaced along the length of the agitation tube 602 such that sufficient agitation is provided in each of the compartments of the baffled tank 600. In the illustrated embodiment, the apertures 610 are placed in the tube at angles of 45 degrees to either side of vertical.

Figure 45:
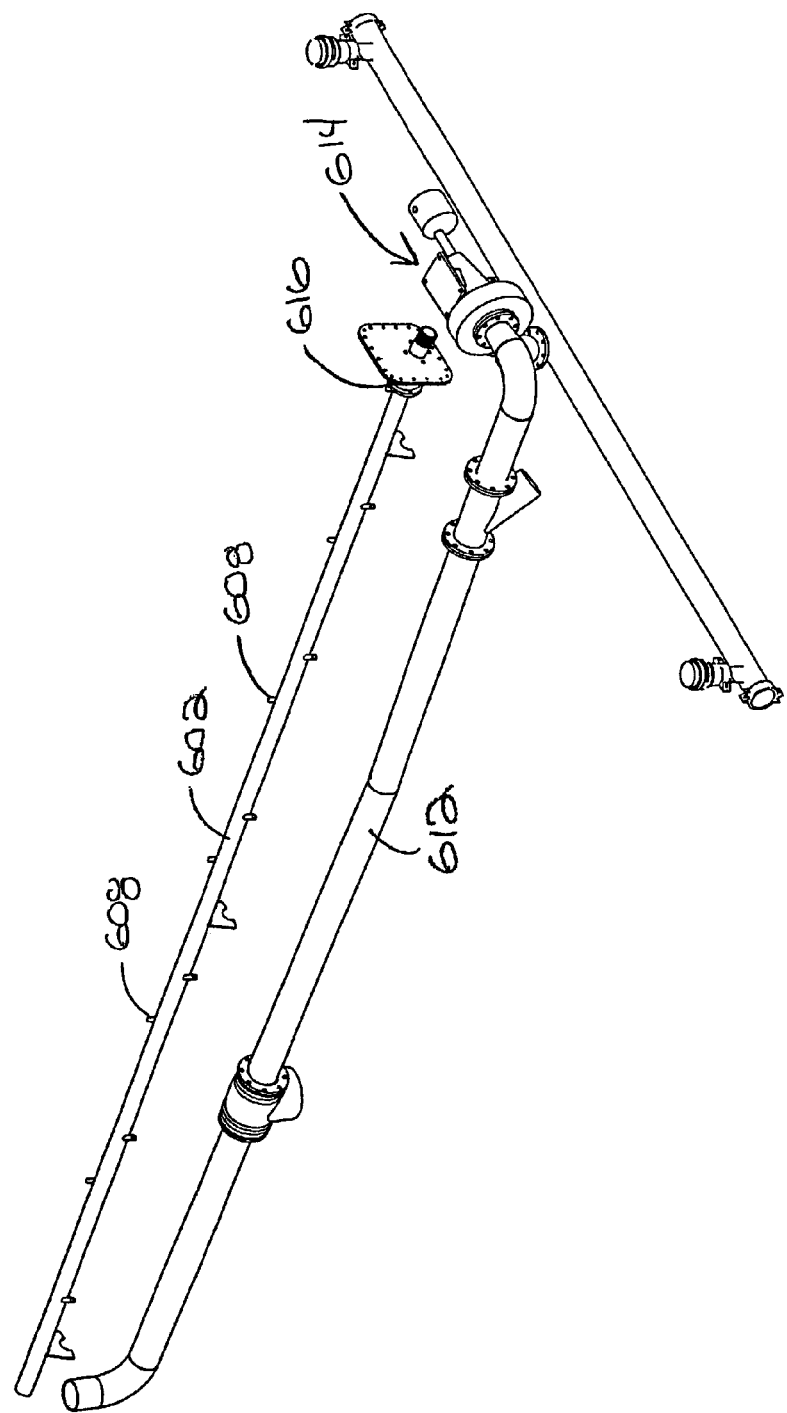
FIG. 45 is a simplified perspective view of the components of the fluid agitation system of FIG. 42.

The various components of the agitation system are shown in FIG. 45 including the agitation tube 602, a suction line tube 612 and the tank fluid pump 614 (although a separate dedicated agitation pump could be used). In operation, when the tank fluid pump 614 is not providing fluid to the spray nozzles, the tank fluid pump 614 can be operated to draw fluid out of the baffled tank 600 through the suction line tube 612 and then circulate the fluid back into the baffled tank 600 through the short cross tubes 608 and apertures 610 in the agitation tube 602. In this case, an expansion joint 616 is provided adjacent the upstream end of the agitation tube 602 (i.e., the end nearest the tank fluid pump 614). It will be appreciated that the agitation system can be configured other than as specifically shown in FIGS. 42-45.

Figure 46:
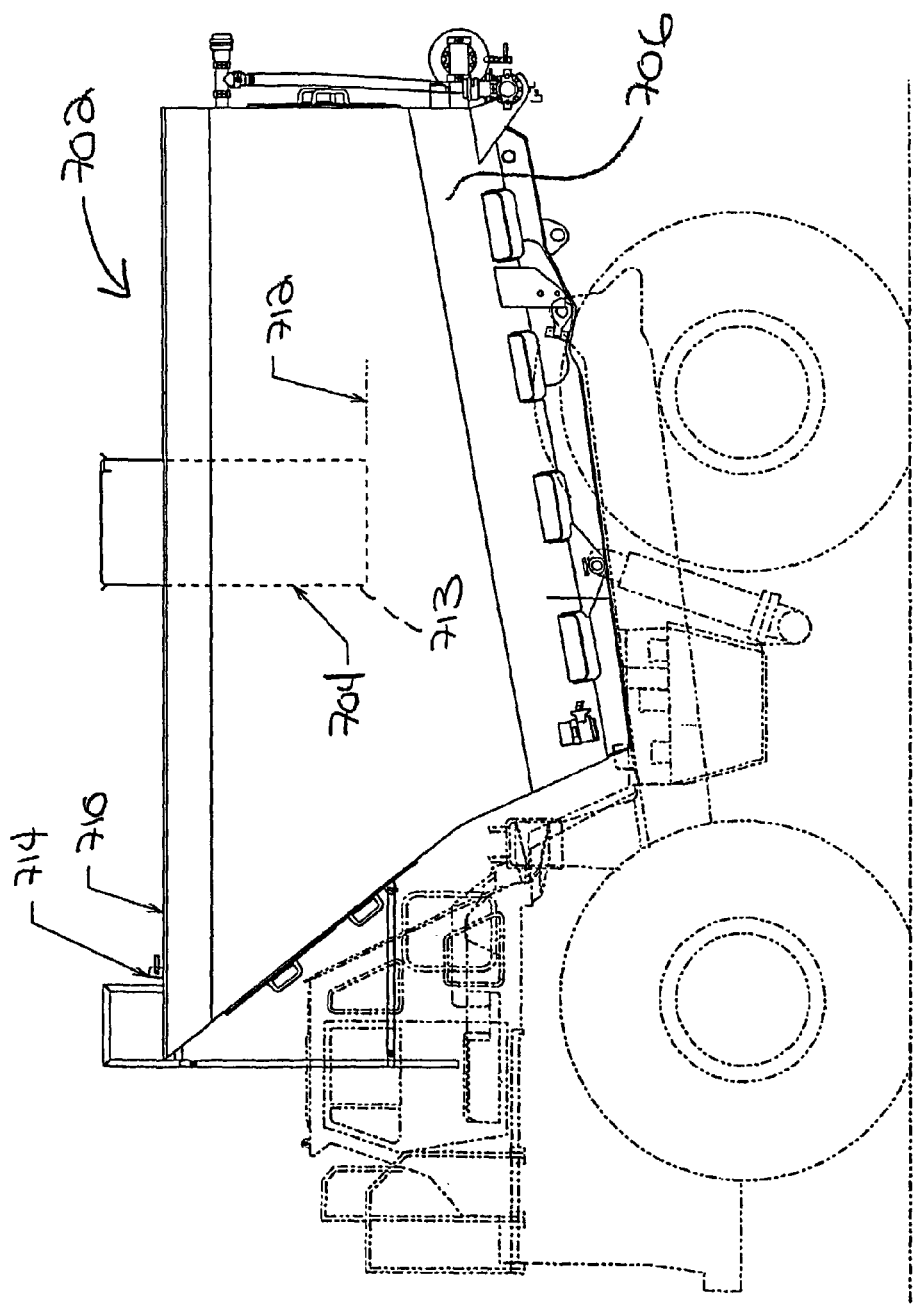
FIG. 46 is a side elevation view of an illustrative tank equipped with a variable volume system mounted on the chassis of an off highway truck.

To simplify tank-filling operations when filling the tank to less than its full capacity, the tank can be equipped with a variable volume system. Such a variable volume system is shown with respect to an exemplary tanker truck 702 in FIG. 46. More specifically, occasionally it is desirable to fill the tank of a tanker truck to less than its full capacity such as when training a new operator of a tanker truck or when conditions at the work site are such that less water is required to control dust. The illustrated variable volume system provides a quick and easy way by which the tank can be configured such that it cannot be filled above a predetermined level. To this end, with reference to FIG. 46, the variable water system includes a fill tube 704 that extends downwardly into the interior of the tank 706 from the fill hole in the top wall 710 of the tank. When the tank 706 is being filled, the fluid is introduced into the interior of the tank through the fill tube 704. Once the fluid in the tank reaches the level 712 of the lower or bottom edge 713 of the fill tube 704, the air in the tank 706 becomes trapped. This prevents the fluid level in the tank 706 from rising above the lower or bottom edge 713 of the fill tube 704. In particular, after the fluid reaches this level, any excess fluid that is introduced into the tank 706 will simply collect in the fill tube 704 and, if the filling operation is not stopped, the fluid will eventually overflow out of the fill hole 708. However, the water level in the main body of the tank 706 will remain at the reduced level 712 defined by the lower or bottom edge 713 of the fill tube 704.

To permit the tank 706 to be filled to maximum capacity, the variable volume system further includes an air releasing control mechanism. The air releasing control mechanism provides a way by which the air can bleed or vent out of the tank 706 once the fluid level reaches and then rises above the lower or bottom edge 713 of the fill tube 704 during a filling operation. To permit the fluid to rise to the maximum level in the tank 706, the outlet point of the air releasing control mechanism (i.e., through which air outlets from the tank) should be located as close as possible to the top wall 710 of the tank 706. In the embodiment illustrated in FIG. 46, the air releasing control mechanism comprises a manually operable valve 714 in the top wall 710 of the tank 706. This manually operable valve 714 allows an operator to quickly change the maximum fill level 712 or line in the tank 706 from the lower or bottom edge 713 of the fill tube 704 to the top wall 710 of the tank 706 or any place in between simply by manually opening and closing the valve 714.

Figure 47:
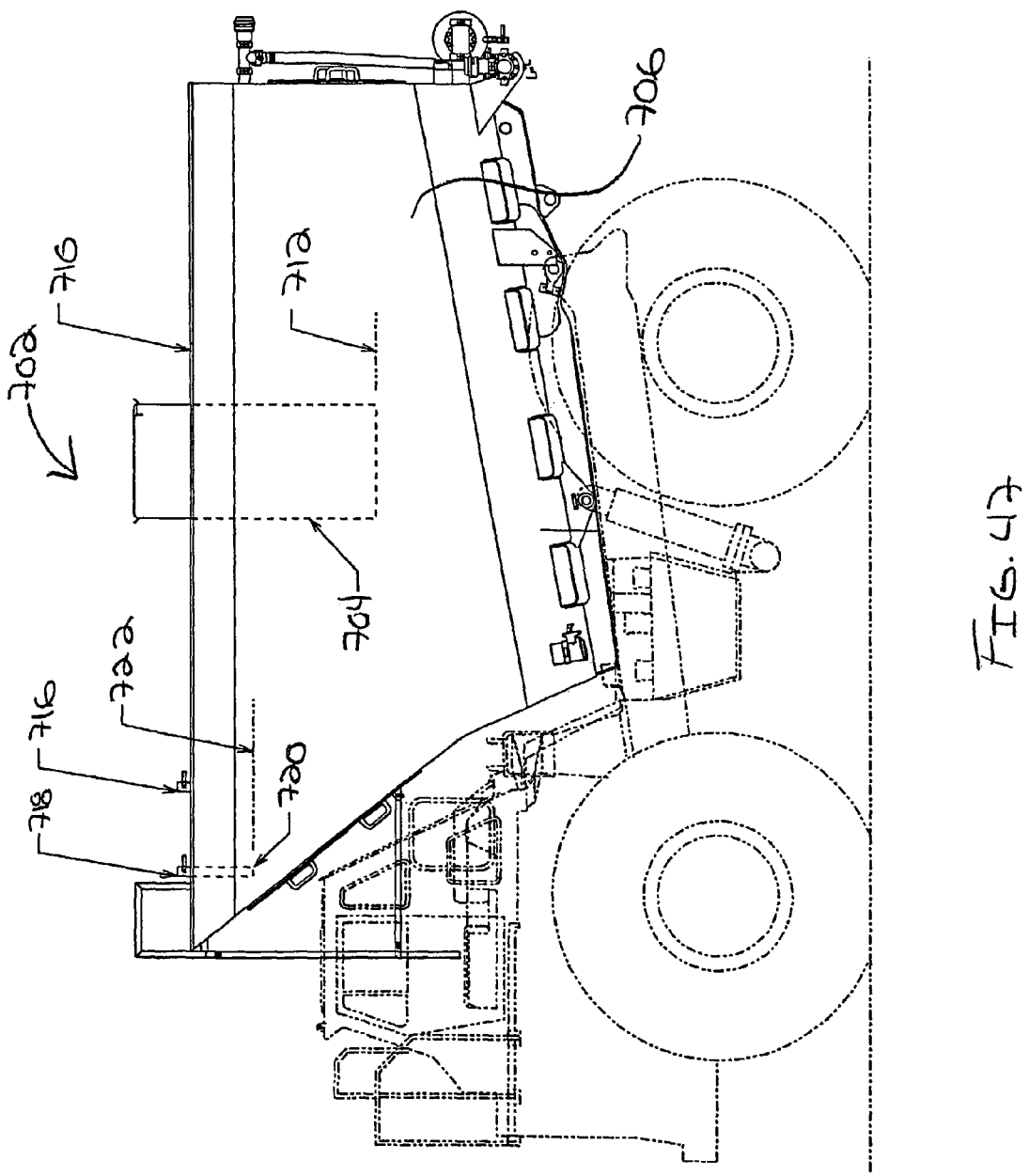
FIG. 47 is a side elevation view of an illustrative tank equipped with an alternative variable volume system mounted on the chassis of an off highway truck.

To allow the maximum fill level to be set at other levels, the variable volume system could include a plurality of air releasing control mechanisms each of which has an air outlet at a different vertical level in the tank. For example, in the embodiment illustrated in FIG. 47, the tank 706 has two air releasing control mechanisms in the form of first and second manually operable valves 716, 718. The first valve 716 is similar to the manual valve 714 in the FIG. 46 embodiment in that its outlet is positioned adjacent the top wall 710 of the tank 706. The second manual valve 718 has an air outlet tube 720 that extends downward into the tank 706 so that the outlet to the second valve 718 is at a lower vertical level 722 than the outlet to the first valve 716. Thus, an operator has the option of setting the maximum fill level to the level 712 of the lower or bottom edge 713 of the fill tube 704 (i.e., by closing both the first and second valves 716, 718), the level 722 of the lower edge of the air outlet tube 720 of the second valve 718 (i.e., by opening the second valve 718 and closing the first valve 716) or adjacent the top wall 710 of the tank 706 (i.e., by opening the first valve 716).

Figure 48:
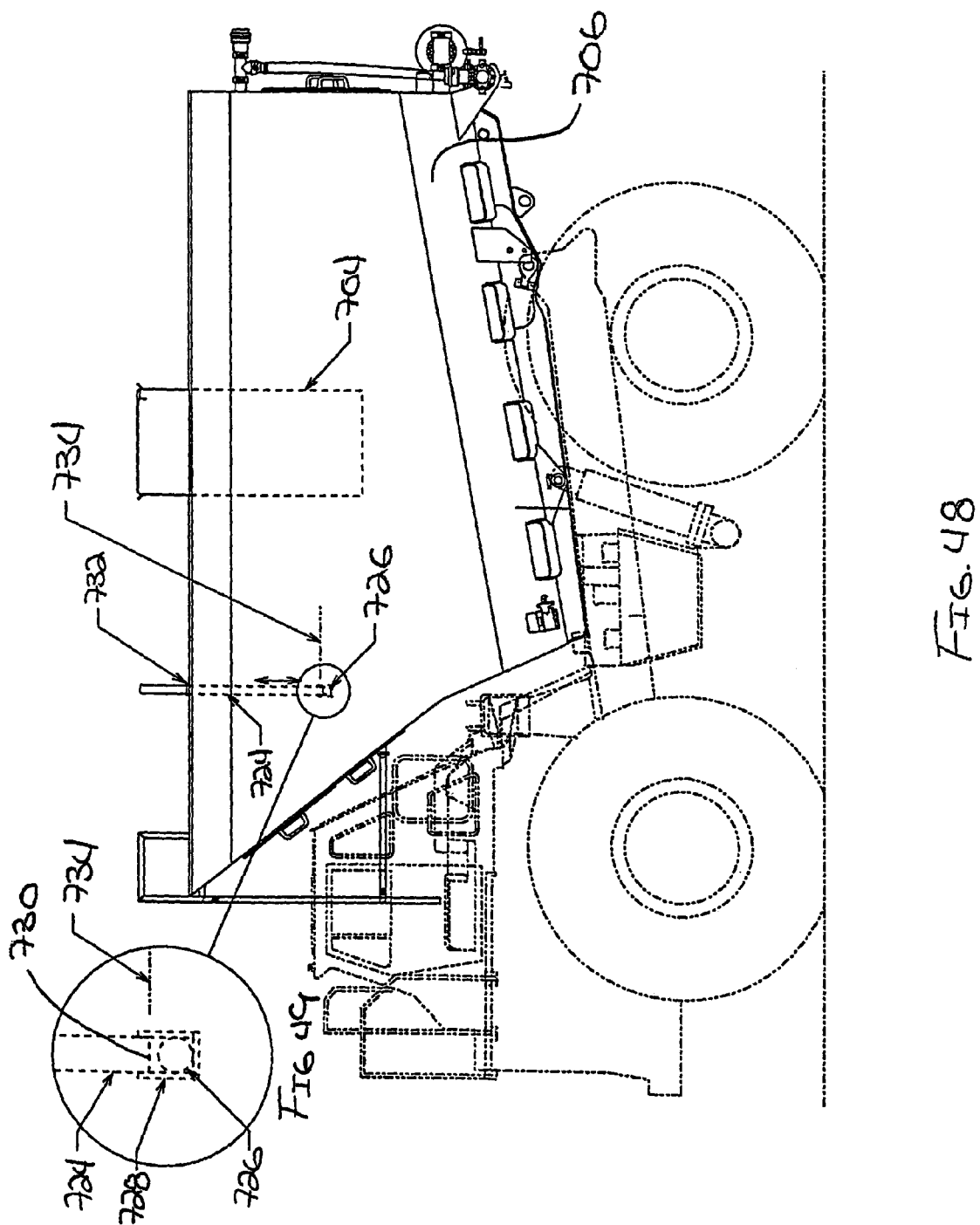
FIG. 48 is a side elevation view of an illustrative tank equipped with another alternative variable volume system mounted on the chassis of an off highway truck.

Alternatively, the variable volume system could include an air releasing control mechanism that is configured such that the vertical level at which the pressure relief mechanism outlets air from the interior of the tank can be selectively adjusted. For example, as shown in FIG. 48, the air releasing control mechanism could include a tube 724 that is open at either end and extends vertically downward into the interior of the tank 706. A floatable ball 726 is connected to the lower end 730 of the tube 724 via a guide 728. When the fluid level reaches the floatable ball 726, the ball 726 will float (guided by the guide 728) into engagement with the open lower end 730 of the tube 724 thereby sealing the lower end of the tube 724 closed. This prevents any additional air from exiting the tank and defines the maximum fill line 734 at the lower end 730 of the tube 724. In the embodiment of FIG. 48, the tube 724 is slidably received in the top wall 710 of the tank 706 such that the vertical position of the lower end 730 of the tube 724 can be selectively adjusted by unfastening a clamp 732, sliding the tube 724 up or down as desired and refastening the clamp 732. Thus, the maximum fill line 734, which is defined by the lower end 730 of the tube 724, can be selectively adjusted to any desired position.

Figure 50:
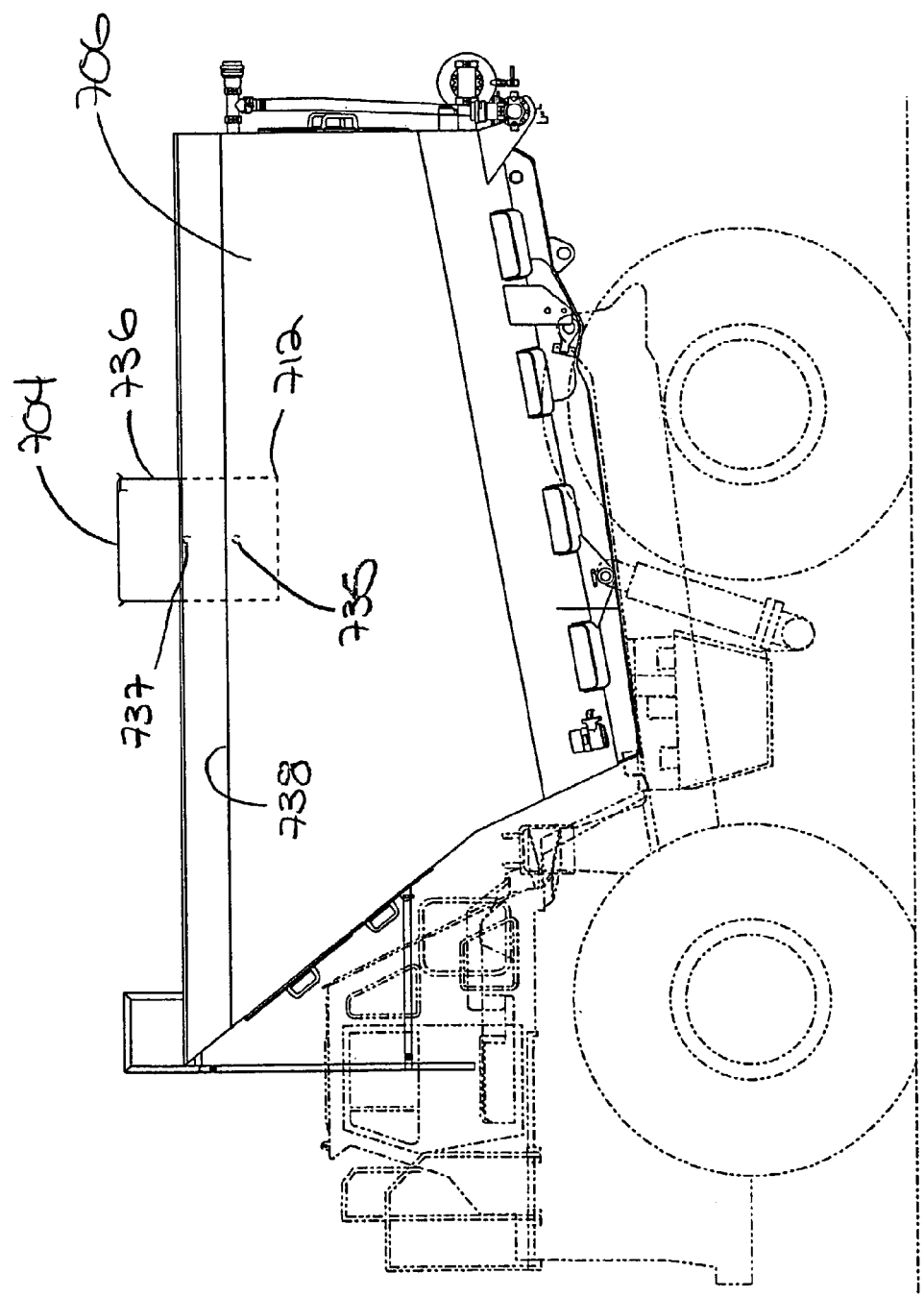
FIG. 50 is a side elevation view of an illustrative tank equipped with another alternative variable volume system mounted on the chassis of an off highway truck.
Figure 50:
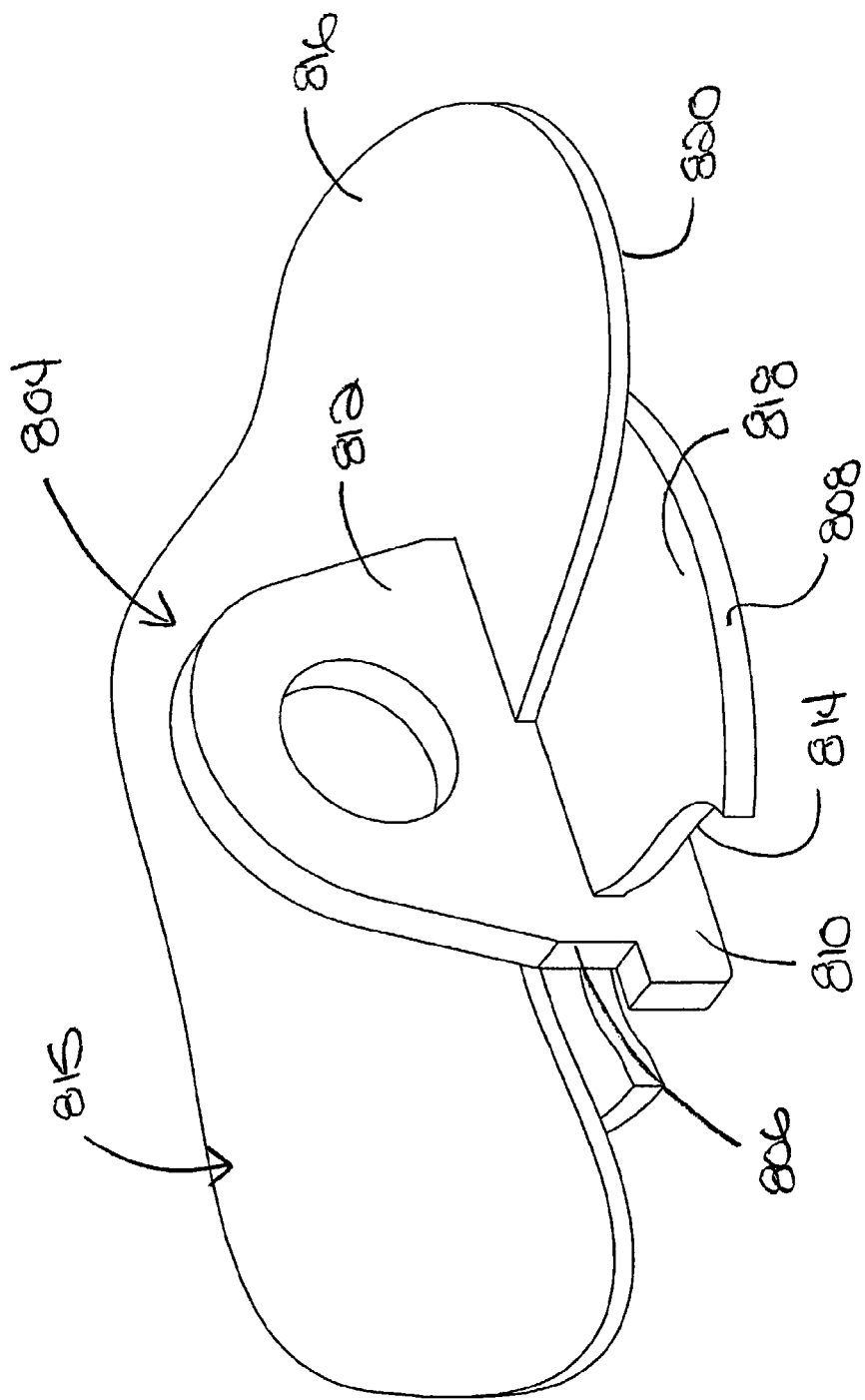

An alternative arrangement for the variable volume system is illustrated in FIG. 50. In this embodiment, the air releasing control mechanism includes a plurality of openings 735 and 737, two in this instance, at different vertical levels in the sidewall 736 of the fill tube 704. Each of these openings 735, 737 can be selectively closed with an associated plug to prevent air from venting out of the tank 706 therethrough. When both of the openings 735, 737 are plugged or otherwise closed, the maximum fill level is the lower or bottom edge 712 of the fill tube 704. When the lower opening 735 is open and the upper opening 737 is closed, the maximum fill level is the vertical level 738 of the lower opening 735. When the upper opening 737 is opened, the maximum fill level is the vertical level of the upper opening 737, which in this case is adjacent the top wall 710 of the tank 706. Of course, openings could be provided in the sidewall 736 of the fill tube 704 at any number of different vertical levels in order to provide additional options for setting of the maximum fill level.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Of course, variations of those preferred embodiments will become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A tank for transporting liquid comprising: an exterior surface forming a closed vessel for containing the liquid; an interior of the closed vessel; a plurality of immovable baffles forming compartments; one or more doors in the plurality of immovable baffles sized to allow personnel to walk between compartments; at least two openings in the exterior surface allowing the personnel to enter the interior at one of the openings in the exterior surface, walk through the one or more doors and exit the interior at another of the openings in the exterior surface.

2. The tank of claim 1 wherein at least one of the one or more doors is secured by fasteners in the closed position.

3. The tank of claim 2 wherein fasteners are bolts.

4. The tank of claim 1 wherein said at least two openings in the exterior surfaces of the tank include two openings located on approximately opposing surfaces of the exterior surfaces.

5. The tank of claim 1 wherein the opening on at least one surface of the exterior surfaces is associated with a door that seals the opening in a closed position.

6. The tank of claim 1 wherein the exterior surface includes at least one step for accessing at least one of the two opening located in a side of the exterior surface.

7. The tank of claim 1 wherein at least one side or bottom surface of the exterior surfaces includes at least one holding point for aiding personnel entering the opening.

8. The tank of claim 1 wherein at least one of the doors associated with the openings on the exterior surface is hinged to the tank for pivoting between open and closed positions.

9. The tank of claim 1 having a generally rectangular lateral cross section with angular corners.

10. A tank for transporting liquid comprising an interior having a baffle network spanning a top and a floor so as to provide structural support for an exterior surface of the tank; and, a door in at least one baffle of the network of baffles allowing humans to move between chambers of the tank defined by the baffle network when opened and inhibiting any substantial flow of the liquid between the chambers when closed.

11. The tank of claim 10 wherein the door when closed covers an opening in the at least one baffle that is large enough for a human to walk through.

12. The tank of claim 10 wherein the network of baffles includes a plurality of sections having a common configuration.

13. The tank of claim 12 wherein at least one or more of the plurality of sections includes one or more doors allowing human ingress and egress between chambers of the tank defined by the network of baffles.

14. The method according to claim 10 wherein at least one baffle in the baffle network includes a vertical bend.

15. The tank of claim 10 including an assembly for supporting the door moving between the open and closed positions.

16. The tank of claim 10 wherein the door is maintained in the closed position by fasteners.

17. The tank of claim 10 having a generally rectangular lateral cross section with angular corners.

18. A tank for transporting liquids comprising a liquid tight vessel having a top opening for receiving the liquid and a bottom opening for discharging the liquid; a plurality of baffles defining compartments in an interior of the vessel; at least some of the compartments having personnel access openings in the baffles allowing personnel ingress and egress into and from the compartments by moving through the openings; at least one of the access openings including a door operating between open and closed positions to substantially inhibit the flow of the liquid through the access opening in the closed position.

19. The tank of claim 18 wherein said at least one personnel access opening including the door is large enough for a human to walk through.

20. The tank of claim 18 having a generally rectangular lateral cross section.

21. A tank system for transporting and discharging liquid comprising a liquid tight tank for mounting to a vehicle; a plurality of baffles in an interior space of the tank defining compartments; a personnel access opening in at least one of the plurality of baffles sized to allow humans to walk through the opening; and the personnel access opening having a door supported by a surface of the tank to allow the door to move between open and closed positions; an opening in a top region of the tank for filling the tank with the liquid; and an opening in a bottom region of the tank connected to a device for discharging of the liquid.

22. The tank of claim 21 wherein the surface of the tank is one of the baffles.

23. The tank according to claim 21 wherein the door is hinged to the surface of the tank to pivot between the open and closed positions.

24. The tank according to claim 23 wherein each hinge comprises a tab configured to hook into a slot.

25. The tank according to claim 24 wherein the tab is integral to the door and the slot is cut in the surface of the tank.

26. The tank of claim 25 wherein the integral tab and door are cut from a single piece of material.

27. The tank system of claim 21 wherein the tank has a generally rectangular lateral cross section with angular corners.

28. An off-highway tanker vehicle for distributing liquid on a surface, the vehicle comprising:
 a chassis supported on a plurality of tires;
 a tank for carrying liquid and supported by the chassis;
 an assembly in communication with the tank for spraying the liquid carried in the tank;
 a baffle network spanning a top and a floor of an interior of the tank that provides both structural support for an exterior surface of the tank and inhibits circulation of the liquid in response to movement of the vehicle;
 compartments defined by the baffle network that include openings in baffles of the baffle network that provide personnel access to each of the compartments;
 at least one closure for at least one of the openings that inhibits circulation of liquid through the at least one opening and between compartments connected by the at least one opening;
 a fastener for allowing the at least one closure to be repeatedly removed and secured to the at least one opening; and
 at least one entry hatch on a side of the tank that when opened reveals an entry opening in the exterior of the tank for allowing personnel access to all of the compartments by way of the openings between compartments.

29. The off-highway tanker vehicle of claim 28 wherein the assembly for spraying the liquid carried in the tank includes a spray bar assembly mounted to at least a rear side of the tank.

30. The off-highway tanker vehicle of claim 28 wherein at least one of the openings is sized and positioned in the baffle to accommodate personnel walking through the opening in order to move between adjacent compartments.

31. The off-highway tanker vehicle of claim 28 wherein the baffle network defines adjacent compartments in both horizontal and vertical relationships.

32. The off-highway tanker vehicle of claim 28 wherein the at least one entry hatch includes two or more entry hatches on one or more sides of the tank and positioned to enable personnel to enter the interior of the tank through a first entry opening covered by one of the entry hatches, move through the compartments by way of the openings in the baffles and exit the interior through a second entry opening covered by another one of the entry hatches.

33. The tanker vehicle of claim 32 wherein the two or more entry hatches are on opposite surfaces of the tank.

34. The tanker vehicle of claim 28 wherein the tank has a generally rectangular lateral cross section with angular corners.

35. A method of performing maintenance on a tanker vehicle that dispenses water from a tank onto a working area to help reduce dust clouds resulting from other vehicles working in the area, the method comprising:
 unfastening and opening a hatch of one or more access openings on an exterior surface of the tank mounted to the tanker vehicle for carrying the water dispensed in the working area, where the access openings are positioned on the exterior of the tank so as to promote circulation of air into an interior of the tank when the hatch is opened,
 entering into an interior of the tank through one of the access openings,
 performing a maintenance task on the interior of the tank,
 exiting the interior of the tank through one of the access openings upon completion of the maintenance task, and
 closing and fastening the hatch of the access openings.

36. The method of claim 35 including moving about the interior of the tank to perform the maintenance task by passing through access openings in baffles within the interior of the tank.

37. The method of claim 36 wherein one or more of the access openings are sized to allow personnel to walk between compartments within the tank and defined by the baffle network.

38. The method of claim 35 wherein the unfastening and opening of the hatch includes unfastening and opening hatches for each of the two or more access openings and closing the hatches after completion of the maintenance task.

\* \* \* \* \*